US012459269B2

(12) United States Patent
Hosokawa et al.

(10) Patent No.: US 12,459,269 B2
(45) Date of Patent: Nov. 4, 2025

(54) LIQUID DISCHARGING APPARATUS AND LIQUID ACCOMMODATING DEVICE

(71) Applicant: SEIKO EPSON CORPORATION, Tokyo (JP)

(72) Inventors: Yasuhiro Hosokawa, Nagano (JP); Masahiko Yoshida, Nagano (JP); Junpei Yoshida, Nagano (JP); Tadashi Ishikawa, Nagano (JP); Takanori Yokoi, Yamagata-mura (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 18/586,635

(22) Filed: Feb. 26, 2024

(65) Prior Publication Data

US 2024/0286413 A1 Aug. 29, 2024

(30) Foreign Application Priority Data

Feb. 27, 2023 (JP) ................................ 2023-028898

(51) Int. Cl.
*B41J 2/175* (2006.01)

(52) U.S. Cl.
CPC ....... *B41J 2/17566* (2013.01); *B41J 2/17513* (2013.01)

(58) Field of Classification Search
CPC .... B41J 2/175; B41J 2/17503; B41J 2/17506; B41J 2/17509; B41J 2/17513; B41J 2/1753; B41J 2/17566; B41J 29/13; B41J 2002/17579
See application file for complete search history.

(56) References Cited

U.S. PATENT DOCUMENTS

| | | | | |
|---|---|---|---|---|
| 7,905,568 | B2 * | 3/2011 | Karaki | B41J 2/17566 347/7 |
| 2016/0263905 | A1 * | 9/2016 | Kimura | B41J 2/17553 |
| 2016/0279963 | A1 * | 9/2016 | Koganehira | B41J 29/13 |
| 2021/0300019 | A1 * | 9/2021 | Yoshida | B41J 2/17566 |
| 2022/0266598 | A1 * | 8/2022 | Takagi | B41J 2/17509 |

FOREIGN PATENT DOCUMENTS

| | | |
|---|---|---|
| JP | H06-270410 A | 9/1994 |

* cited by examiner

*Primary Examiner* — Anh T Vo
(74) *Attorney, Agent, or Firm* — Global IP Counselors, LLP

(57) ABSTRACT

A liquid discharging apparatus includes an accommodating container accommodating conductive liquid, a first electrode accommodated in the accommodating container, a second electrode accommodated in the accommodating container, a detection portion that is electrically coupled to the first electrode and the second electrode and that detects a remaining amount of the liquid accommodated in the accommodating container in response to an electric signal from at least one of the first electrode and the second electrode, and a liquid discharging head discharging the liquid that is supplied from the accommodating container, in which the first electrode includes a first part where a distance between the first part and the second electrode is a first distance, and a second part where a distance between the second part and the second electrode is a second distance that is longer than the first distance.

22 Claims, 39 Drawing Sheets

LIQUID DISCHARGING APPARATUS AND LIQUID ACCOMMODATING DEVICE

The present application is based on, and claims priority from JP Application Serial Number 2023-028898, filed Feb. 27, 2023, the disclosure of which is hereby incorporated by reference herein in its entirety.

BACKGROUND

1. Technical Field

The present disclosure relates to a liquid discharging apparatus and a liquid accommodating device.

2. Related Art

Various techniques have been proposed for detecting a remaining amount of liquid in an accommodating container for accommodating conductive liquid such as ink. For example, JP-A-6-270410 discloses a technique for detecting a remaining amount of liquid in an accommodating container based on a resistance value between two rod-shaped electrode pins, which are provided substantially parallel to each other in the accommodating container accommodating the liquid.

However, in the technique in the related art, since an amount of change in the resistance value between the two electrode pins is small compared to an amount of change in the remaining amount of the liquid in the accommodating container, there are cases where it is difficult to detect the remaining amount of the liquid in the accommodating container.

SUMMARY

According to an aspect of the present disclosure a liquid discharging apparatus includes: an accommodating container accommodating conductive liquid; a first electrode accommodated in the accommodating container; a second electrode accommodated in the accommodating container; a detection portion that is electrically coupled to the first electrode and the second electrode and that detects a remaining amount of the liquid accommodated in the accommodating container in response to an electric signal from at least one of the first electrode and the second electrode; and a liquid discharging head discharging the liquid that is supplied from the accommodating container, in which the first electrode includes a first part where a distance between the first part and the second electrode is a first distance, and a second part where a distance between the second part and the second electrode is a second distance that is longer than the first distance.

According to another aspect of the present disclosure a liquid accommodating device includes: an accommodating container accommodating conductive liquid; a first electrode accommodated in the accommodating container; a second electrode accommodated in the accommodating container; and a detection portion that is electrically coupled to the first electrode and the second electrode and that detects a remaining amount of the liquid accommodated in the accommodating container in response to an electric signal from at least one of the first electrode and the second electrode, in which the first electrode includes a first part where a distance between the first part and the second electrode is a first distance, and a second part where a distance between the second part and the second electrode is a second distance that is longer than the first distance.

DESCRIPTION OF EMBODIMENTS

In the following, an embodiment of carrying out the present disclosure will be described with reference to the drawings. However, in each drawing, the size and scale of each section are appropriately different from the actual ones. Further, since the embodiments described in the following are preferred specific examples of the present disclosure, various technically preferable limitations are attached, but the scope of the present disclosure is not limited to the embodiments unless otherwise stated to specifically limit the present disclosure in the following explanation.

1. First Embodiment

In the following, an ink jet printer 100 according to a first embodiment will be explained.

1.1. Overview of Ink Jet Printer

Figure 1:
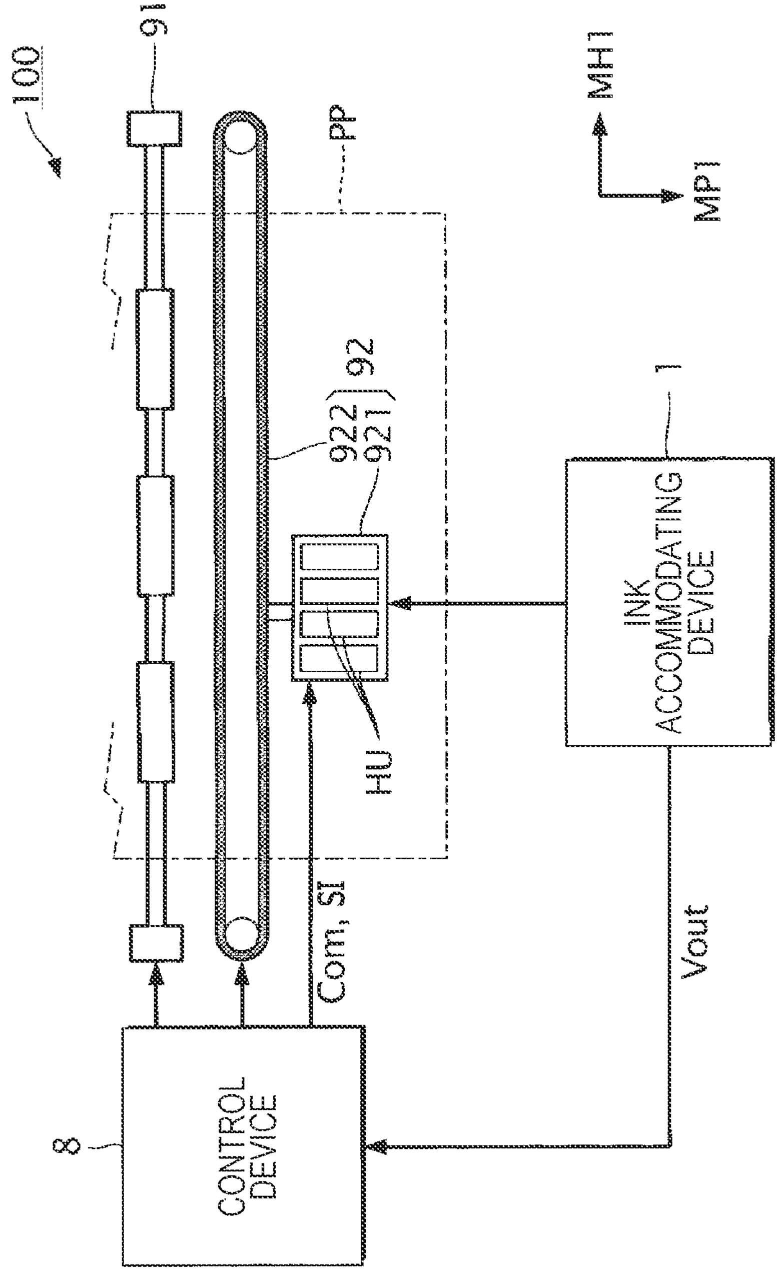
FIG. 1 is a configuration diagram illustrating an example of an ink jet printer according to a first embodiment of the present disclosure.

FIG. 1 is an explanatory diagram illustrating an example of a configuration of the ink jet printer 100 according to the present embodiment.

The ink jet printer 100 is an ink jet type printing apparatus that discharges ink IK onto a medium PP. The medium PP is typically printing paper, but any print target, such as a resin film or fabric, may be used as the medium PP. In the present embodiment, conductive ink is employed as the ink IK.

In the present embodiment, the ink jet printer 100 is an example of a "liquid discharging apparatus", and the ink IK is an example of "conductive liquid".

As illustrated in FIG. 1, the ink jet printer 100 includes an ink accommodating device 1, a control device 8, a plurality of liquid discharging heads HU, a transport mechanism 91, and a movement mechanism 92.

The control device 8 includes, for example, a processing circuit such as a CPU or FPGA and a storage circuit such as a semiconductor memory, and controls each element of the ink jet printer 100. Here, the CPU is an abbreviation of Central Processing Unit, and the FPGA is an abbreviation of Field Programmable Gate Array.

The transport mechanism 91 transports the medium PP in a sub-scanning direction MP1 based on the control by the control device 8.

The movement mechanism 92 reciprocates the plurality of liquid discharging heads HU in a main scanning direction MH1 intersecting the sub-scanning direction MP1 and in a main scanning direction MH2 opposite to the main scanning direction MH1 based on the control by the control device 8. The movement mechanism 92 includes a housing case 921 that accommodates the plurality of liquid discharging heads HU, and an endless belt 922 to which the housing case 921 is fixed. The ink accommodating device 1 may be housed in the housing case 921 together with the liquid discharging head HU.

The control device 8 supplies, with respect to the liquid discharging head HU, a drive signal Com for driving the liquid discharging head HU and a control signal SI for controlling the liquid discharging head HU.

The liquid discharging head HU is driven by the drive signal Com based on the control of the control signal SI to discharge the ink IK from some or all of a plurality of nozzles provided in the liquid discharging head HU. That is, the liquid discharging head HU causes the ink IK to be discharged from some or all of the plurality of nozzles in conjunction with the transportation of the medium PP by the transport mechanism 91 and the reciprocation of the liquid discharging head HU by the movement mechanism 92, and causes the discharged ink to land on a surface of the medium PP, thereby forming a desired image on the surface of the medium PP.

The ink accommodating device 1 accommodates the ink IK. Further, the ink accommodating device 1 supplies the ink IK accommodated in the ink accommodating device 1 to the liquid discharging head HU based on the control by the control device 8.

In the present embodiment, the ink accommodating device 1 is an example of a “liquid accommodating device”.

In the present embodiment, it is assumed that the ink accommodating device 1 accommodates M types of the ink IK. Here, a value M is a natural number that satisfies 1≤M. More specifically, in the present embodiment, as an example, it is assumed that the ink accommodating device 1 accommodates four types of the ink IK corresponding to cyan, magenta, yellow, and black. That is, in the present embodiment, as an example, “M=4” is assumed.

In the present embodiment, it is assumed that the ink jet printer 100 includes M liquid discharging heads HU corresponding to M types of the ink IK. Specifically, in the present embodiment, as an example, it is assumed that the ink jet printer 100 includes four liquid discharging heads HU corresponding to four types of the ink IK.

In the following, among the M liquid discharging heads HU, the m-th liquid discharging head HU may be referred to as a liquid discharging head HU[m]. Here, the variable m is a natural number that satisfies 1≤m≤M.

The ink accommodating device 1 includes an ink amount detection circuit 2 that detects a remaining amount of each type of ink IK accommodated in the ink accommodating device 1 and that outputs a detection signal Vout indicating a result of the detection. The ink amount detection circuit 2 will be described later in FIG. 3.

1.2. Ink Accommodating Device

In the following, an overview of the ink accommodating device 1 will be described with reference to FIGS. 2 to 8.

Figure 2:
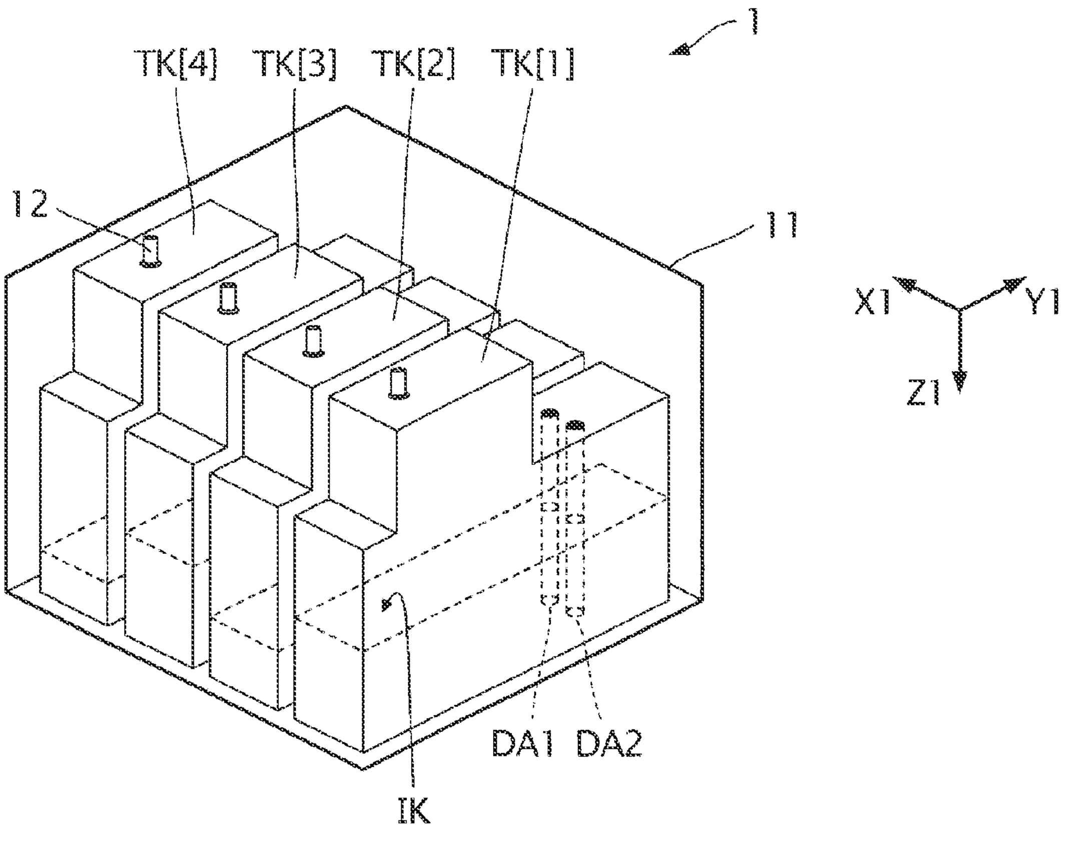
FIG. 2 is a perspective view illustrating an example of a configuration of an ink accommodating device.

FIG. 2 is a perspective view for explaining an example of a configuration of the ink accommodating device 1.

As illustrated in FIG. 2, the ink accommodating device 1 includes M ink tanks TK[1] to TK[M] that correspond one-to-one to M types of ink IK accommodated in the ink accommodating device 1, and a housing case 11 that houses the M ink tanks TK[1] to TK[M]. Specifically, in the present embodiment, the ink accommodating device 1 includes four ink tanks TK[1] to TK [4] that correspond one-to-one to four types of the ink IK of cyan, magenta, yellow, and black.

The ink tank TK[m] accommodates a type of the ink IK corresponding to the ink tank TK[m] and supplies the ink IK to the liquid discharging head HU[m]. Further, the ink tank TK[m] is provided with a supply port 12 for supplying the ink IK to an internal space of the ink tank TK[m]. Further, an electrode rod DA1, which is a rod-shaped electrode, and an electrode rod DA2, which is a rod-shaped electrode, are accommodated in the ink tank TK[m].

In the present embodiment, the ink tank TK[m] is an example of an “accommodating container”.

In the following, when the ink IK is supplied from the ink tank TK[m] to the liquid discharging head HU[m] and the ink IK accommodated inside the ink tank TK[m] decreases, a direction in which the ink IK decreases in the ink tank TK[m] is referred to as a Z1 direction. Further, in the present embodiment, as an example, it is assumed that the electrode rod DA1 is provided to extend in the Z1 direction and the electrode rod DA2 is provided to extend in the Z1 direction. Further, in the present embodiment, it is assumed that the electrode rod DA1 is disposed in an X1 direction orthogonal to the Z1 direction when viewed from the electrode rod DA2.

In the following, the Z1 direction and a Z2 direction opposite to the Z1 direction are collectively referred to as a Z axis direction. Further, in the following, the X1 direction along an X axis orthogonal to the Z axis direction and an X2 direction opposite to the X1 direction are collectively referred to as an X axis direction. Further, in the following, a Y1 direction along a Y axis orthogonal to the Z axis direction and the X axis direction, and a Y2 direction opposite to the Y1 direction are collectively referred to as a Y axis direction. In the present embodiment, it is assumed that the X axis, the Y axis, and the Z axis are orthogonal to each other. However, the present disclosure is not limited to such an embodiment. The X axis, the Y axis, and the Z axis may intersect each other.

Figure 3:
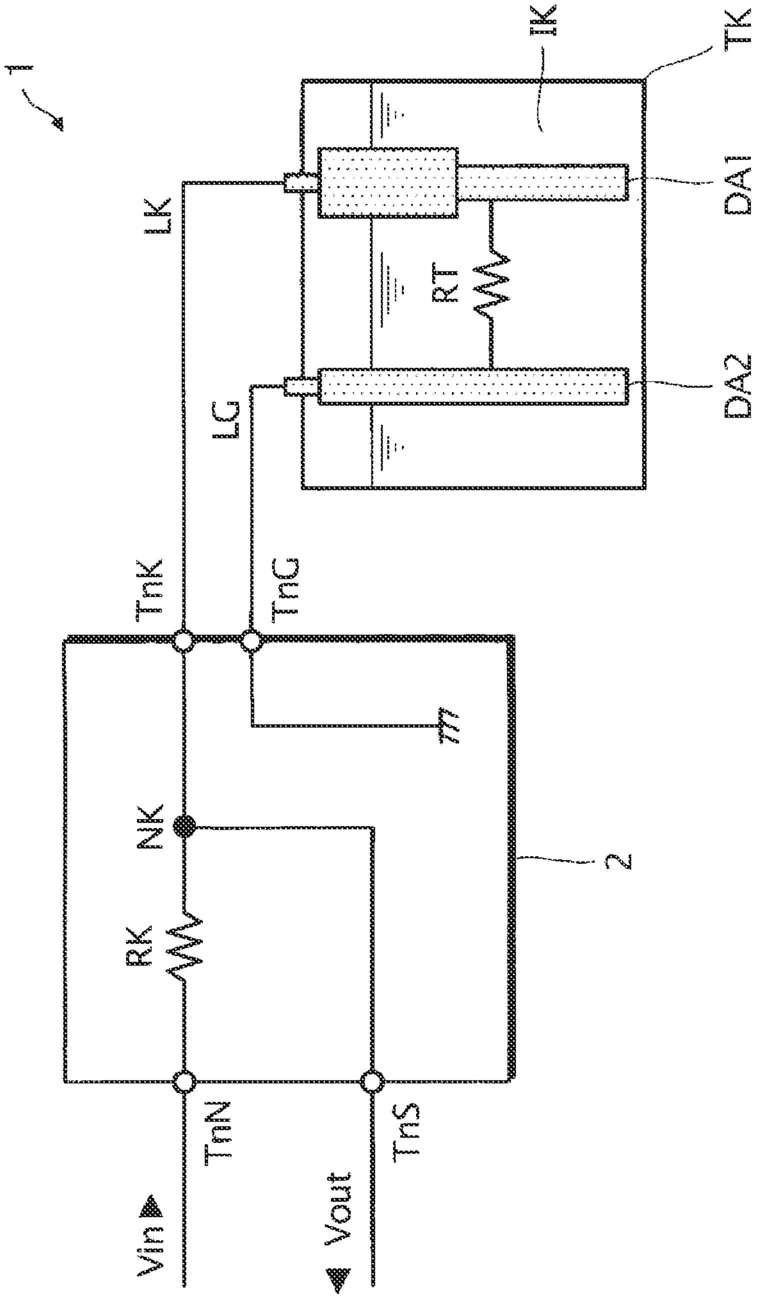
FIG. 3 is a circuit diagram illustrating an example of a configuration of an ink amount detection circuit.

FIG. 3 is a circuit diagram illustrating an example of a configuration of the ink amount detection circuit 2. In the present embodiment, it is assumed that the ink accommodating device 1 is provided with M ink amount detection circuits 2 that correspond one-to-one to the M ink tanks TK[1] to TK[M]. In the present embodiment, the ink amount detection circuit 2 is an example of a “detection portion”.

As illustrated in FIG. 3, the ink amount detection circuit 2 includes an input terminal TnN, a node NK, a resistor RK provided between the input terminal TnN and the node NK, a detection terminal TnK electrically coupled to the node NK, an output terminal TnS electrically coupled to the node NK, and a reference potential coupling terminal TnG electrically coupled to a wiring that is set to a ground potential. The detection terminal TnK is electrically coupled to the electrode rod DA1 via a wiring LK. The reference potential coupling terminal TnG is electrically coupled to the electrode rod DA2 via a wiring LG.

In the present embodiment, when the ink IK is accommodated in the ink tank TK[m] and the electrode rod DA1 and the electrode rod DA2 are in contact with the ink IK accommodated in the ink tank TK[m], the electrode rod DA1 and the electrode rod DA2 are electrically coupled via the ink IK accommodated in an ink tank TK[m]. That is, when the electrode rod DA1 and the electrode rod DA2 are in contact with the ink IK accommodated in the ink tank TK[m], the detection terminal TnK and the reference potential coupling terminal TnG are electrically coupled via the ink IK accommodated in the ink tank TK[m]. In the present embodiment, when the electrode rod DA1 and the electrode rod DA2 are electrically coupled via ink IK accommodated in the ink tank TK[m], a resistor included in the ink IK that electrically couples the electrode rod DA1 and electrode rod DA2 is referred to as an ink resistor RT.

In the present embodiment, an input signal Vin set to a constant input potential V0 is input to the input terminal TnN. Therefore, when the electrode rod DA1 and the electrode rod DA2 are electrically coupled via the ink IK accommodated in the ink tank TK[m], a potential of the node NK is determined based on the input potential V0 of the input signal Vin, a resistance value of the resistor RK, and a resistance value of the ink resistor RT. In the present embodiment, since the input potential V0 of the input signal Vin and the resistance value of the resistor RK are constant values, the potential of the node NK is determined based on the resistance value of the ink resistor RT. Further, the detection signal Vout indicating the potential of the node NK is output from the output terminal TnS.

Figure 4:
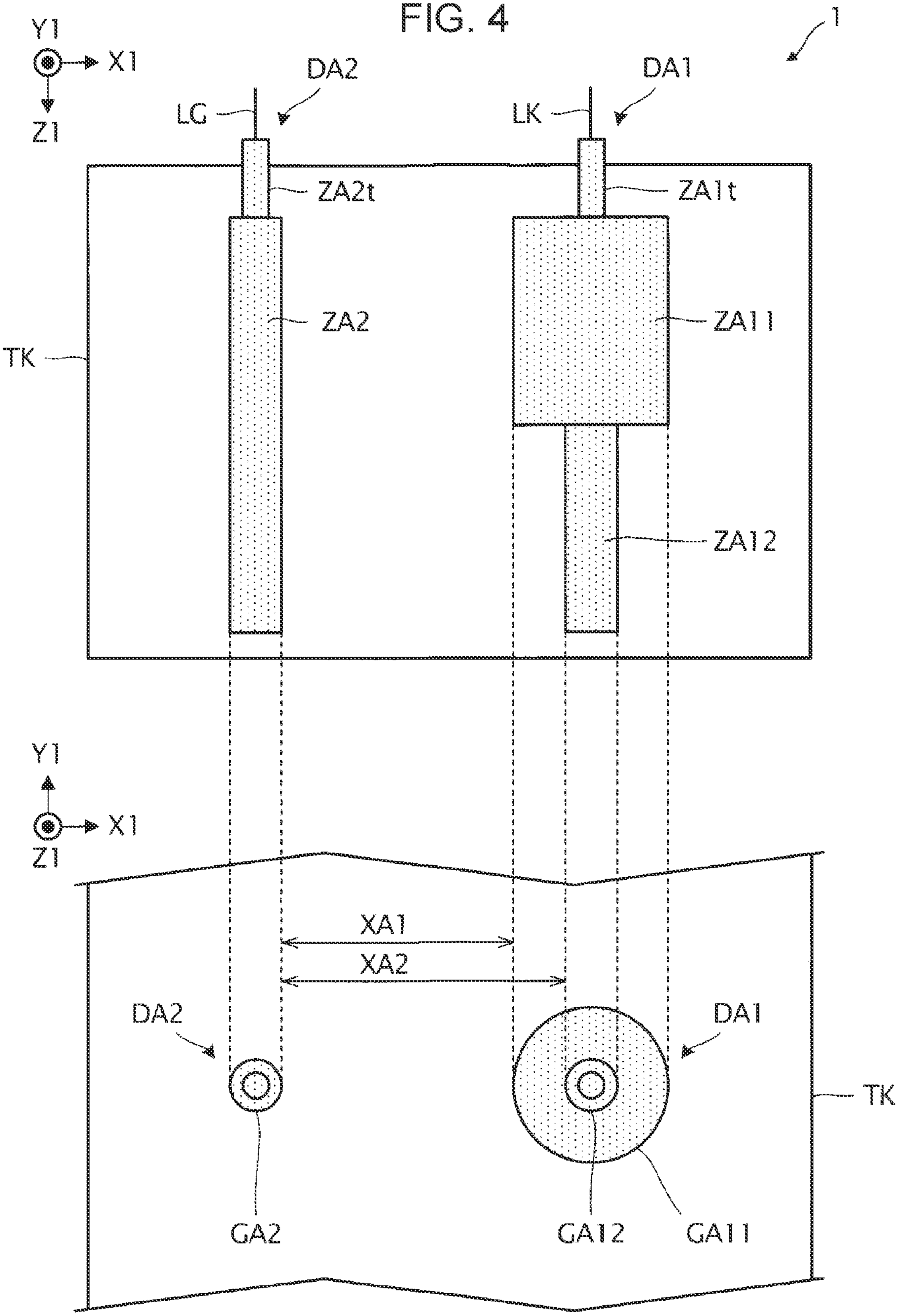
FIG. 4 is an explanatory diagram illustrating an example of a configuration of an electrode rod and an electrode rod.

FIG. 4 is a configuration diagram illustrating an example of a configuration of the electrode rod DA1 and the electrode rod DA2.

As illustrated in FIG. 4, the electrode rod DA1 includes a conductive electrode configuration part ZA11, a conductive electrode configuration part ZA12, and a conductive coupling part ZA1*t*.

The electrode configuration part ZA11 is a columnar-shaped electrode extending in the Z1 direction and having a substantially uniform thickness, and has an outer periphery GA11 with a length NA11 when cutting on a plane with the Z1 direction as a normal direction.

The electrode configuration part ZA12 is a columnar-shaped electrode extending in the Z1 direction and having a substantially uniform thickness, and has an outer periphery GA12 with a length NA12 when cutting on a plane with the Z1 direction as the normal direction. Here, the length NA12 is shorter than the length NA11. Further, the electrode configuration part ZA12 is positioned in the Z1 direction when viewed from the electrode configuration part ZA11 and is coupled to the electrode configuration part ZA11.

The coupling part ZA1*t* is positioned in the Z2 direction when viewed from the electrode configuration part ZA11, is coupled to the electrode configuration part ZA11, and is electrically coupled to the wiring LK. That is, the coupling part ZA1*t* electrically couples the electrode configuration part ZA11 and the wiring LK.

In the present specification, “substantially uniform” is a concept that includes a case of being completely uniform and a case where it can be regarded as uniform when an error is considered. Specifically, in the present specification, “substantially uniform” is a concept that includes a case where it can be regarded as uniform when an error of substantially 10% is considered. Similarly, in the present specification, “substantially the same” is a concept that includes a case of being completely the same and a case where it can be regarded as the same when an error is considered. Specifically, in the present specification, “substantially the same” is a concept that includes a case where it can be regarded as the same when an error of substantially 10% is considered. In the present specification, expression similar to “substantially uniform” or “substantially the same” is the same as “substantially uniform” and “substantially the same”.

The electrode rod DA2 is a columnar-shaped electrode extending in the Z1 direction and includes a conductive electrode configuration part ZA2 and a conductive coupling part ZA2*t*.

The electrode configuration part ZA2 is a columnar-shaped electrode extending in the Z1 direction and having a substantially uniform thickness, and has an outer periphery GA2 with a length NA2 when cutting on a plane with the Z1 direction as the normal direction.

The coupling part ZA2*t* is positioned in the Z2 direction when viewed from the electrode configuration part ZA2, is coupled to the electrode configuration part ZA2, and is electrically coupled to the wiring LG. That is, the coupling part ZA2*t* electrically couples the electrode configuration part ZA2 and the wiring LG.

As described above, in the present embodiment, it is assumed that the electrode configuration part ZA11 is positioned in the X1 direction when viewed from the electrode configuration part ZA2. In the following, a distance between the electrode configuration part ZA11 and the electrode configuration part ZA2 in the X1 direction is referred to as a distance XA1. Further, as described above, in the present embodiment, it is assumed that the electrode configuration part ZA12 is positioned in the X1 direction when viewed from the electrode configuration part ZA2. In the following, a distance between the electrode configuration part ZA12 and the electrode configuration part ZA2 in the X1 direction is referred to as a distance XA2. In the present embodiment, the distance XA2 is longer than the distance XA1.

Figure 5:
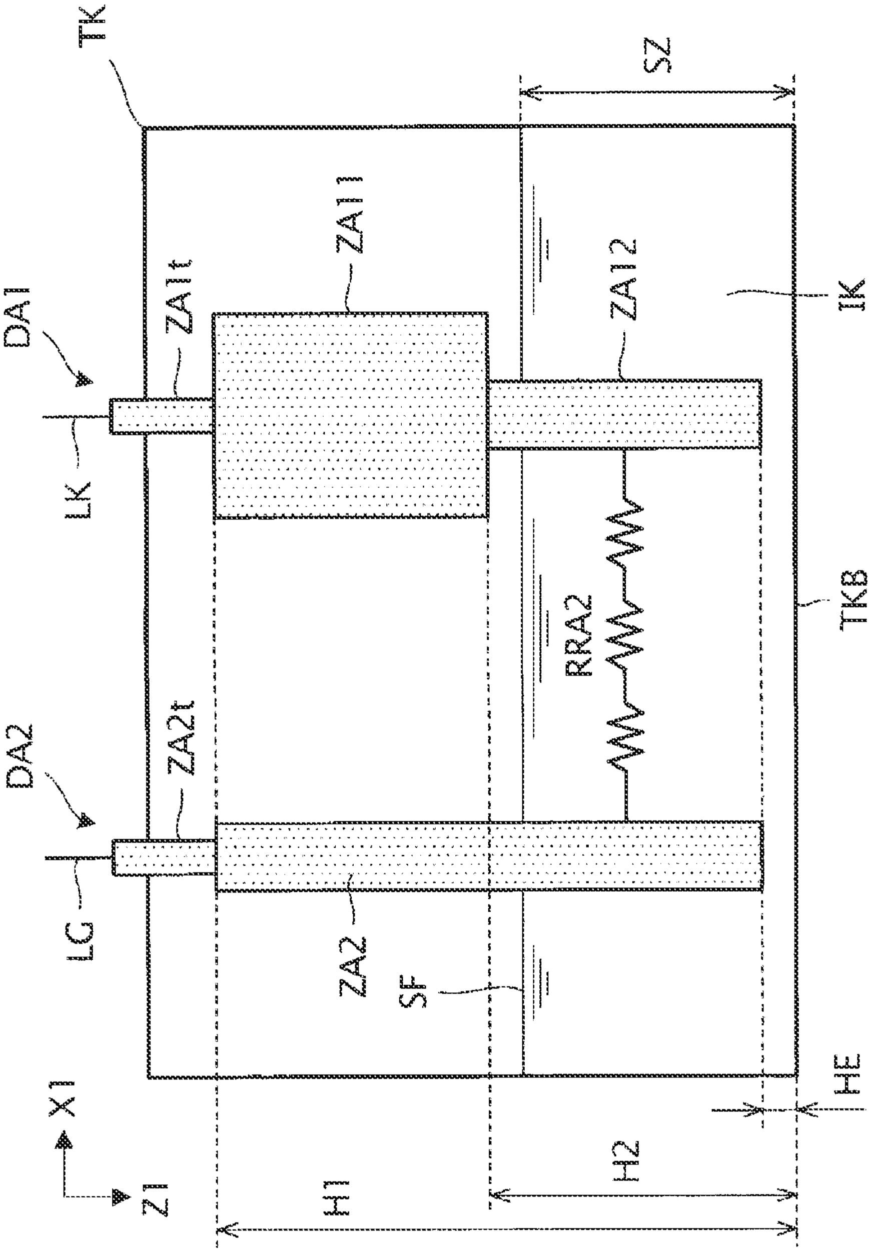
FIG. 5 is an explanatory diagram illustrating an example of an ink resistor.
Figure 6:
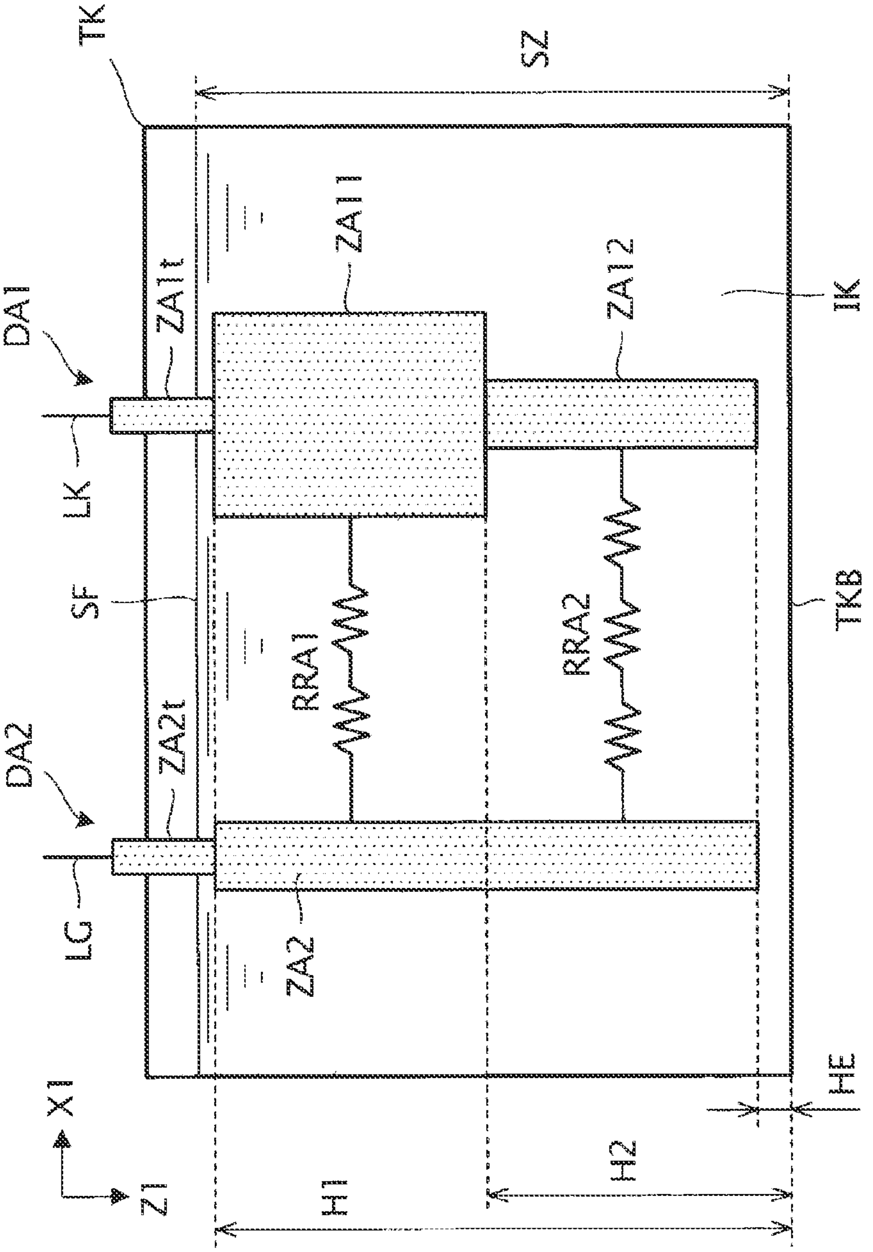
FIG. 6 is an explanatory diagram illustrating an example of the ink resistor.

FIGS. 5 and 6 are explanatory diagrams for explaining an example of the ink resistor RT formed between the electrode rod DA1 and the electrode rod DA2.

In the following, a distance from a bottom surface TKB of the ink tank TK[m] to a liquid level SF of the ink IK accommodated in the ink tank TK[m] in the Z axis direction is referred to as an ink liquid level distance SZ.

As illustrated in FIGS. 5 and 6, in the present embodiment, it is assumed that the electrode rod DA1 and the electrode rod DA2 are provided such that a distance, which is from an end portion of the electrode rod DA1 in the Z1 direction to the bottom surface TKB of the ink tank TK[m], in the Z axis direction and a distance, which is from an end portion of the electrode rod DA2 in the Z1 direction to the bottom surface TKB of the ink tank TK[m], in the Z axis direction become a distance HE. That is, in the present embodiment, it is assumed that the electrode rod DA1 and the electrode rod DA2 are provided such that a distance, which is from an end portion of the electrode configuration part ZA12 in the Z1 direction to the bottom surface TKB of the ink tank TK[m], in the Z axis direction and a distance, which is from an end portion of the electrode configuration part ZA2 in the Z1 direction to the bottom surface TKB of the ink tank TK[m], in the Z axis direction are substantially the same distance.

Further, in the present embodiment, it is assumed that the electrode rod DA1 is provided such that a distance, which is from an end portion of the electrode configuration part ZA11 in the Z1 direction to the bottom surface TKB of the ink tank TK[m], in the Z axis direction becomes a distance H2. Here, the distance H2 is a distance longer than the distance HE.

Further, in the present embodiment, it is assumed that the electrode rod DA1 and the electrode rod DA2 are provided such that a distance, which is from an end portion of the electrode configuration part ZA11 in the Z2 direction to the bottom surface TKB of the ink tank TK[m], in the Z axis direction and a distance, which is from an end portion of the electrode configuration part ZA2 in the Z2 direction to the bottom surface TKB of the ink tank TK[m], in the Z axis direction become a distance H1. Here, the distance H1 is a distance longer than the distance H2.

As illustrated in FIG. 6, when the ink IK is present between the electrode configuration part ZA11 and the electrode configuration part ZA2, that is, when the ink liquid level distance SZ is equal to or longer than the distance H2, the electrode configuration part ZA11 and the electrode configuration part ZA2 are electrically coupled through the ink IK. In the following, a resistor included in the ink IK that electrically couples the electrode configuration part ZA11 and the electrode configuration part ZA2 is referred to as a resistor RRA1.

As illustrated in FIGS. 5 and 6, when the ink IK is present between the electrode configuration part ZA12 and the electrode configuration part ZA2, that is, when the ink liquid level distance SZ is equal to or longer than the distance HE, the electrode configuration part ZA12 and the electrode configuration part ZA2 are electrically coupled through the ink IK. In the following, a resistor included in the ink IK that electrically couples the electrode configuration part ZA12 and the electrode configuration part ZA2 is referred to as a resistor RRA2.

When the ink liquid level distance SZ is equal to or longer than the distance HE and shorter than the distance H2, the resistor RRA2 becomes the above-described ink resistor RT.

Further, when the ink liquid level distance SZ is equal to or longer than the distance H2, a composite resistance of the resistor RRA1 and the resistor RRA2 when the resistor RRA1 and the resistor RRA2 are coupled in parallel is the ink resistor RT described above.

Figure 7:
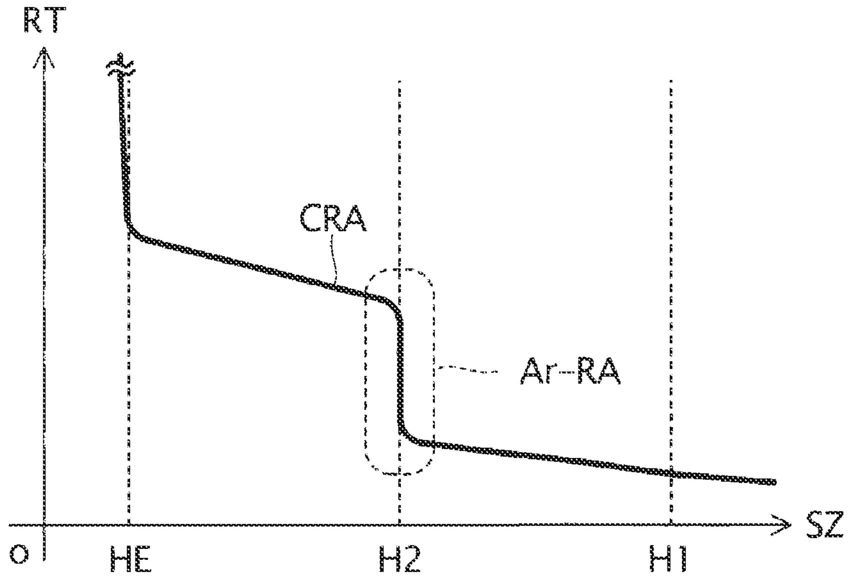
FIG. 7 is an explanatory diagram illustrating an example of a relationship between an ink liquid level distance and the ink resistor.

FIG. 7 is an explanatory diagram for explaining an example of a relationship between the ink liquid level distance SZ and the ink resistor RT. Specifically, FIG. 7 illustrates an example of a resistance value change curve CRA indicating a relationship between the ink liquid level distance SZ and the resistance value of the ink resistor RT when the horizontal axis is set to the ink liquid level distance SZ and the vertical axis is set to the resistance value of the ink resistor RT.

As described above, when the ink liquid level distance SZ is shorter than the distance HE, the electrode rod DA1 is not in contact with the ink IK, and the electrode rod DA2 is not in contact with the ink IK. That is, when the ink liquid level distance SZ is shorter than the distance HE, the electrode rod DA1 and the electrode rod DA2 are in a state of not being electrically coupled to each other. Therefore, as indicated by the resistance value change curve CRA in FIG. 7, when the ink liquid level distance SZ is shorter than the distance HE, the ink resistor RT has a large resistance value as compared with the case where the ink liquid level distance SZ is equal to or longer than the distance HE and the electrode rod DA1 and the electrode rod DA2 are electrically coupled through the ink IK.

Further, when the ink liquid level distance SZ is equal to or longer than the distance HE and shorter than the distance H2, the electrode configuration part ZA12 of the electrode rod DA1 is in contact with the ink IK, and the electrode configuration part ZA2 of the electrode rod DA2 is in contact with the ink IK. That is, when the ink liquid level distance SZ is equal to or longer than the distance HE and shorter than the distance H2, the ink resistor RT of the ink IK that electrically couples the electrode rod DA1 and the electrode rod DA2 becomes the resistor RRA2. The resistance value of the resistor RRA2 becomes smaller as a cross-sectional area becomes larger. Therefore, as indicated by the resistance value change curve CRA, when the ink liquid level distance SZ is equal to or longer than the distance HE and shorter than the distance H2, the ink resistor RT becomes smaller as the ink liquid level distance SZ becomes longer.

Further, when the ink liquid level distance SZ is equal to or longer than the distance H2, the electrode configuration part ZA11 and the electrode configuration part ZA12 of the electrode rod DA1 is in contact with the ink IK, and the electrode configuration part ZA2 of the electrode rod DA2 is in contact with the ink IK. That is, when the ink liquid level distance SZ is equal to or longer than the distance H2, the ink resistor RT of the ink IK that electrically couples the electrode rod DA1 and the electrode rod DA2 becomes the composite resistance of the resistor RRA1 and the resistor RRA2 when the resistor RRA1 and the resistor RRA2 are coupled in parallel.

The resistance value of the resistor RRA1 becomes smaller as a cross-sectional area becomes larger. Therefore, as indicated by the resistance value change curve CRA, when the ink liquid level distance SZ is equal to or longer than the distance H2, the ink resistor RT becomes smaller as the ink liquid level distance SZ becomes longer.

Further, a resistance value of the composite resistance of the resistor RRA1 and the resistor RRA2 when the resistor RRA1 and the resistor RRA2 are coupled in parallel is smaller than the resistance value of the resistor RRA2. Therefore, as indicated by the resistance value change curve CRA, when the ink liquid level distance SZ is equal to or longer than the distance H2, the ink resistor RT becomes smaller as compared with the case where the ink liquid level distance SZ is shorter than the distance H2.

In the present embodiment, the length NA11 of the outer periphery GA11 of the electrode configuration part ZA11 is longer than the length NA12 of the outer periphery GA12 of the electrode configuration part ZA12. In the present embodiment, the distance XA1 between the electrode configuration part ZA11 and the electrode configuration part ZA2 is shorter than the distance XA2 between the electrode configuration part ZA12 and the electrode configuration part ZA2. Therefore, as in the present embodiment, when the length NA11 is longer than the length NA12 and the distance XA1 is shorter than the distance XA2, the resistance value of the resistor RRA1 becomes smaller, for example, as compared with the case where the length NA11 and the length NA12 are the same length, and the distance XA1 and the distance XA2 are the same length. Therefore, in the present embodiment, the resistance value change curve CRA includes a change region Ar-RA where the ink resistor RT is changed greatly at a boundary between a case where the ink liquid level distance SZ is equal to or longer than the distance H2 and the composite resistance in which the resistor RRA1 and the resistor RRA2 are coupled in parallel is the ink resistor RT, and a case where the ink liquid level distance SZ is shorter than the distance H2 and only the resistor RRA2 is the ink resistor RT.

Figure 8:
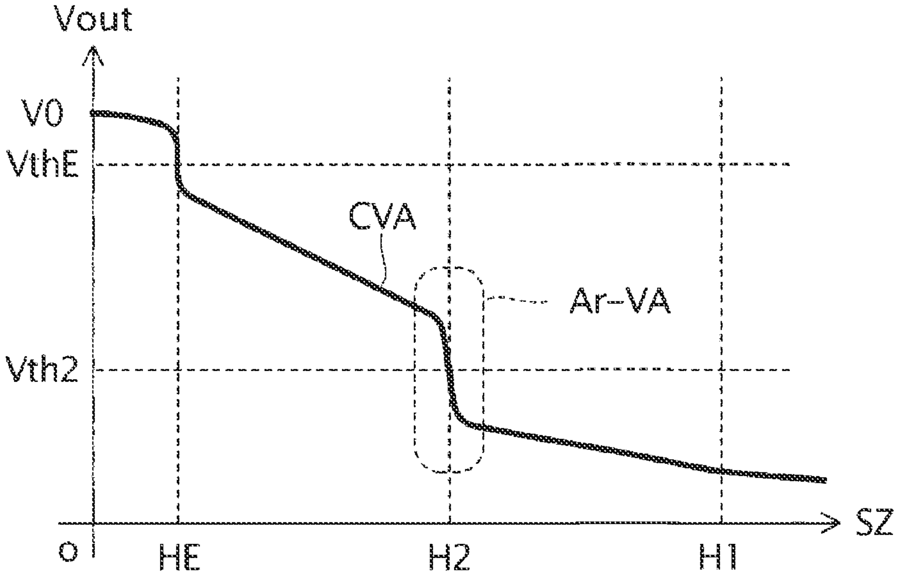
FIG. 8 is an explanatory diagram illustrating an example of a relationship between the ink liquid level distance and a detection signal.

FIG. 8 is an explanatory diagram for explaining an example of a relationship between the ink liquid level distance SZ and the detection signal Vout. Specifically, FIG. 8 illustrates an example of a potential change curve CVA indicating the relationship between the ink liquid level distance SZ in the ink tank TK[m] and a potential of the detection signal Vout when the horizontal axis is set to the ink liquid level distance SZ and the vertical axis is set to the potential of the detection signal Vout.

As described above, the potential of the detection signal Vout is determined based on the ink resistor RT. Specifically, when the resistance value of the ink resistor RT is large, the potential of the detection signal Vout also becomes high as compared with a case where the resistance value is small.

Therefore, as indicated by the potential change curve CVA in FIG. 8, when the ink liquid level distance SZ is equal to or longer than the distance HE, the detection signal Vout has a smaller resistance value as compared with the case where the ink liquid level distance SZ is shorter than the distance HE. Further, as indicated by the potential change curve CVA, when the ink liquid level distance SZ is equal to or longer than the distance H2, the detection signal Vout has a smaller resistance value as compared with the case where the ink liquid level distance SZ is shorter than the distance H2. That is, as indicated by the potential change curve CVA, the potential of the detection signal Vout becomes lower as the ink liquid level distance SZ becomes longer.

As described above, the resistance value change curve CRA includes the change region Ar-RA where a change rate of the resistance value of the ink resistor RT becomes larger with respect to a change in the ink liquid level distance SZ. Therefore, as illustrated in FIG. 8, the potential change curve CVA also includes a change region Ar-VA where a change rate of the potential of the detection signal Vout becomes larger with respect to the change in the ink liquid level distance SZ.

In the following, when a temperature of the ink IK in the ink tank TK[m] is a reference temperature t1 and when the ink liquid level distance SZ in the ink tank TK[m] is the distance HE, the potential indicated by the detection signal Vout is referred to as a threshold potential VthE. Further, in the following, when a temperature of the ink IK in the ink tank TK[m] is a reference temperature t1 and when the ink liquid level distance SZ in the ink tank TK[m] is the distance H2, the potential indicated by the detection signal Vout is referred to as a threshold potential Vth2.

Here, the reference temperature t1 is, for example, the temperature of the ink IK in the ink tank TK[m] when the ink jet printer 100 is used in the standard usage environment of the ink jet printer 100. Further, the reference temperature t1 may be, for example, an atmospheric temperature of the ink jet printer 100 when the ink jet printer 100 is used in the standard usage environment of the ink jet printer 100. Further, the reference temperature t1 may be, for example, a temperature of the standard usage environment of the ink IK.

In the present embodiment, the ink amount detection circuit 2 detects that a remaining amount of the ink IK in the ink tank TK[m] is less than a remaining amount of ink corresponding to the distance HE by outputting the detection signal Vout having a potential higher than the threshold potential VthE.

The remaining amount of ink corresponding to the distance HE is, for example, the minimum remaining amount of ink out of the remaining amount of ink in which the ink IK can be discharged from the liquid discharging head HU[m]. However, the remaining amount of ink corresponding to the distance HE may be, for example, a remaining amount of ink such that a difference with the minimum remaining amount of ink, of the remaining amount of ink in which the ink IK can be discharged from the liquid discharging head HU[m], is a predetermined amount. Here, the predetermined amount may be, for example, an amount less than the amount of ink necessary for the ink jet printer 100 to form an image on one sheet of medium PP and a remaining amount of ink in which the ink IK can be discharged a predetermined number of times from the liquid discharging head HU[m]. That is, the remaining amount of ink corresponding to the distance HE may be a remaining amount of ink corresponding to a so-called "ink end" state.

Further, the ink amount detection circuit 2 detects that the remaining amount of the ink IK in the ink tank TK[m] is less than a remaining amount of ink corresponding to the distance H2 and equal to or greater than the remaining amount of ink corresponding to the distance HE by outputting the detection signal Vout having a potential higher than the threshold potential Vth2 and equal to or lower than the threshold potential VthE.

The remaining amount of ink corresponding to the distance H2 is, for example, a remaining amount of ink in which the ink IK can be continuously discharged from the liquid discharging head HU[m] for predetermined time or longer. Here, the predetermined time may be, for example, time required for the ink jet printer 100 to form an image on one sheet of medium PP. Further, the predetermined time may be, for example, time required for the ink jet printer 100 to form an image on a predetermined number of media PP. That is, the remaining amount of ink corresponding to the distance HE may be a remaining amount of ink corresponding to a so-called "near end" state.

In the present embodiment, the control device 8 controls a notification device (not illustrated) such that the remaining amount of ink indicated by the detection signal Vout is notified to a user of the ink jet printer 100 by, for example, audio or video based on the detection signal Vout supplied from the ink accommodating device 1.

1.3. Ink Accommodating Device According to Reference Example

In the following, an overview of an ink accommodating device 1W according to a reference example will be explained with reference to FIGS. 9 to 13.

Figure 9:
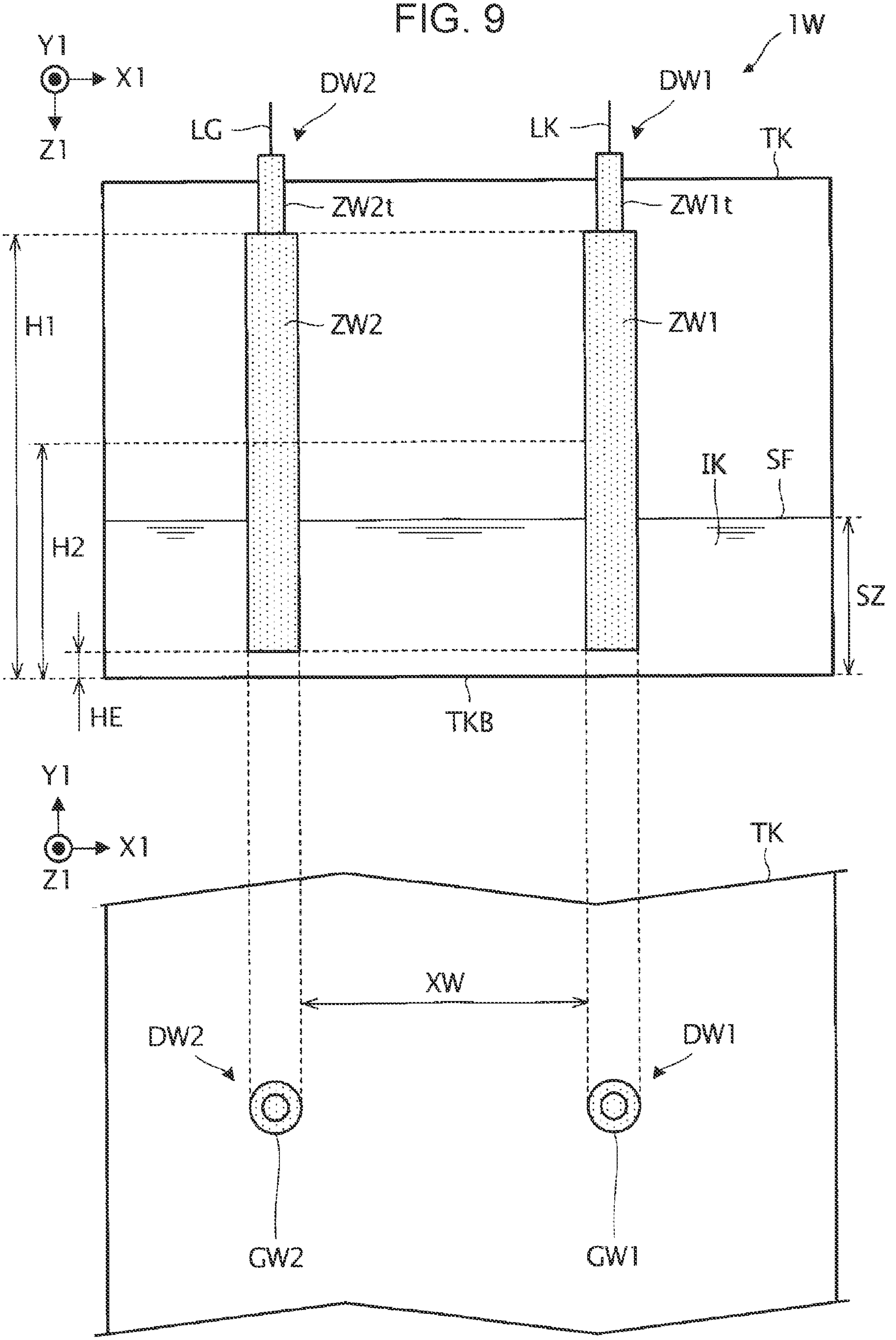
FIG. 9 is an explanatory diagram illustrating an example of a configuration of an electrode rod and an electrode rod according to a reference example.

FIG. 9 is a configuration diagram for explaining an example of a configuration of an electrode rod DW1 and an electrode rod DW2 provided in the ink accommodating device 1W. It is assumed that the ink accommodating device 1W is configured in the same manner as the ink accommodating device 1 according to the first embodiment regarding the ink tank TK[m] except that the electrode rod DW1 is accommodated instead of the electrode rod DA1, and the electrode rod DW2 is accommodated instead of the electrode rod DA2.

As illustrated in FIG. 9, the electrode rod DW1 is a columnar-shaped electrode extending in the Z1 direction and includes a conductive electrode configuration part ZW1 and a conductive coupling part ZW1*t*.

The electrode configuration part ZW1 is a columnar-shaped electrode extending in the Z1 direction and having a substantially uniform thickness, and has an outer periphery GW1 with a length NW1 when cutting on a plane with the Z1 direction as the normal direction. In the reference example, it is assumed that a length NW1 is substantially the same length as the length NA12 of the outer periphery GA12 of the electrode configuration part ZA12 according to the first embodiment.

The coupling part ZW1*t* is positioned in the Z2 direction when viewed from the electrode configuration part ZW1, is coupled to the electrode configuration part ZW1, and is electrically coupled to the wiring LK. That is, the coupling part ZW1*t* electrically couples the electrode configuration part ZW1 and the wiring LK.

The electrode rod DW2 is a columnar-shaped electrode extending in the Z1 direction and includes a conductive electrode configuration part ZW2 and a conductive coupling part ZW2*t*.

The electrode configuration part ZW2 is a columnar-shaped electrode extending in the Z1 direction and having a substantially uniform thickness, and has an outer periphery GW2 with a length NW2 when cutting on a plane with the Z1 direction as the normal direction. In the reference example, it is assumed that a length NW2 is substantially the same length as the length NA2 of the outer periphery GA2 of the electrode configuration part ZA2 according to the first embodiment.

The coupling part ZW2*t* is positioned in the Z2 direction when viewed from the electrode configuration part ZW2, is coupled to the electrode configuration part ZW2, and is electrically coupled to the wiring LG. That is, the coupling part ZW2*t* electrically couples the electrode configuration part ZW2 and the wiring LG.

In the reference example, it is assumed that the electrode configuration part ZW1 is positioned in the X1 direction when viewed from the electrode configuration part ZW2. In the following, a distance between the electrode configuration part ZW1 and the electrode configuration part ZW2 in the X1 direction is referred to as a distance XW. In the reference example, it is assumed that the distance XW is substantially the same length as the distance XA2 between the electrode configuration part ZA12 and the electrode configuration part ZA2 according to the first embodiment.

Further, in the reference example, it is assumed that the electrode rod DW1 and the electrode rod DW2 are provided such that a distance, which is from an end portion of the electrode configuration part ZW1 in the Z1 direction to the bottom surface TKB of the ink tank TK[m], and a distance, which is from an end portion of the electrode configuration part ZW2 in the Z1 direction to the bottom surface TKB of the ink tank TK[m], become a distance HE.

Further, in the reference example, it is assumed that the electrode rod DW1 and the electrode rod DW2 are provided such that a distance, which is from an end portion of the electrode configuration part ZW1 in the Z2 direction to the bottom surface TKB of the ink tank TK[m], and a distance, which is from an end portion of the electrode configuration part ZW2 in the Z2 direction to the bottom surface TKB of the ink tank TK[m], become a distance H1.

Figure 10:
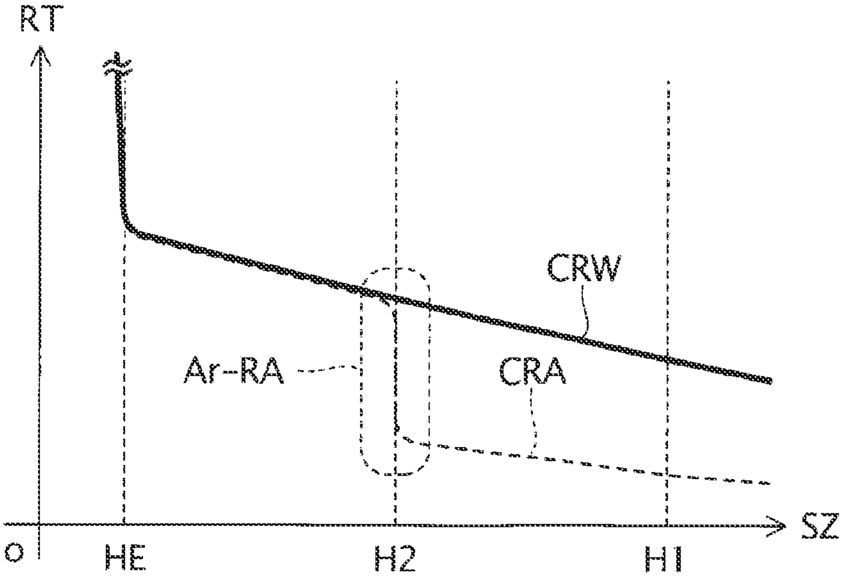
FIG. 10 is an explanatory diagram illustrating an example of a relationship between the ink liquid level distance and an ink resistor.

FIG. 10 is an explanatory diagram for explaining an example of a relationship between the ink liquid level distance SZ and an ink resistor RT according to the reference example. Specifically, FIG. 10 illustrates an example of a resistance value change curve CRW indicating a relationship between the ink liquid level distance SZ and a resistance value of the ink resistor RT according to the reference example when the horizontal axis is set to the ink liquid level distance SZ and the vertical axis is set to the resistance value of the ink resistor RT according to the reference example. Here, the ink resistor RT according to the reference example is a resistor included in the ink IK that electrically couples the electrode rod DW1 and the electrode rod DW2 when the electrode rod DW1 and the electrode rod DW2, which are accommodated in the ink tank TK[m], are electrically coupled via the ink IK accommodated in the ink tank TK[m]. In the following, in order to distinguish the ink resistor RT according to the first embodiment, the ink resistor RT according to the reference example may be referred to as an ink resistor RTW.

For convenience of description, FIG. 10 illustrates the resistance value change curve CRA with a broken line together with the resistance value change curve CRW.

As described above, in the reference example, when the ink liquid level distance SZ is shorter than the distance HE, the electrode rod DW1 is not in contact with the ink IK, and the electrode rod DW2 is not in contact with the ink IK. Therefore, as indicated by the resistance value change curve CRW in FIG. 10, when the ink liquid level distance SZ is shorter than the distance HE, the ink resistor RTW has a large resistance value as compared with the case where the electrode rod DW1 and the electrode rod DW2 are electrically coupled through the ink IK.

Further, when the ink liquid level distance SZ is equal to or longer than the distance HE, the electrode rod DW1 is in contact with the ink IK and the electrode rod DW2 is in contact with the ink IK. Therefore, as indicated by the resistance value change curve CRW, when the ink liquid level distance SZ is equal to or longer than the distance HE, the ink resistor RTW becomes smaller as the ink liquid level distance SZ becomes longer.

As described above, in the reference example, it is assumed that the electrode configuration part ZW1 has an outer periphery with substantially the same length as that of the electrode configuration part ZA12, the electrode configuration part ZW2 has an outer periphery with substantially the same length as that of the electrode configuration part ZA2, and the distance XW is substantially the same length as the distance XA2. Therefore, when the ink liquid level distance SZ is shorter than the distance H2, the resistance value change curve CRW has substantially the same shape as that of the resistance value change curve CRA according to the first embodiment.

Further, as described above, in the reference example, it is assumed that the electrode configuration part ZW1 and the electrode configuration part ZW2 are columnar-shaped electrodes having a substantially uniform thickness. That is, in the reference example, it is assumed that the electrode configuration part ZW1 has the outer periphery with a length shorter than that of the electrode configuration part ZA11, the electrode configuration part ZW2 has an outer periphery with substantially the same length as that of the electrode configuration part ZA2, and the distance XW is longer than the distance XA1. Therefore, when the ink liquid level distance SZ is equal to or longer than the distance H2, the resistance value change curve CRW indicates a potential higher than the potential indicated by the resistance value change curve CRA according to the first embodiment.

Further, the resistance value change curve CRW does not include a change region Ar-RA where the ink resistor RT is changed suddenly like the resistance value change curve CRA according to the first embodiment but includes a smooth shape in which the ink resistor RTW is continuously decreased as the ink liquid level distance SZ becomes longer.

Figure 11:
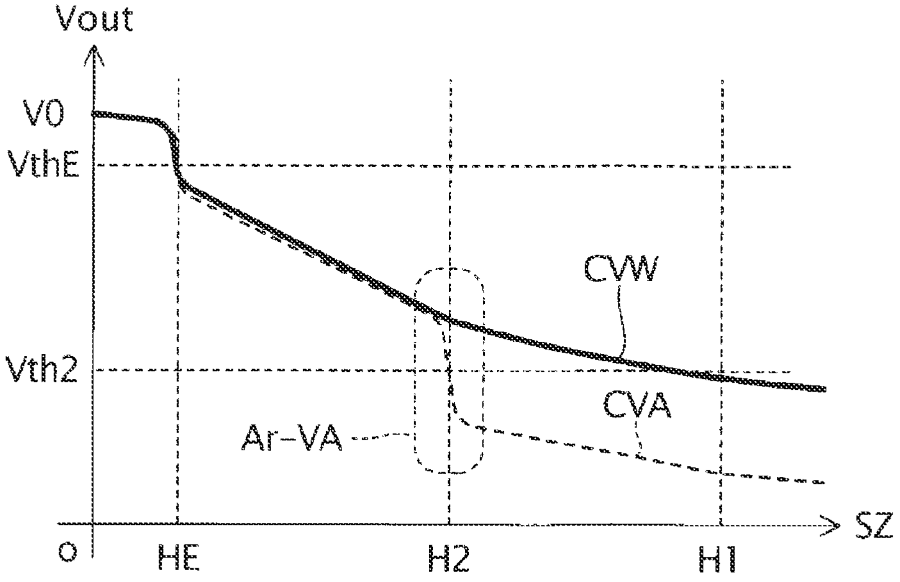
FIG. 11 is an explanatory diagram illustrating an example of a relationship between the ink liquid level distance and a detection signal.

FIG. 11 is an explanatory diagram for explaining an example of a relationship between the ink liquid level distance SZ and the detection signal Vout according to the reference example. Specifically, FIG. 11 illustrates an example of a potential change curve CVW indicating a relationship between the ink liquid level distance SZ and the potential of the detection signal Vout according to the reference example when the horizontal axis is set to the ink liquid level distance SZ and the vertical axis is set to the potential of the detection signal Vout according to the reference example. Here, the detection signal Vout according to the reference example is a detection signal Vout output by the ink accommodating device 1W. In the following, in order to distinguish the detection signal Vout according to the first embodiment, the detection signal Vout according to the reference example may be referred to as a detection signal Vout-W.

For convenience of description, FIG. 11 illustrates the potential change curve CVA with a broken line together with the potential change curve CVW.

As indicated by the potential change curve CVW in FIG. 11, the potential of the detection signal Vout-W becomes lower as the ink liquid level distance SZ becomes longer.

Further, as described above, the resistance value change curve CRW does not have a step as in the change region Ar-RA. Therefore, the potential change curve CVW does not include a change region Ar-VA where the detection signal Vout is changed suddenly like the potential change curve CVA according to the first embodiment but includes a smooth shape in which the detection signal Vout-W is continuously decreased as the ink liquid level distance SZ becomes longer.

Figure 12:
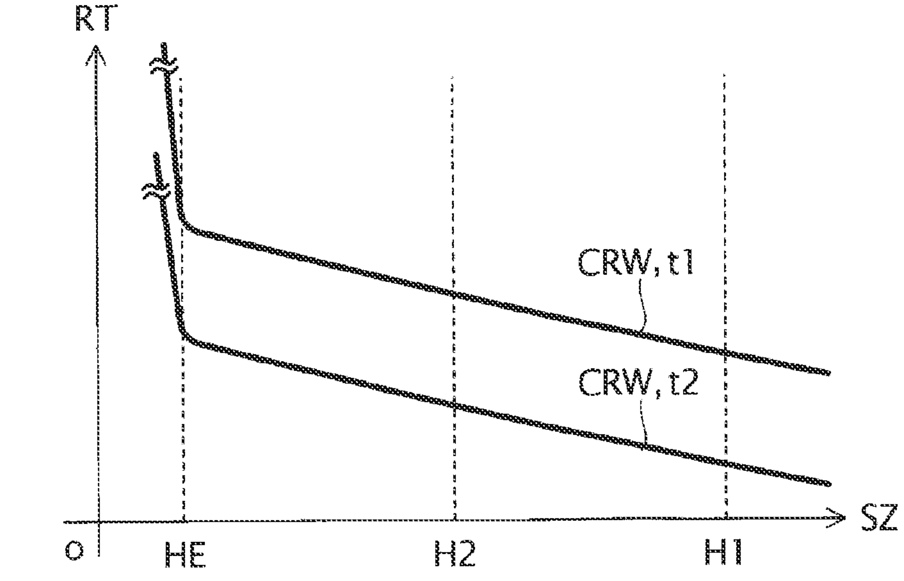
FIG. 12 is an explanatory diagram illustrating an example of a temperature change of a resistance value change curve.

FIG. 12 is an explanatory diagram for explaining a temperature change of the resistance value change curve CRW in accordance with a temperature change of the ink IK in the ink tank TK[m] according to the reference example.

Specifically, in FIG. 12, the resistance value change curve CRW when the temperature of the ink IK in the ink tank TK[m] is the reference temperature t1 is represented as a resistance value change curve CRW(t1), and the resistance value change curve CRW when the temperature of the ink IK in the ink tank TK[m] is a temperature t2 different from the reference temperature t1 is represented as a resistance value change curve CRW(t2). In FIG. 12, it is assumed that the resistance value change curve CRW(t1) is the same curve as the resistance value change curve CRW in FIG. 10.

As illustrated in FIG. 12, when the temperature of the ink IK in the ink tank TK[m] is changed, the resistance value indicated by the resistance value change curve CRW is also changed. Specifically, when the temperature of the ink IK in the ink tank TK[m] is changed from the reference temperature t1 to the temperature t2, the resistance value of the ink resistor RTW indicated by the resistance value change curve CRW is also changed. That is, when the ink liquid level distance SZ is the same value, the resistance value of the ink resistor RTW indicated by the resistance value change curve CRW(t1) and the resistance value of the ink resistor RTW indicated by the resistance value change curve CRW(t2) are different from each other.

Although FIG. 12 illustrates a case where the resistance value of the ink resistor RTW indicated by the resistance value change curve CRW is changed to a small value in accordance with the temperature change of the ink IK in the ink tank TK[m], the present disclosure is not limited to such embodiments. The resistance value of the ink resistor RTW indicated by the resistance value change curve CRW may be changed to a large value in accordance with the temperature change of the ink IK in the ink tank TK[m].

Figure 13:
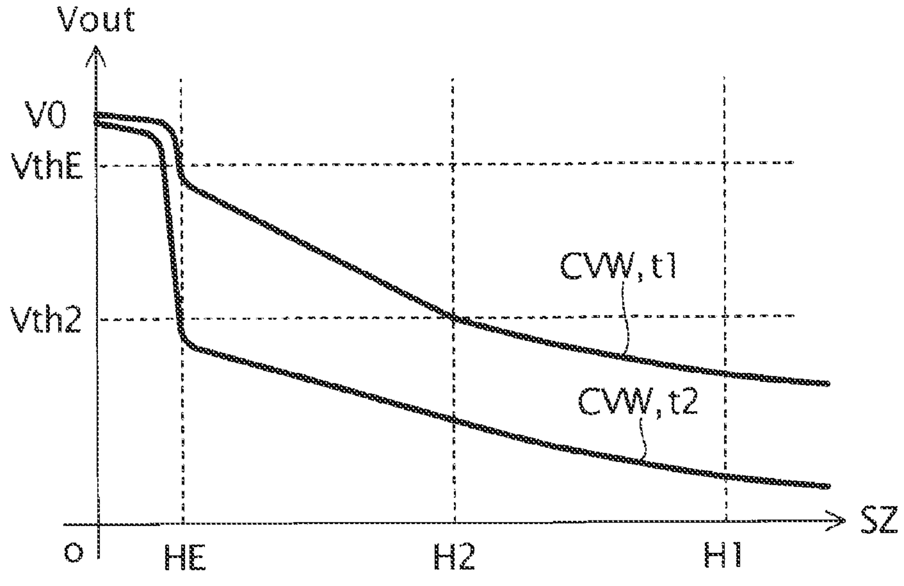
FIG. 13 is an explanatory diagram illustrating an example of a temperature change of a potential change curve.

FIG. 13 is an explanatory diagram for explaining a temperature change of the potential change curve CVW in accordance with the temperature change of the ink IK in the ink tank TK[m] according to the reference example.

Specifically, in FIG. 13, the potential change curve CVW when the temperature of the ink IK in the ink tank TK[m] is the reference temperature t1 is represented as a potential change curve CVW(t1), and the potential change curve CVW when the temperature of the ink IK in the ink tank TK[m] is the temperature t2 is represented as a potential change curve CVW(t2). In FIG. 13, it is assumed that the potential change curve CVW(t1) is the same curve as the potential change curve CVW in FIG. 11.

As illustrated in FIG. 13, when the temperature of the ink IK in the ink tank TK[m] is changed, the potential indicated by the potential change curve CVW is also changed. Specifically, when the temperature of the ink IK in the ink tank TK[m] is changed from the reference temperature t1 to the temperature t2, the potential of the detection signal Vout-W indicated by the potential change curve CVW is also changed. That is, when the ink liquid level distance SZ is the same value, the potential of the detection signal Vout-W indicated by the potential change curve CVW(t1) and the potential of the detection signal Vout-W indicated by the potential change curve CVW(t2) are different from each other.

Although FIG. 13 illustrates a case where the potential of the detection signal Vout-W indicated by the potential change curve CVW is changed to a small value in accordance with the temperature change of the ink IK in the ink tank TK[m], the present disclosure is not limited to such embodiments. The potential of the detection signal Vout-W indicated by the potential change curve CVW may be changed to a large value in accordance with the temperature change of the ink IK in the ink tank TK[m].

As described above, in the ink accommodating device 1W according to the reference example, even when there is no change in the remaining amount of the ink IK in the ink tank TK[m], the potential of the detection signal Vout-W output from the ink accommodating device 1W is changed in accordance with the temperature change of the ink IK in the ink tank TK[m]. Therefore, the ink accommodating device 1W according to the reference example may not be able to appropriately detect the remaining amount of the ink IK.

Specifically, in the example illustrated in FIG. 13, when the temperature of the ink IK in the ink tank TK[m] is the reference temperature t1, the ink accommodating device 1W detects that the remaining amount of the ink IK in the ink tank TK[m] is less than the remaining amount of ink corresponding to the distance HE by the fact that the potential of the detection signal Vout-W is a potential higher than the threshold potential VthE, and detects that the remaining amount of the ink IK in the ink tank TK[m] is less than the remaining amount of ink corresponding to the distance H2 by the fact that the potential of the detection signal Vout-W is a potential higher than the threshold potential Vth2. In other words, when the temperature of the ink IK in the ink tank TK[m] is the reference temperature t1, the ink accommodating device 1W detects that the remaining amount of the ink IK in the ink tank TK[m] is equal to or greater than the remaining amount of ink corresponding to the distance HE by the fact that the potential of the detection signal Vout-W is equal to or lower than the threshold potential VthE, and detects that the remaining amount of the ink IK in the ink tank TK[m] is equal to or greater than the remaining amount of ink corresponding to the distance H2 by the fact that the potential of the detection signal Vout-W is equal to or lower than the threshold potential Vth2.

However, in the example illustrated in FIG. 13, when the temperature of the ink IK in the ink tank TK[m] is the temperature t2, even when the potential of the detection signal Vout-W is equal to or lower than the threshold potential VthE, there is a possibility that the remaining amount of the ink IK in the ink tank TK[m] is less than the remaining amount of ink corresponding to the distance HE, and even when the potential of the detection signal Vout-W is equal to or lower than the threshold potential Vth2, there is a possibility that the remaining amount of the ink IK in the ink tank TK[m] is less than the remaining amount of ink corresponding to the distance H2.

Further, in the example illustrated in FIG. 13, when the temperature of the ink IK in the ink tank TK[m] is the temperature t2, even when the potential of the detection signal Vout-W is equal to or lower than the threshold potential Vth2, there is a possibility that the remaining amount of the ink IK in the ink tank TK[m] is less than the remaining amount of ink corresponding to the distance HE. That is, when the potential of the detection signal Vout-W is equal to or lower than the threshold potential Vth2 and when the remaining amount of the ink IK in the ink tank TK[m] is equal to or greater than the remaining amount of ink corresponding to the distance H2, although the user of the ink jet printer 100 is aware of this, in reality, there is a possibility that the remaining amount of the ink IK in the ink tank TK[m] is equal to or less than the remaining amount of ink corresponding to the distance HE.

That is, in the example illustrated in FIG. 13, when the temperature of the ink IK in the ink tank TK[m] is the temperature t2, it becomes difficult for the ink accommodating device 1W to understand the remaining amount of the ink IK in the ink tank TK[m] based on the potential of the detection signal Vout-W. That is, in the ink accommodating device 1W, there is a possibility that it is difficult to detect the remaining amount of the ink IK in the ink tank TK[m] based on the detection signal Vout-W.

In the ink accommodating device 1W, an embodiment can be considered in which the remaining amount of the ink IK in the ink tank TK[m] is detected based on the potential indicated by the corrected detection signal Vout-W by adding a temperature detection device that detects the temperature of the ink IK in the ink tank TK[m] and correcting the potential indicated by the detection signal Vout-W according to a detection result of the temperature detection device. However, in this case, there is a concern that the configuration of the ink accommodating device 1W is complicated as compared with the above-described first embodiment.

1.4. Effects of First Embodiment

Next, the effect of the present embodiment will be explained with reference to FIGS. 14 to 15.

Figure 14:
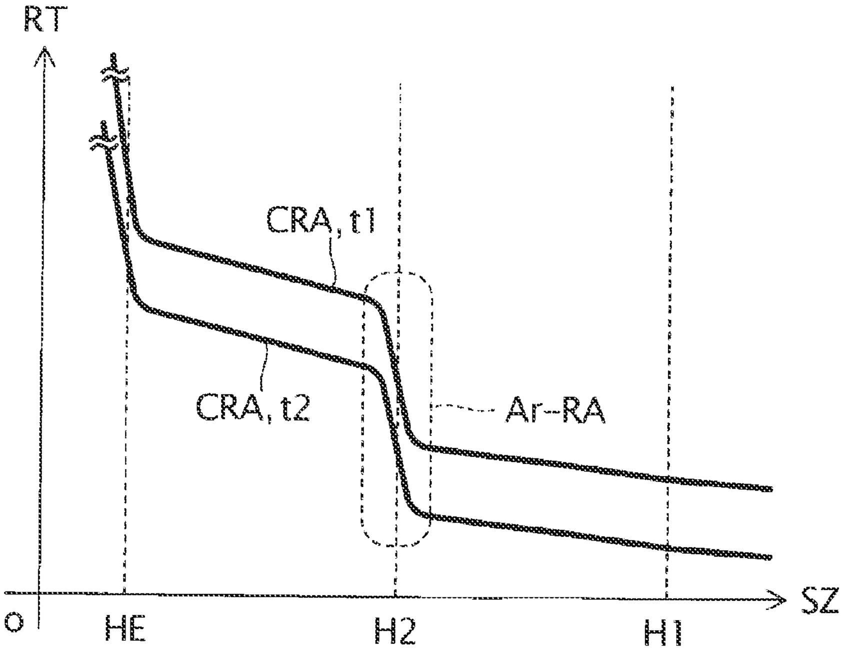
FIG. 14 is an explanatory diagram illustrating an example of a temperature change of a resistance value change curve.

FIG. 14 is an explanatory diagram for explaining a temperature change of the resistance value change curve CRA in accordance with the temperature change of the ink IK in the ink tank TK[m] according to the first embodiment.

Specifically, in FIG. 14, the resistance value change curve CRA when the temperature of the ink IK in the ink tank TK[m] is the reference temperature t1 is represented as a resistance value change curve CRA(t1), and the resistance value change curve CRA when the temperature of the ink IK in the ink tank TK[m] is the temperature t2 is represented as a resistance value change curve CRA(t2). In FIG. 14, it is assumed that the resistance value change curve CRA(t1) is the same curve as the resistance value change curve CRA in FIG. 7.

As illustrated in FIG. 14, when the temperature of the ink IK in the ink tank TK[m] is changed, the resistance value indicated by the resistance value change curve CRA is also changed. Specifically, when the temperature of the ink IK in the ink tank TK[m] is changed from the reference temperature t1 to the temperature t2, the resistance value of the ink resistor RT indicated by the resistance value change curve CRA is also changed. That is, when the ink liquid level distance SZ is the same value, the resistance value of the ink resistor RT indicated by the resistance value change curve CRA(t1) and the resistance value of the ink resistor RT indicated by the resistance value change curve CRA(t2) are different from each other.

Although FIG. 14 illustrates a case where the resistance value of the ink resistor RT indicated by the resistance value change curve CRA is changed to a small value in accordance with the temperature change of the ink IK in the ink tank TK[m], the present disclosure is not limited to such embodiments. The resistance value of the ink resistor RT indicated by the resistance value change curve CRA may be changed to a large value in accordance with the temperature change of the ink IK in the ink tank TK[m].

Figure 15:
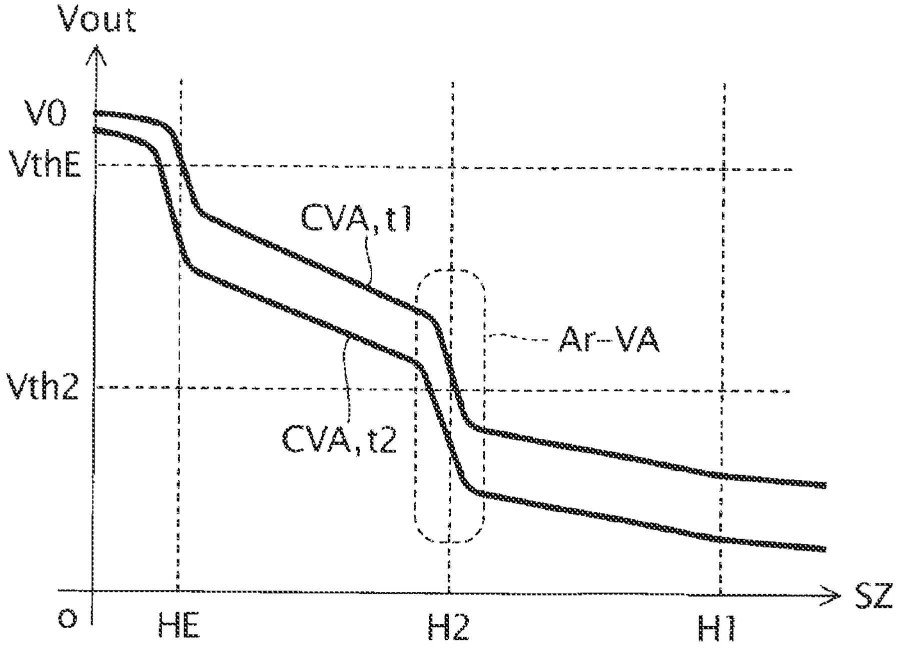
FIG. 15 is an explanatory diagram illustrating an example of a temperature change of a potential change curve.

FIG. 15 is an explanatory diagram for explaining a temperature change of the potential change curve CVA in accordance with the temperature change of the ink IK in the ink tank TK[m] according to the first embodiment.

Specifically, in FIG. 15, the potential change curve CVA when the temperature of the ink IK in the ink tank TK[m] is the reference temperature t1 is represented as a potential change curve CVA(t1), and the potential change curve CVA when the temperature of the ink IK in the ink tank TK[m] is the temperature t2 is represented as a potential change curve CVA(t2). In FIG. 15, it is assumed that the potential change curve CVA(t1) is the same curve as the potential change curve CVA in FIG. 8.

As illustrated in FIG. 15, when the temperature of the ink IK in the ink tank TK[m] is changed, the potential indicated by the potential change curve CVA is also changed. Specifically, when the temperature of the ink IK in the ink tank TK[m] is changed from the reference temperature t1 to the temperature t2, the potential of the detection signal Vout indicated by the potential change curve CVA is also changed. That is, when the ink liquid level distance SZ is the same value, the potential of the detection signal Vout indicated by the potential change curve CVA(t1) and the potential of the detection signal Vout indicated by the potential change curve CVA(t2) are different from each other.

Although FIG. 15 illustrates a case where the potential of the detection signal Vout indicated by the potential change curve CVA is changed to a small value in accordance with the temperature change of the ink IK in the ink tank TK[m], the present disclosure is not limited to such embodiments. The potential of the detection signal Vout indicated by the potential change curve CVA may be changed to a large value in accordance with the temperature change of the ink IK in the ink tank TK[m].

As described above, the resistance value change curve CRA according to the first embodiment includes the change region Ar-RA in a part where the ink liquid level distance SZ becomes the distance H2. That is, in the change region Ar-RA including the part where the ink liquid level distance SZ becomes the distance H2 in the resistance value change curve CRA, the resistance value of the ink resistor RT indicated by the resistance value change curve CRA is changed greatly. Therefore, a part of the change region Ar-RA included in the resistance value change curve CRA (t1) and a part of the change region Ar-RA included in the resistance value change curve CRA(t2) overlap each other in the vertical axis direction of the graph illustrated in FIG. 15.

As described above, the potential change curve CVA according to the first embodiment also includes the change region Ar-VA, which is a region where the potential of the detection signal Vout indicated by the potential change curve CVA is changed greatly in the part where the ink liquid level distance SZ becomes the distance H2. In the vertical axis direction of the graph illustrated in FIG. 16, the change region Ar-VA, which is included in the potential change curve CVA(t1), includes a part where the detection signal Vout becomes the threshold potential Vth2. That is, the change region Ar-VA included in the potential change curve CVA(t1) intersects a straight line "Vout=Vth2" in the graph illustrated in FIG. 16.

Figure 16:
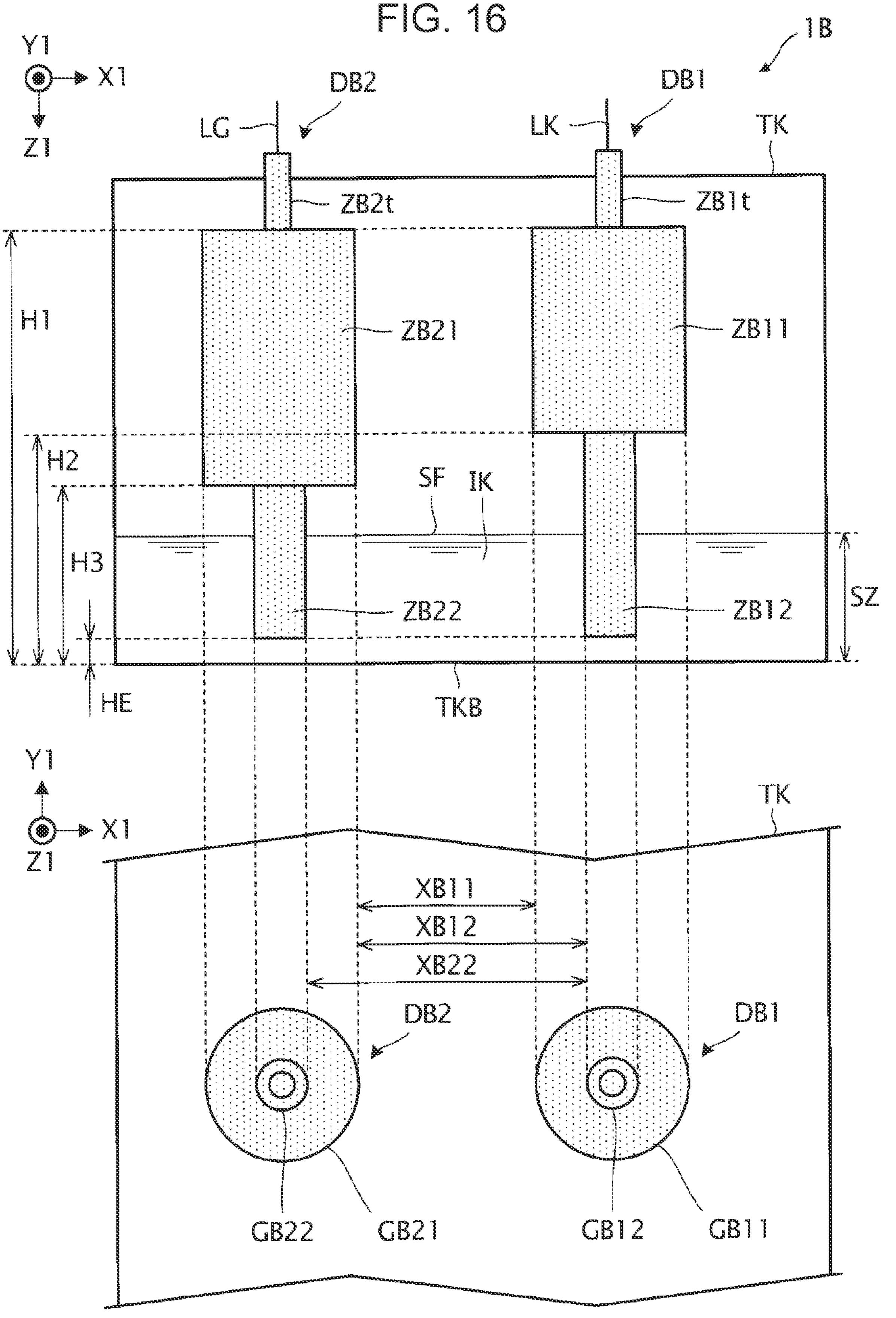
FIG. 16 is an explanatory diagram illustrating an example of a configuration of an electrode rod and an electrode rod according to a second embodiment.

Further, since the change region Ar-VA is a region where the potential of the detection signal Vout indicated by the potential change curve CVA is changed greatly, a part of the change region Ar-VA included in the potential change curve CVA(t1) and a part of the change region Ar-VA included in the potential change curve CVA(t2) overlap each other in the vertical axis direction of the graph shown in FIG. 16. Therefore, when a temperature difference between the reference temperature t1 and the temperature t2 is within a predetermined temperature difference, the change region Ar-VA, which is included in the potential change curve CVA(t2), also includes a part where the detection signal Vout becomes the threshold potential Vth2. That is, when the temperature difference between the reference temperature t1 and the temperature t2 is within the predetermined temperature difference, the change region Ar-VA included in the potential change curve CVA(t2) intersects the straight line "Vout=Vth2" in the graph illustrated in FIG. 16.

Here, the predetermined temperature difference may be, for example, a temperature difference between the temperature of the ink IK in the ink tank TK[m] and the reference temperature t1 when the ink jet printer 100 is used in the limited usage environment of the ink jet printer 100. Further, the predetermined temperature difference may be, for example, a temperature difference between the atmospheric temperature of the ink jet printer 100 and the reference temperature t1 when the ink jet printer 100 is used in the limited usage environment of the ink jet printer 100. Further, the predetermined temperature difference may be, for example, a temperature difference between the temperature of the limited usage environment of the ink IK and the reference temperature t1.

Therefore, according to the first embodiment, compared to the reference example, in addition to the case where the temperature of the ink IK in the ink tank TK[m] is the reference temperature t1, even when the temperature of the ink IK in the ink tank TK[m] is the temperature t2, there is high possibility that a detection is made that the remaining amount of the ink IK in the ink tank TK[m] is less than the remaining amount of ink corresponding to the distance HE by the fact that the potential of the detection signal Vout is a potential higher than the threshold potential VthE, and a detection is made that the remaining amount of the ink IK in the ink tank TK[m] is less than the remaining amount of ink corresponding to the distance H2 by the fact that the potential of the detection signal Vout is a potential higher than the threshold potential Vth2. According to the first embodiment, compared to the reference example, even when the potential of the detection signal Vout is equal to or lower than the threshold potential VthE, the possibility of erroneous detection can be reduced in which the remaining amount of the ink IK in the ink tank TK[m] is less than the remaining amount of ink corresponding to the distance HE, and even when the potential of the detection signal Vout is equal to or lower than the threshold potential Vth2, the possibility of erroneous detection can be reduced in which the remaining amount of ink IK in the ink tank TK[m] is less than the remaining amount of ink corresponding to the distance H2.

That is, according to the ink accommodating device 1 of the first embodiment, compared to the ink accommodating device 1W according to the reference example, the remaining amount of the ink IK in the ink tank TK[m] can be accurately detected based on the detection signal Vout.

In the present embodiment, although a description is made by exemplifying the case where change occurs in the resistance value of the ink resistor RT due to the temperature change of the ink IK in the ink tank TK[m], and as a result, change occurs in the potential of the detection signal Vout indicated by the potential change curve CVA, the present disclosure is not limited to such an embodiment. The present embodiment can be applied to any case where fluctuation occurs in the potential of the detection signal Vout indicated by the potential change curve CVA.

For example, according to the present embodiment, even when change occurs in the potential of the detection signal Vout indicated by the potential change curve CVA due to deterioration or modification of the ink IK in the ink tank TK[m], compared to the reference example, the remaining amount of the ink IK in the ink tank TK[m] can be accurately detected based on the detection signal Vout. Further, according to the present embodiment, even when change occurs in the potential of the detection signal Vout indicated by the potential change curve CVA due to noise being superimposed on the detection signal Vout, compared to the reference example, the remaining amount of the ink IK in the ink tank TK[m] can be accurately detected based on the detection signal Vout.

1.5. Conclusion of First Embodiment

As described above, the ink jet printer 100 according to the present embodiment includes: the ink tank TK[m] accommodating the conductive ink IK; the rod-shaped electrode rod DA1 accommodated in the ink tank TK[m]; the rod-shaped electrode rod DA2 accommodated in the ink tank TK[m]; the ink amount detection circuit 2 that is electrically coupled to the electrode rod DA1 and the electrode rod DA2 and that detects the remaining amount of the ink IK accommodated in the ink tank TK[m] in response to the electric signal from at least one of the electrode rod DA1 and the electrode rod DA2; and the liquid discharging head HU[m] discharging the ink IK supplied from the ink tank TK[m], in which the electrode rod DA1 includes the electrode configuration part ZA11 having the outer periphery GA11 with the length NA11 and the electrode configuration part ZA12 having the outer periphery GA12 with the length NA12 that is shorter than the length NA11.

In the present embodiment, the electrode rod DA1 is an example of a "first electrode", the electrode rod DA2 is an example of a "second electrode", the electrode configuration part ZA11 is an example of a "first part", the electrode configuration part ZA12 is an example of a "second part", the length NA11 is an example of a "first length", and the length NA12 is an example of a "second length".

As described above, in the present embodiment, since the electrode rod DA1 includes the electrode configuration part ZA11 having the outer periphery GA11 with the length NA11 and the electrode configuration part ZA12 having the outer periphery GA12 with the length NA12 that is shorter than the length NA11, as compared with the embodiment in which the electrode rod DA1 has a uniform thickness, it is possible to cause large change in the signal levels of the electric signals from the electrode rod DA1 and the electrode rod DA2 in accordance with the change in the amount of the ink IK accommodated in the ink tank TK[m]. That is, according to the present embodiment, as compared with the embodiment in which the electrode rod DA1 has a uniform thickness, a degree of difference between the signal level of the electric signal when a liquid level SF of the ink IK is in contact with the electrode configuration part ZA11 and the signal level of the electric signal when the liquid level SF of the ink IK is in contact with the electrode configuration part ZA12 can be increased. Therefore, according to the present embodiment, as compared with the embodiment in which the outer periphery of the electrode rod DA1 has a uniform length, the remaining amount of the ink IK accommodated in the ink tank TK[m] can be accurately detected.

Further, in the ink jet printer 100 according to the present embodiment, the electrode configuration part ZA11 has a columnar shape, and the electrode configuration part ZA12 has a columnar shape.

That is, according to the present embodiment, the electrode rod DA1 includes the columnar-shaped electrode configuration part ZA11 having the outer periphery GA11 with the length NA11 and the columnar-shaped electrode configuration part ZA12 having the outer periphery GA12 with the length NA12. Therefore, according to the present embodiment, as compared with the embodiment in which the electrode rod DA1 has a uniform thickness, a degree of difference between the signal level of the electric signal when a liquid level SF of the ink IK is in contact with the electrode configuration part ZA11 and the signal level of the electric signal when the liquid level SF of the ink IK is in contact with the electrode configuration part ZA12 can be increased.

Further, in the ink jet printer 100 according to the present embodiment, the remaining amount of the ink IK, which is detected by the ink amount detection circuit 2 when the electrode rod DA2 and the electrode configuration part ZA11 are not electrically coupled via the ink IK in the ink tank TK[m] and when the electrode rod DA2 and the electrode configuration part ZA12 are electrically coupled via the ink IK in the ink tank TK[m], is less than the remaining amount of the ink IK, which is detected by the ink amount detection circuit 2 when the electrode rod DA2 and the electrode configuration part ZA11 are electrically coupled via the ink IK in the ink tank TK[m], and is greater than the remaining amount of the ink IK, which is detected by the ink amount detection circuit 2 when the electrode rod DA2 and the electrode configuration part ZA11 are not electrically coupled via the ink IK in the ink tank TK[m] and when the electrode rod DA2 and the electrode configuration part ZA12 are not electrically coupled via the ink IK in the ink tank TK[m].

Therefore, according to the present embodiment, the remaining amount of the ink IK in the ink tank TK[m] can be detected at least in three stages.

2. Second Embodiment

In the following, an ink jet printer according to a second embodiment will be explained with reference to FIGS. 16 to 18. In each embodiment illustrated below, elements whose actions and functions are similar to those of the first embodiment will be denoted by the same reference numerals used in the description of the first embodiment and detailed description thereof will be omitted as appropriate.

2.1. Ink Jet Printer According to Second Embodiment

The ink jet printer according to the second embodiment differs from the ink jet printer 100 according to the first embodiment in that an ink accommodating device 1B is provided instead of the ink accommodating device 1.

FIG. 16 is a configuration diagram for explaining an example of a configuration of an electrode rod DB1 and an electrode rod DB2 provided in the ink accommodating device 1B. It is assumed that the ink accommodating device 1B is configured in the same manner as the ink accommodating device 1 according to the first embodiment regarding the ink tank TK[m] except that the electrode rod DB1 is accommodated instead of the electrode rod DA1, and the electrode rod DB2 is accommodated instead of the electrode rod DA2.

As illustrated in FIG. 16, the electrode rod DB1 includes a conductive electrode configuration part ZB11, a conductive electrode configuration part ZB12, and a conductive coupling part ZB1*t*.

The electrode configuration part ZB11 is a columnar-shaped electrode extending in the Z1 direction and having a substantially uniform thickness, and has an outer periphery GB11 with a length NB11 when cutting on a plane with the Z1 direction as the normal direction.

The electrode configuration part ZB12 is a columnar-shaped electrode extending in the Z1 direction and having a substantially uniform thickness, and has an outer periphery GB12 with a length NB12 when cutting on a plane with the Z1 direction as the normal direction. Here, the length NB12 is shorter than the length NB11. In the second embodiment, it is assumed that the length NB12 is substantially the same length as the length NW1 according to the reference example. Further, the electrode configuration part ZB12 is positioned in the Z1 direction when viewed from the electrode configuration part ZB11 and is coupled to the electrode configuration part ZB11.

The coupling part ZB1*t* is positioned in the Z2 direction when viewed from the electrode configuration part ZB11, is coupled to the electrode configuration part ZB11, and is electrically coupled to the wiring LK. That is, the coupling part ZB1*t* electrically couples the electrode configuration part ZB11 and the wiring LK.

The electrode rod DB2 includes a conductive electrode configuration part ZB21, a conductive electrode configuration part ZB22, and a conductive coupling part ZB2*t*.

The electrode configuration part ZB21 is a columnar-shaped electrode extending in the Z1 direction and having a substantially uniform thickness, and has an outer periphery GB21 with a length NB21 when cutting on a plane with the Z1 direction as the normal direction.

The electrode configuration part ZB22 is a columnar-shaped electrode extending in the Z1 direction and having a substantially uniform thickness, and has an outer periphery GB22 with a length NB22 when cutting on a plane with the Z1 direction as the normal direction. Here, the length NB22 is shorter than the length NB21. In the second embodiment, it is assumed that the length NB22 is substantially the same length as the length NW2 according to the reference example. Further, the electrode configuration part ZB22 is positioned in the Z1 direction when viewed from the electrode configuration part ZB21 and is coupled to the electrode configuration part ZB21.

The coupling part ZB2*t* is positioned in the Z2 direction when viewed from the electrode configuration part ZB21, is coupled to the electrode configuration part ZB21, and is electrically coupled to the wiring LK. That is, the coupling part ZB2*t* electrically couples the electrode configuration part ZB21 and the wiring LK.

Further, in the second embodiment, it is assumed that the electrode rod DB1 and the electrode rod DB2 are provided such that a distance, which is from an end portion of the electrode rod DB1 in the Z1 direction to the bottom surface TKB of the ink tank TK[m], in the Z axis direction and a distance, which is from an end portion of the electrode rod DB2 in the Z1 direction to the bottom surface TKB of the ink tank TK[m], in the Z axis direction become a distance HE.

Further, in the second embodiment, it is assumed that the electrode rod DB2 is provided such that a distance, which is from an end portion of the electrode configuration part ZB21 in the Z1 direction to the bottom surface TKB of the ink tank TK[m], in the Z axis direction becomes a distance H3. Here, the distance H3 is a distance that is longer than the distance HE and shorter than the distance H2.

Further, in the second embodiment, it is assumed that the electrode rod DB1 is provided such that a distance, which is from an end portion of the electrode configuration part ZB11 in the Z1 direction to the bottom surface TKB of the ink tank TK[m], in the Z axis direction becomes a distance H2.

Further, in the second embodiment, it is assumed that the electrode rod DB1 and the electrode rod DB2 are provided such that a distance, which is from an end portion of the electrode configuration part ZB11 in the Z2 direction to the bottom surface TKB of the ink tank TK[m], in the Z axis direction and a distance, which is from an end portion of the electrode configuration part ZB21 in the Z2 direction to the bottom surface TKB of the ink tank TK[m], in the Z axis direction become a distance H1.

Further, in the second embodiment, it is assumed that the electrode rod DB1 is positioned in the X1 direction when viewed from the electrode rod DB2. In the following, a distance between the electrode configuration part ZB11 and the electrode configuration part ZB21 in the X1 direction is referred to as a distance XB11, a distance between the electrode configuration part ZB12 and the electrode configuration part ZB21 in the X1 direction is referred to as a distance XB12, and a distance between the electrode configuration part ZB12 and the electrode configuration part ZB22 in the X1 direction is referred to as a distance XB22. In the present embodiment, the distance XB22 is longer than the distance XB12, and the distance XB12 is longer than the distance XB11. In the second embodiment, it is assumed that the distance XB22 is substantially the same length as the distance XW according to the reference example.

Figure 17:
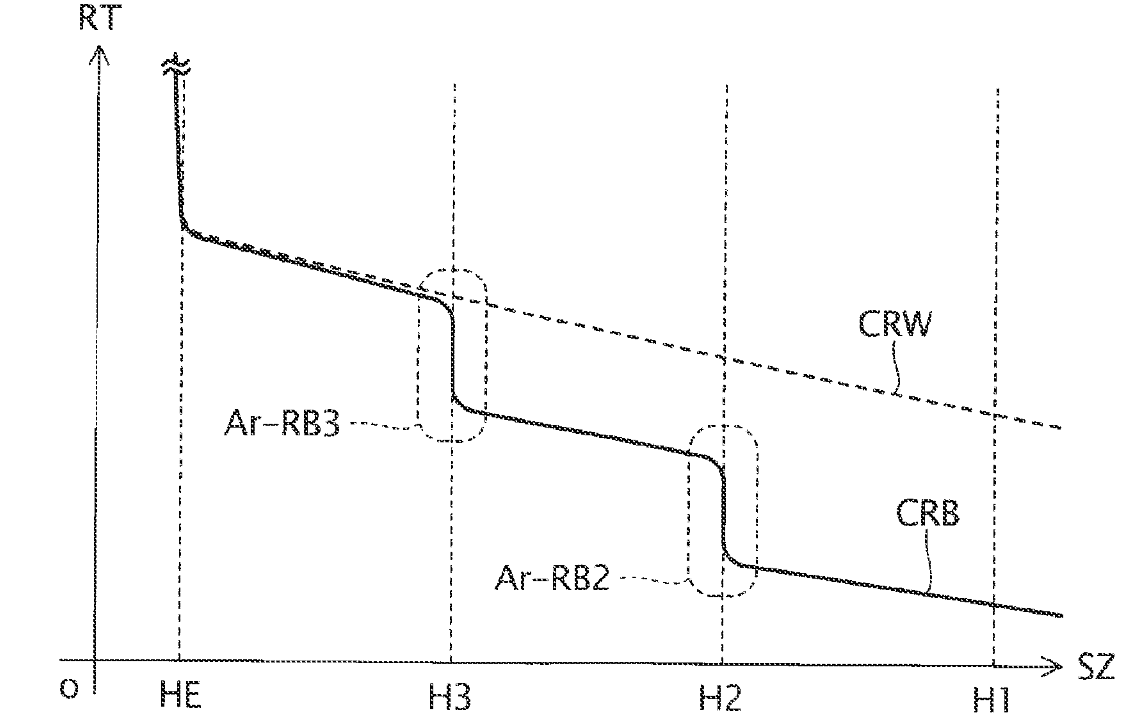
FIG. 17 is an explanatory diagram illustrating an example of a relationship between the ink liquid level distance and an ink resistor.

FIG. 17 is an explanatory diagram for explaining an example of a relationship between the ink liquid level distance SZ and an ink resistor RT according to the second embodiment. Specifically, FIG. 17 illustrates an example of a resistance value change curve CRB indicating a relationship between the ink liquid level distance SZ and a resistance value of the ink resistor RT according to the second embodiment when the horizontal axis is set to ink liquid level distance SZ and the vertical axis is set to the resistance value of the ink resistor RT according to the second embodiment. Here, the ink resistor RT according to the second embodiment is a resistor included in the ink IK that electrically couples the electrode rod DB1 and the electrode rod DB2 when the electrode rod DB1 and the electrode rod DB2, which are accommodated in the ink tank TK[m], are electrically coupled via the ink IK accommodated in the ink tank TK[m]. In the following, in order to distinguish the ink resistor RT according to the first embodiment, the ink resistor RT according to the second embodiment may be referred to as an ink resistor RTB.

For convenience of description, FIG. 17 illustrates the resistance value change curve CRW with a broken line together with the resistance value change curve CRB.

As described above, when the ink liquid level distance SZ is equal to or longer than the distance HE, the electrode configuration part ZB12 is in contact with the ink IK and the electrode configuration part ZB22 is in contact with the ink IK. Therefore, as indicated by the resistance value change curve CRB in FIG. 17, when the ink liquid level distance SZ is equal to or longer than the distance HE, the ink resistor RTB becomes a small resistance value as compared with the case where the ink liquid level distance SZ is shorter than the distance HE.

Further, when the ink liquid level distance SZ is equal to or longer than the distance H3, the electrode configuration part ZB21 is in contact with the ink IK. Therefore, the resistance value change curve CRB includes a change region Ar-RB3 where the ink resistor RTB is changed greatly in a part where the ink liquid level distance SZ becomes the distance H3. As indicated by the resistance value change curve CRB, when the ink liquid level distance SZ is equal to or longer than the distance H3, the ink resistor RTB becomes a small resistance value as compared with the case where the ink liquid level distance SZ is shorter than the distance H3.

Further, when the ink liquid level distance SZ is equal to or longer than the distance H2, the electrode configuration part ZB11 is in contact with the ink IK. Therefore, the resistance value change curve CRB includes a change region Ar-RB2 where the ink resistor RTB is changed greatly in a part where the ink liquid level distance SZ becomes the distance H2. As indicated by the resistance value change curve CRB, when the ink liquid level distance SZ is equal to or longer than the distance H2, the ink resistor RTB becomes a small resistance value as compared with the case where the ink liquid level distance SZ is shorter than the distance H2.

The resistance value of the ink resistor RTB becomes smaller as a cross-sectional area becomes larger. Therefore, as indicated by the resistance value change curve CRB, the ink resistor RTB becomes smaller as the ink liquid level distance SZ becomes longer.

Figure 18:
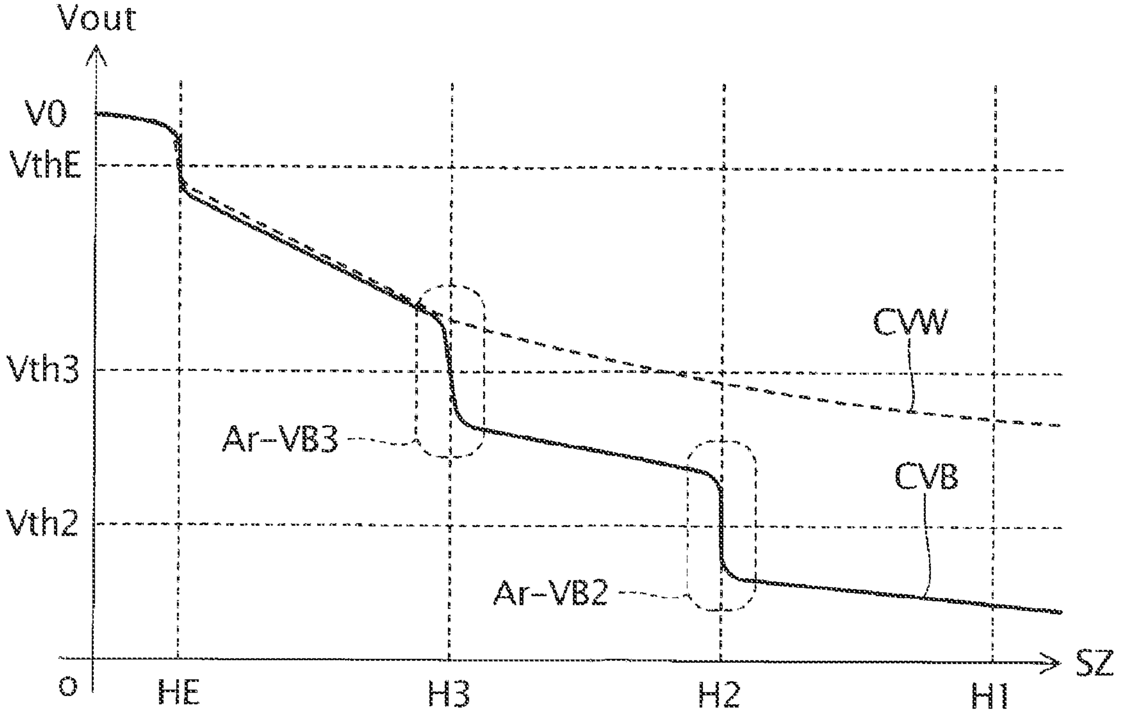
FIG. 18 is an explanatory diagram illustrating an example of a relationship between the ink liquid level distance and a detection signal.

FIG. 18 is an explanatory diagram for explaining an example of a relationship between the ink liquid level distance SZ and the detection signal Vout according to the second embodiment. Specifically, FIG. 18 illustrates an example of a potential change curve CVB indicating a relationship between the ink liquid level distance SZ and the potential of the detection signal Vout according to the second embodiment when the horizontal axis is set to the ink liquid level distance SZ and the vertical axis is set to the potential of the detection signal Vout according to the second embodiment. Here, the detection signal Vout according to the second embodiment is a detection signal Vout output by the ink accommodating device 1B. In the following, in order to distinguish the detection signal Vout according to the first embodiment, the detection signal Vout according to the second embodiment may be referred to as a detection signal Vout-B.

For convenience of description, FIG. 18 illustrates the potential change curve CVW with a broken line together with the potential change curve CVB.

As indicated by the potential change curve CVB in FIG. 18, the potential of the detection signal Vout-B becomes lower as the ink liquid level distance SZ becomes longer.

Further, as described above, the resistance value change curve CRB includes the change region Ar-RB3 where the ink resistor RTB is changed greatly in a part where the ink liquid level distance SZ becomes the distance H3. Therefore, the potential change curve CVB also includes a change region Ar-VB3 where the detection signal Vout-B is changed greatly in a part where the ink liquid level distance SZ becomes the distance H3.

Further, as described above, the resistance value change curve CRB includes the change region Ar-RB2 where the ink resistor RTB is changed greatly in a part where the ink liquid level distance SZ becomes the distance H2. Therefore, the potential change curve CVB also includes a change region Ar-VB2 where the detection signal Vout-B is changed greatly in a part where the ink liquid level distance SZ becomes the distance H2.

In the second embodiment, as illustrated in FIG. 18, when a temperature of the ink IK in the ink tank TK[m] is a reference temperature t1 and when the ink liquid level distance SZ in the ink tank TK[m] is the distance HE, the potential indicated by the detection signal Vout-B is defined as the threshold potential VthE. Further, in the second embodiment, when a temperature of the ink IK in the ink tank TK[m] is a reference temperature t1 and when the ink liquid level distance SZ in the ink tank TK[m] is the distance H3, the potential indicated by the detection signal Vout-B is defined as a threshold potential Vth3. Further, in the second embodiment, when a temperature of the ink IK in the ink tank TK[m] is a reference temperature t1 and when the ink liquid level distance SZ in the ink tank TK[m] is the distance H2, the potential indicated by the detection signal Vout-B is defined as the threshold potential Vth2.

As described above, in the second embodiment, the detection signal Vout-B output by the ink accommodating device 1B includes the change region Ar-VB2 and the change region Ar-VB3, which are regions where the detection signal Vout-B is changed greatly with respect to an amount of change in the ink liquid level distance SZ. Therefore, according to the second embodiment, even when fluctuation occurs in the potential of the detection signal Vout-B due to the temperature change of the ink IK in the ink tank TK[m], the noise superimposing on the detection signal Vout-B, or the like, compared to the reference example, the remaining amount of the ink IK in the ink tank TK[m] can be accurately detected based on the detection signal Vout-B.

2.2. Conclusion of Second Embodiment

As described above, the ink jet printer according to the second embodiment includes: the ink tank TK[m] accommodating the conductive ink IK; the rod-shaped electrode rod DB1 accommodated in the ink tank TK[m]; the rod-shaped electrode rod DB2 accommodated in the ink tank TK[m]; the ink amount detection circuit 2 that is electrically coupled to the electrode rod DB1 and the electrode rod DB2 and that detects the remaining amount of the ink IK accommodated in the ink tank TK[m] in response to the electric signal from at least one of the electrode rod DB1 and the electrode rod DB2; and the liquid discharging head HU[m] discharging the ink IK supplied from the ink tank TK[m], in which the electrode rod DB1 includes the electrode configuration part ZB11 having the outer periphery GB11 with the length NB11 and the electrode configuration part ZB12 having the outer periphery GB12 with the length NB12 that is shorter than the length NB11, and the electrode rod DB2 includes the electrode configuration part ZB21 having the outer periphery GB21 with the length NB21 and the electrode configuration part ZB22 having the outer periphery GB22 with the length NB22 that is shorter than the length NB21.

In the present embodiment, the electrode rod DB1 is an example of a "first electrode", the electrode rod DB2 is an example of a "second electrode", the electrode configuration part ZB11 is an example of a "first part", the electrode configuration part ZB12 is an example of a "second part", the electrode configuration part ZB21 is an example of a "third part", the electrode configuration part ZB22 is an example of a "fourth part", the length NB11 is an example of a "first length", the length NB12 is an example of a "second length", the length NB21 is an example of a "third length", and the length NB22 is an example of a "fourth length".

As described above, in the present embodiment, since the electrode rod DB1 includes the electrode configuration part ZB11 having the outer periphery GB11 with the length NB11 and the electrode configuration part ZB12 having the outer periphery GB12 with the length NB12 that is shorter than the length NB11, and since the electrode rod DB2 includes the electrode configuration part ZB21 having the outer periphery GB21 with the length NB21 and the electrode configuration part ZB22 having the outer periphery GB22 with the length NB22 that is shorter than the length NB21, as compared with the embodiment in which the electrode rod DB1 and the electrode rod DB2 each have a uniform thickness, it is possible to cause large change in the signal levels of the electric signals from the electrode rod DB1 and the electrode rod DB2 in accordance with the change in the amount of the ink IK accommodated in the ink tank TK[m]. That is, according to the present embodiment, as compared with the embodiment in which the electrode rod DB1 and the electrode rod DB2 each have a uniform thickness, it is possible to increase the amount of change in the signal levels of the electric signals from the electrode rod DB1 and the electrode rod DB2 with respect to the amount of change in the ink liquid level distance SZ. Therefore, according to the present embodiment, as compared with the embodiment in which the electrode rod DB1 and the electrode rod DB2 each have a uniform thickness, the remaining amount of the ink IK accommodated in the ink tank TK[m] can be accurately detected.

Further, in the ink jet printer according to the second embodiment, the electrode configuration part ZB11 may have a columnar shape, the electrode configuration part ZB12 may have a columnar shape, the electrode configuration part ZB21 may have a columnar shape, and the electrode configuration part ZB22 may have a columnar shape.

Therefore, according to the present embodiment, as compared with the embodiment in which the electrode rod DB1 and the electrode rod DB2 each have a uniform thickness, it is possible to cause a large change in the signal levels of the electric signals from the electrode rod DB1 and the electrode rod DB2 in accordance with the change in the amount of the ink IK accommodated in the ink tank TK[m].

Further, in the ink jet printer according to the second embodiment, the remaining amount of the ink IK, which is detected by the ink amount detection circuit 2 when the electrode rod DB1 and the electrode configuration part ZB21 are not electrically coupled via the ink IK in the ink tank TK[m] and when the electrode rod DB1 and the electrode configuration part ZB22 are electrically coupled via the ink IK in the ink tank TK[m], is less than the remaining amount of the ink IK, which is detected by the ink amount detection circuit 2 when the electrode rod DB1 and the electrode configuration part ZB21 are electrically coupled via the ink IK in the ink tank TK[m], and is greater than the remaining amount of the ink IK, which is detected by the ink amount detection circuit 2 when the electrode rod DB1 and the electrode configuration part ZB21 are not electrically coupled via the ink IK in the ink tank TK[m] and when the electrode rod DB1 and the electrode configuration part ZB22 are not electrically coupled via the ink IK in the ink tank TK[m].

Therefore, according to the present embodiment, the remaining amount of the ink IK in the ink tank TK[m] can be detected at least in three stages.

Further, in the ink jet printer according to the second embodiment, the remaining amount of the ink IK, which is detected by the ink amount detection circuit 2 when the electrode configuration part ZB11 and the electrode configuration part ZB21 are electrically coupled via the ink IK in the ink tank TK[m], is greater than the remaining amount of the ink IK, which is detected by the ink amount detection circuit 2 when the electrode configuration part ZB11 and the electrode configuration part ZB21 are not electrically coupled via the ink IK in the ink tank TK[m] and when the electrode configuration part ZB12 and the electrode configuration part ZB21 are electrically coupled via the ink IK in the ink tank TK[m], the remaining amount of the ink IK, which is detected by the ink amount detection circuit 2 when the electrode configuration part ZB11 and the electrode configuration part ZB21 are not electrically coupled via the ink IK in the ink tank TK[m] and when the electrode configuration part ZB12 and the electrode configuration part ZB21 are electrically coupled via the ink IK in the ink tank TK[m], is greater than the remaining amount of the ink IK, which is detected by the ink amount detection circuit 2 when the electrode configuration part ZB12 and the electrode configuration part ZB21 are not electrically coupled via the ink IK in the ink tank TK[m] and when the electrode configuration part ZB12 and the electrode configuration part ZB22 are electrically coupled via the ink IK in the ink tank TK[m], and the remaining amount of the ink IK, which is detected by the ink amount detection circuit 2 when the electrode configuration part ZB12 and the electrode configuration part ZB21 are not electrically coupled via the ink IK in the ink tank TK[m] and when the electrode configuration part ZB12 and the electrode configuration part ZB22 are electrically coupled via the ink IK in the ink tank TK[m], is greater than the remaining amount of the ink IK, which is detected by the ink amount detection circuit 2 when the electrode configuration part ZB12 and the electrode configuration part ZB22 are not electrically coupled via the ink IK in the ink tank TK[m].

Therefore, according to the present embodiment, the remaining amount of the ink IK in the ink tank TK[m] can be detected at least in four stages.

3. Third Embodiment

In the following, an ink jet printer according to a third embodiment will be explained with reference to FIGS. 19 to 21.

3.1. Ink Jet Printer According to Third Embodiment

The ink jet printer according to the third embodiment differs from the ink jet printer 100 according to the first embodiment in that an ink accommodating device 1C is provided instead of the ink accommodating device 1.

Figure 19:
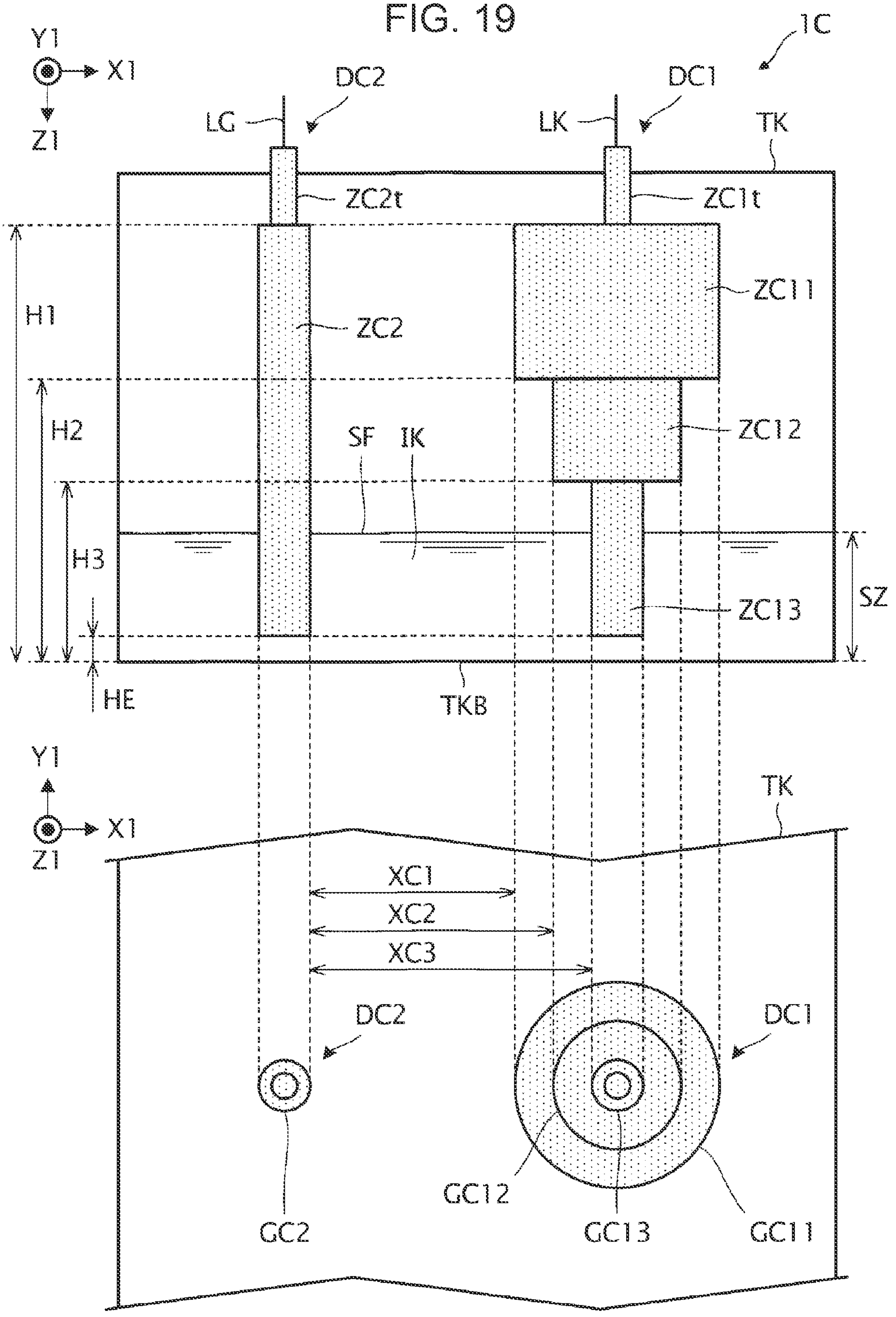
FIG. 19 is an explanatory diagram illustrating an example of a configuration of an electrode rod and an electrode rod according to a third embodiment.

FIG. 19 is a configuration diagram for explaining an example of a configuration of an electrode rod DC1 and an electrode rod DC2 provided in the ink accommodating device 1C. It is assumed that the ink accommodating device 1C is configured in the same manner as the ink accommodating device 1 according to the first embodiment regarding the ink tank TK[m] except that the electrode rod DC1 is accommodated instead of the electrode rod DA1, and the electrode rod DC2 is accommodated instead of the electrode rod DA2.

As illustrated in FIG. 19, the electrode rod DC1 includes a conductive electrode configuration part ZC11, a conductive electrode configuration part ZC12, a conductive electrode configuration part ZC13, and a conductive coupling part ZC1*t*.

The electrode configuration part ZC11 is a columnar-shaped electrode extending in the Z1 direction and having a substantially uniform thickness, and has an outer periphery GC11 with a length NC11 when cutting on a plane with the Z1 direction as the normal direction.

The electrode configuration part ZC12 is a columnar-shaped electrode extending in the Z1 direction and having a substantially uniform thickness, and has an outer periphery GC12 with a length NC12 when cutting on a plane with the Z1 direction as the normal direction. Here, the length NC12 is shorter than the length NC11. Further, the electrode configuration part ZC12 is positioned in the Z1 direction when viewed from the electrode configuration part ZC11 and is coupled to the electrode configuration part ZC11.

The electrode configuration part ZC13 is a columnar-shaped electrode extending in the Z1 direction and having a substantially uniform thickness, and has an outer periphery GC13 with a length NC13 when cutting on a plane with the Z1 direction as the normal direction. Here, the length NC13 is shorter than the length NC12. In the third embodiment, it is assumed that the length NC13 is substantially the same length as the length NW1 according to the reference example. Further, the electrode configuration part ZC13 is positioned in the Z1 direction when viewed from the electrode configuration part ZC12 and is coupled to the electrode configuration part ZC12.

The coupling part ZC1*t* is positioned in the Z2 direction when viewed from the electrode configuration part ZC11, is coupled to the electrode configuration part ZC11, and is electrically coupled to the wiring LK. That is, the coupling part ZC1*t* electrically couples the electrode configuration part ZC11 and the wiring LK.

The electrode rod DC2 is a columnar-shaped electrode extending in the Z1 direction and includes a conductive electrode configuration part ZC2 and a conductive coupling part ZC2*t*.

The electrode configuration part ZC2 is a columnar-shaped electrode extending in the Z1 direction and having a substantially uniform thickness, and has an outer periphery GC2 with a length NC2 when cutting on a plane with the Z1 direction as the normal direction. In the third embodiment, it is assumed that the length NC2 is substantially the same length as the length NW2 according to the reference example.

The coupling part ZC2*t* is positioned in the Z2 direction when viewed from the electrode configuration part ZC2, is coupled to the electrode configuration part ZC2, and is electrically coupled to the wiring LG. That is, the coupling part ZC2*t* electrically couples the electrode configuration part ZC2 and the wiring LG.

Further, in the third embodiment, it is assumed that the electrode rod DC1 and the electrode rod DC2 are provided such that a distance, which is from an end portion of the electrode rod DC1 in the Z1 direction to the bottom surface TKB of the ink tank TK[m], in the Z axis direction and a distance, which is from an end portion of the electrode rod DC2 in the Z1 direction to the bottom surface TKB of the ink tank TK[m], in the Z axis direction become a distance HE.

Further, in the third embodiment, it is assumed that the electrode rod DC1 is provided such that a distance, which is from an end portion of the electrode configuration part ZC12 in the Z1 direction to the bottom surface TKB of the ink tank TK[m], in the Z axis direction becomes a distance H3.

Further, in the third embodiment, it is assumed that the electrode rod DC1 is provided such that a distance, which is from an end portion of the electrode configuration part ZC11 in the Z1 direction to the bottom surface TKB of the ink tank TK[m], in the Z axis direction becomes a distance H2.

Further, in the third embodiment, it is assumed that the electrode rod DC1 and the electrode rod DC2 are provided such that a distance, which is from an end portion of the electrode configuration part ZC11 in the Z2 direction to the bottom surface TKB of the ink tank TK[m], in the Z axis direction and a distance, which is from an end portion of the electrode configuration part ZC2 in the Z2 direction to the bottom surface TKB of the ink tank TK[m], in the Z axis direction become a distance H1.

Further, in the third embodiment, it is assumed that the electrode rod DC1 is positioned in the X1 direction when viewed from the electrode rod DC2. In the following, a distance between the electrode configuration part ZC11 and the electrode configuration part ZC2 in the X1 direction is referred to as a distance XC1, a distance between the electrode configuration part ZC12 and the electrode configuration part ZC2 in the X1 direction is referred to as a distance XC2, and a distance between the electrode configuration part ZC13 and the electrode configuration part ZC2 in the X1 direction is referred to as a distance XC3. In the present embodiment, the distance XC3 is longer than the distance XC2, and the distance XC2 is longer than the distance XC1. In the third embodiment, it is assumed that the distance XC3 is substantially the same length as the distance XW according to the reference example.

Figure 20:
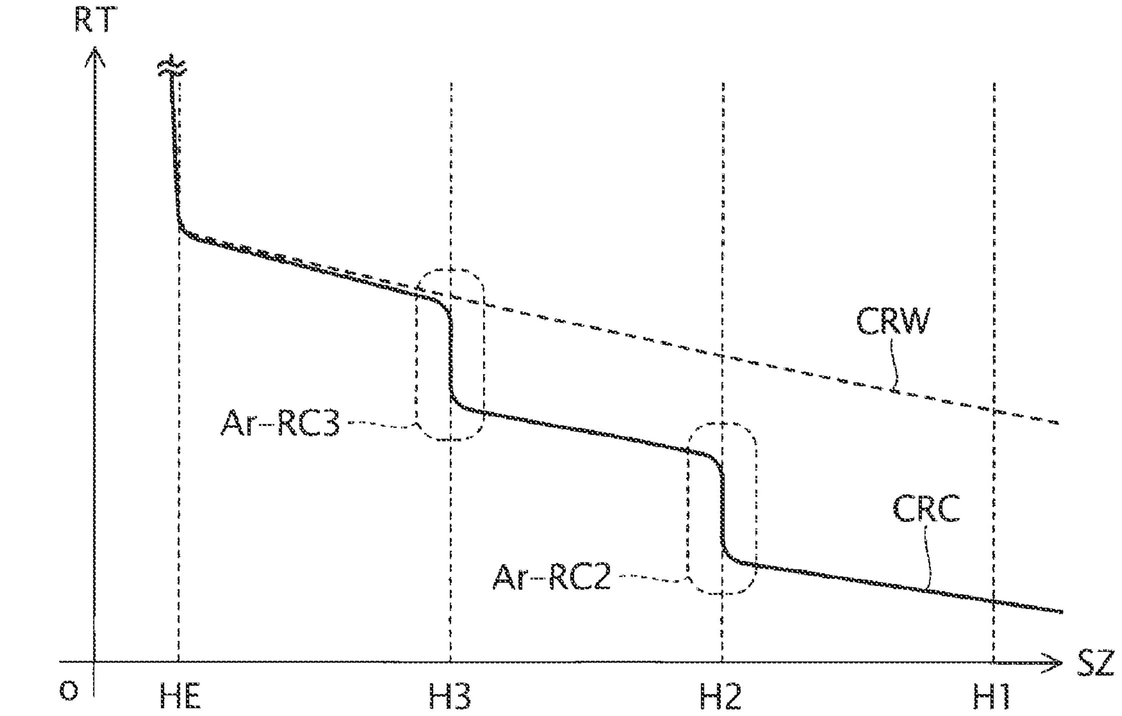
FIG. 20 is an explanatory diagram illustrating an example of a relationship between the ink liquid level distance and an ink resistor.

FIG. 20 is an explanatory diagram for explaining an example of a relationship between the ink liquid level distance SZ and an ink resistor RT according to the third embodiment. Specifically, FIG. 20 illustrates an example of a resistance value change curve CRC indicating a relationship between the ink liquid level distance SZ and a resistance value of the ink resistor RT according to the third embodiment when the horizontal axis is set to ink liquid level distance SZ and the vertical axis is set to the resistance value of the ink resistor RT according to the third embodiment. Here, the ink resistor RT according to the third embodiment is a resistor included in the ink IK that electrically couples the electrode rod DC1 and the electrode rod DC2 when the electrode rod DC1 and the electrode rod DC2, which are accommodated in the ink tank TK[m], are electrically coupled via the ink IK accommodated in the ink tank TK[m]. In the following, in order to distinguish the ink resistor RT according to the first embodiment, the ink resistor RT according to the third embodiment may be referred to as an ink resistor RTC.

For convenience of description, FIG. 20 illustrates the resistance value change curve CRW with a broken line together with the resistance value change curve CRC.

As described above, when the ink liquid level distance SZ is equal to or longer than the distance HE, the electrode configuration part ZC13 is in contact with the ink IK and the electrode configuration part ZC2 is in contact with the ink IK. Therefore, as indicated by the resistance value change curve CRC in FIG. 20, when the ink liquid level distance SZ is equal to or longer than the distance HE, the ink resistor RTC becomes a small resistance value as compared with the case where the ink liquid level distance SZ is shorter than the distance HE.

Further, when the ink liquid level distance SZ is equal to or longer than the distance H3, the electrode configuration part ZC12 is in contact with the ink IK. Therefore, the resistance value change curve CRC includes a change region Ar-RC3 where the ink resistor RTC is changed greatly in a part where the ink liquid level distance SZ becomes the distance H3. As indicated by the resistance value change curve CRC, when the ink liquid level distance SZ is equal to or longer than the distance H3, the ink resistor RTC becomes a small resistance value as compared with the case where the ink liquid level distance SZ is shorter than the distance H3.

Further, when the ink liquid level distance SZ is equal to or longer than the distance H2, the electrode configuration part ZC11 is in contact with the ink IK. Therefore, the resistance value change curve CRC includes a change region Ar-RC2 where the ink resistor RTC is changed greatly in a part where the ink liquid level distance SZ becomes the distance H2. As indicated by the resistance value change curve CRC, when the ink liquid level distance SZ is equal to or longer than the distance H2, the ink resistor RTC becomes a small resistance value as compared with the case where the ink liquid level distance SZ is shorter than the distance H2.

The resistance value of the ink resistor RTC becomes smaller as a cross-sectional area becomes larger. Therefore, as indicated by the resistance value change curve CRC, the ink resistor RTC becomes smaller as the ink liquid level distance SZ becomes longer.

Figure 21:
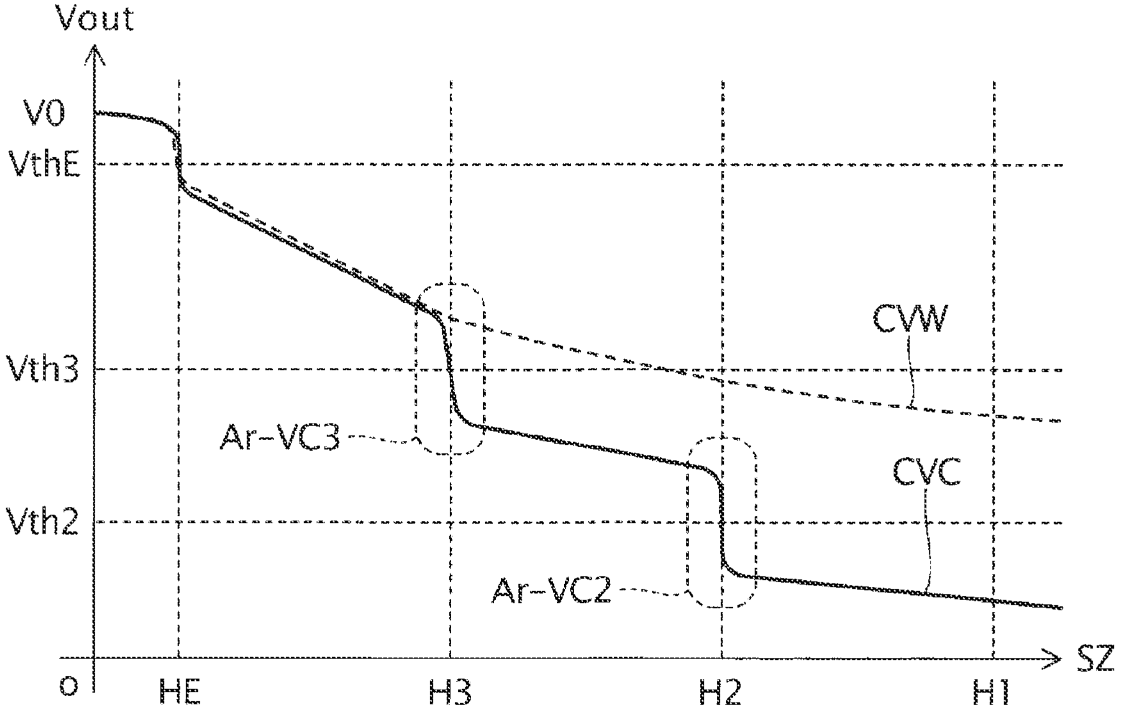
FIG. 21 is an explanatory diagram illustrating an example of a relationship between the ink liquid level distance and a detection signal.

FIG. 21 is an explanatory diagram for explaining an example of a relationship between the ink liquid level distance SZ and the detection signal Vout according to the third embodiment. Specifically, FIG. 21 illustrates an example of a potential change curve CVC indicating a relationship between the ink liquid level distance SZ and the potential of the detection signal Vout according to the third embodiment when the horizontal axis is set to the ink liquid level distance SZ and the vertical axis is set to the potential of the detection signal Vout according to the third embodiment. Here, the detection signal Vout according to the third embodiment is a detection signal Vout output by the ink accommodating device 1C. In the following, in order to distinguish the detection signal Vout according to the first embodiment, the detection signal Vout according to the third embodiment may be referred to as a detection signal Vout-C.

For convenience of description, FIG. 21 illustrates the potential change curve CVW with a broken line together with the potential change curve CVC.

As indicated by the potential change curve CVC in FIG. 21, the potential of the detection signal Vout-C becomes lower as the ink liquid level distance SZ becomes longer.

Further, as described above, the resistance value change curve CRC includes the change region Ar-RC3 where the ink resistor RTC is changed greatly in a part where the ink liquid level distance SZ becomes the distance H3. Therefore, the potential change curve CVC also includes a change region Ar-VC3 where the detection signal Vout-C is changed greatly in a part where the ink liquid level distance SZ becomes the distance H3.

Further, as described above, the resistance value change curve CRC includes the change region Ar-RC2 where the ink resistor RTC is changed greatly in a part where the ink liquid level distance SZ becomes the distance H2. Therefore, the potential change curve CVC also includes a change region Ar-VC2 where the detection signal Vout-C is changed greatly in a part where the ink liquid level distance SZ becomes the distance H2.

In the third embodiment, as illustrated in FIG. 21, when a temperature of the ink IK in the ink tank TK[m] is a reference temperature t1 and when the ink liquid level distance SZ in the ink tank TK[m] is the distance HE, the potential indicated by the detection signal Vout-C is defined as the threshold potential VthE. Further, in the third embodiment, when a temperature of the ink IK in the ink tank TK[m] is a reference temperature t1 and when the ink liquid level distance SZ in the ink tank TK[m] is the distance H3, the potential indicated by the detection signal Vout-C is defined as a threshold potential Vth3. Further, in the third embodiment, when a temperature of the ink IK in the ink tank TK[m] is a reference temperature t1 and when the ink liquid level distance SZ in the ink tank TK[m] is the distance H2, the potential indicated by the detection signal Vout-C is defined as the threshold potential Vth2.

3.2. Conclusion of Third Embodiment

As described above, in the third embodiment, the detection signal Vout-C output by the ink accommodating device 1C includes the change region Ar-VC2 and the change region Ar-VC3, which are regions where the detection signal Vout-C is changed greatly with respect to an amount of change in the ink liquid level distance SZ. Therefore, according to the third embodiment, even when fluctuation occurs in the potential of the detection signal Vout-C due to the temperature change of the ink IK in the ink tank TK[m], the noise superimposing on the detection signal Vout-C, or the like, compared to the reference example, the remaining amount of the ink IK in the ink tank TK[m] can be accurately detected based on the detection signal Vout-C.

4. Fourth Embodiment

In the following, an ink jet printer according to a fourth embodiment will be explained with reference to FIGS. 22 to 24.

4.1. Ink Jet Printer According to Fourth Embodiment

The ink jet printer according to the fourth embodiment differs from the ink jet printer 100 according to the first embodiment in that an ink accommodating device 1D is provided instead of the ink accommodating device 1.

Figure 22:
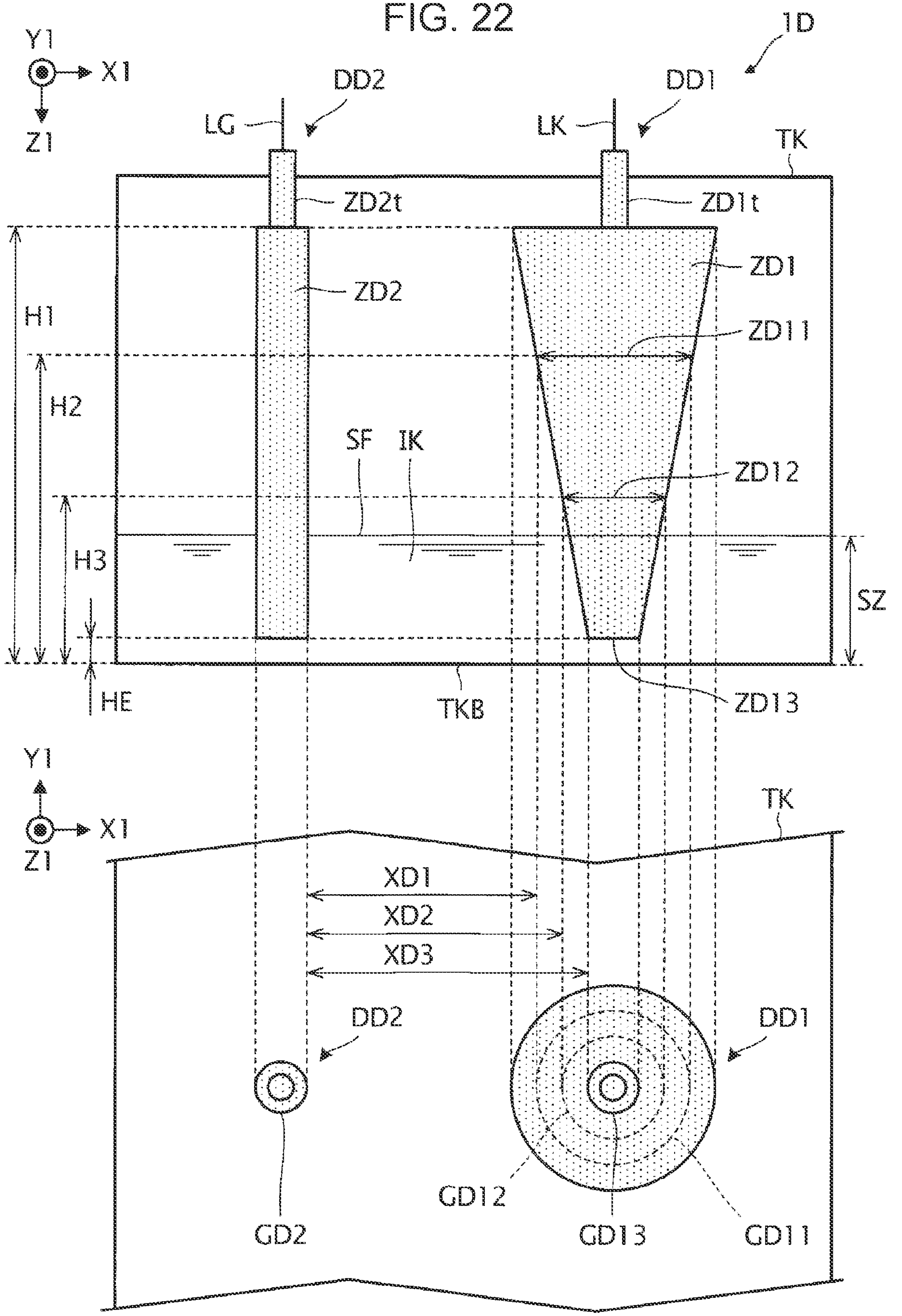
FIG. 22 is an explanatory diagram illustrating an example of a configuration of an electrode rod and an electrode rod according to a fourth embodiment.

FIG. 22 is a configuration diagram for explaining an example of a configuration of an electrode rod DD1 and an electrode rod DD2 provided in the ink accommodating device 1D. It is assumed that the ink accommodating device 1D is configured in the same manner as the ink accommodating device 1 according to the first embodiment regarding the ink tank TK[m] except that the electrode rod DD1 is accommodated instead of the electrode rod DA1, and the electrode rod DD2 is accommodated instead of the electrode rod DA2.

As illustrated in FIG. 22, the electrode rod DD1 is a truncated conical-shaped electrode extending in the Z1 direction and includes a conductive electrode configuration part ZD11, a conductive electrode configuration part ZD12, a conductive electrode configuration part ZD13, and a conductive coupling part ZD1*t*.

The electrode configuration part ZD11 is a cross-sectional part of the electrode rod DD1 positioned on a plane with the Z1 direction of the electrode rod DD1 as the normal direction and is a part having an outer periphery GD11 with a length ND11.

The electrode configuration part ZD12 is a cross-sectional part of the electrode rod DD1 positioned on a plane with the Z1 direction of the electrode rod DD1 as the normal direction, is positioned in the Z1 direction when viewed from the electrode configuration part ZD11, and is a part having an outer periphery GD12 with a length ND12. Here, the length ND12 is shorter than the length ND11.

The electrode configuration part ZD13 is an end portion of the electrode rod DD1 in the Z1 direction, is positioned in the Z1 direction when viewed from the electrode configuration part ZD12, and is a part having an outer periphery GD13 with a length ND13. Here, the length ND13 is shorter than the length ND12. In the fourth embodiment, it is assumed that the length ND13 is substantially the same length as the length NW1 according to the reference example.

The coupling part ZD1*t* is positioned in the Z2 direction when viewed from the electrode configuration part ZD11, is coupled to the electrode configuration part ZD11, and is electrically coupled to the wiring LK. That is, the coupling part ZD1*t* electrically couples the electrode configuration part ZD11 and the wiring LK.

In the fourth embodiment, although a description is made by exemplifying the case where the electrode configuration part ZD13, which is the end portion of the electrode rod DD1 in the Z1 direction, has an area in a plane with the Z1 direction as the normal direction, that is, a main part of the electrode rod DD1 except for the coupling part ZD1*t* has a truncated conical shape, the fourth embodiment is not limited to such an embodiment. The fourth embodiment may be a case where the electrode configuration part ZD13, which is the end portion of the electrode rod DD1 in the Z1 direction, is a “point” that does not have an area in a plane with the Z1 direction as the normal direction, that is, a case where the main part of the electrode rod DD1 has a conical shape.

In the following, the main part of the electrode rod DD1 is referred to as an electrode configuration part ZD1. Further, in the following, the “truncated conical shape” and the “conical shape” may be collectively referred to as a “conical shape”.

The electrode rod DD2 is a columnar-shaped electrode extending in the Z1 direction and includes a conductive electrode configuration part ZD2 and a conductive coupling part ZD2*t*.

The electrode configuration part ZD2 is a columnar-shaped electrode extending in the Z1 direction and having a substantially uniform thickness, and has an outer periphery GD2 with a length ND2. In the fourth embodiment, it is assumed that the length ND2 is substantially the same length as the length NW2 according to the reference example.

The coupling part ZD2*t* is positioned in the Z2 direction when viewed from the electrode configuration part ZD2, is coupled to the electrode configuration part ZD2, and is electrically coupled to the wiring LG. That is, the coupling part ZD2*t* electrically couples the electrode configuration part ZD2 and the wiring LG.

Further, in the fourth embodiment, it is assumed that the electrode rod DD1 and the electrode rod DD2 are provided such that a distance, which is from the electrode configuration part ZD13 that is an end portion of the electrode rod DD1 in the Z1 direction to the bottom surface TKB of the ink tank TK[m], in the Z axis direction and a distance, which is from an end portion of the electrode rod DD2 in the Z1 direction to the bottom surface TKB of the ink tank TK[m], in the Z axis direction become a distance HE.

Further, in the fourth embodiment, it is assumed that the electrode rod DD1 is provided such that a distance from the electrode configuration part ZD12 to the bottom surface TKB of the ink tank TK[m] in the Z axis direction becomes a distance H3.

Further, in the fourth embodiment, it is assumed that the electrode rod DD1 is provided such that a distance from the electrode configuration part ZD11 to the bottom surface TKB of the ink tank TK[m] in the Z axis direction becomes a distance H2.

Further, in the fourth embodiment, it is assumed that the electrode rod DD1 and the electrode rod DD2 are provided such that a distance, which is from an end portion of the electrode configuration part ZD1 in the Z2 direction to the bottom surface TKB of the ink tank TK[m], in the Z axis direction and a distance, which is from an end portion of the electrode configuration part ZD2 in the Z2 direction to the bottom surface TKB of the ink tank TK[m], in the Z axis direction become a distance H1.

Further, in the fourth embodiment, it is assumed that the electrode rod DD1 is positioned in the X1 direction when viewed from the electrode rod DD2. In the following, a distance between the electrode configuration part ZD11 and the electrode configuration part ZD2 in the X1 direction is referred to as a distance XD1, a distance between the electrode configuration part ZD12 and the electrode configuration part ZD2 in the X1 direction is referred to as a distance XD2, and a distance between the electrode configuration part ZD13 and the electrode configuration part ZD2 in the X1 direction is referred to as a distance XD3. In the present embodiment, the distance XD3 is longer than the distance XD2, and the distance XD2 is longer than the distance XD1. In the fourth embodiment, it is assumed that the distance XD3 is substantially the same length as the distance XW according to the reference example.

Figure 23:
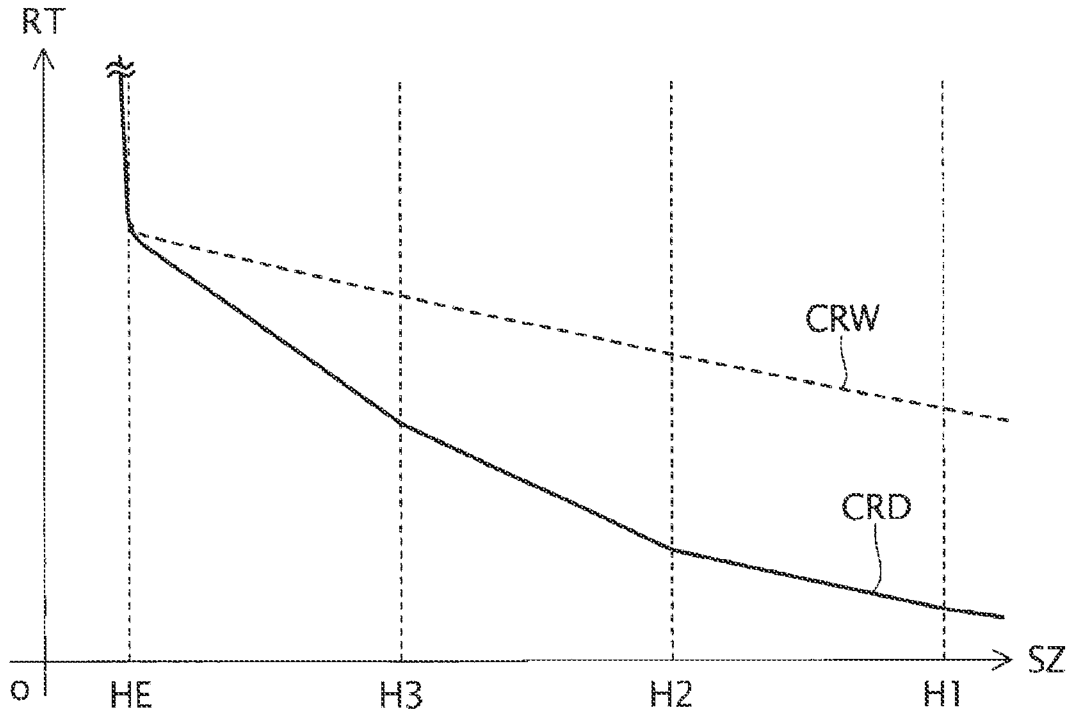
FIG. 23 is an explanatory diagram illustrating an example of a relationship between the ink liquid level distance and an ink resistor.

FIG. 23 is an explanatory diagram for explaining an example of a relationship between the ink liquid level distance SZ and an ink resistor RT according to the fourth embodiment. Specifically, FIG. 23 illustrates an example of a resistance value change curve CRD indicating a relationship between the ink liquid level distance SZ and a resistance value of the ink resistor RT according to the fourth embodiment when the horizontal axis is set to ink liquid level distance SZ and the vertical axis is set to the resistance value of the ink resistor RT according to the fourth embodiment. Here, the ink resistor RT according to the fourth embodiment is a resistor included in the ink IK that electrically couples the electrode rod DD1 and the electrode rod DD2 when the electrode rod DD1 and the electrode rod DD2, which are accommodated in the ink tank TK[m], are electrically coupled via the ink IK accommodated in the ink tank TK[m]. In the following, in order to distinguish the ink resistor RT according to the first embodiment, the ink resistor RT according to the fourth embodiment may be referred to as an ink resistor RTD.

For convenience of description, FIG. 23 illustrates the resistance value change curve CRW with a broken line together with the resistance value change curve CRD.

As described above, when the ink liquid level distance SZ is equal to or longer than the distance HE, the electrode configuration part ZD13 is in contact with the ink IK and the electrode configuration part ZD2 is in contact with the ink IK. Therefore, as indicated by the resistance value change curve CRD in FIG. 23, when the ink liquid level distance SZ is equal to or longer than the distance HE, the ink resistor RTD becomes a small resistance value as compared with the case where the ink liquid level distance SZ is shorter than the distance HE.

The resistance value of the ink resistor RTD becomes smaller as a cross-sectional area becomes larger. Therefore, as indicated by the resistance value change curve CRD, the ink resistor RTD becomes smaller as the ink liquid level distance SZ becomes longer.

Further, in the fourth embodiment, as described above, the length ND12 is longer than the length ND13 and the length NW1, and the length ND11 is longer than the length ND12. Further, in the fourth embodiment, as described above, the distance XD2 is shorter than the distance XD3 and the distance XW, and the distance XD1 is shorter than the distance XD2. Therefore, as compared with the resistance value of the ink resistor RTW indicated by the resistance value change curve CRW, a resistance value of the ink resistor RTD indicated by the resistance value change curve CRD becomes smaller suddenly as the ink liquid level distance SZ becomes longer.

Figure 24:
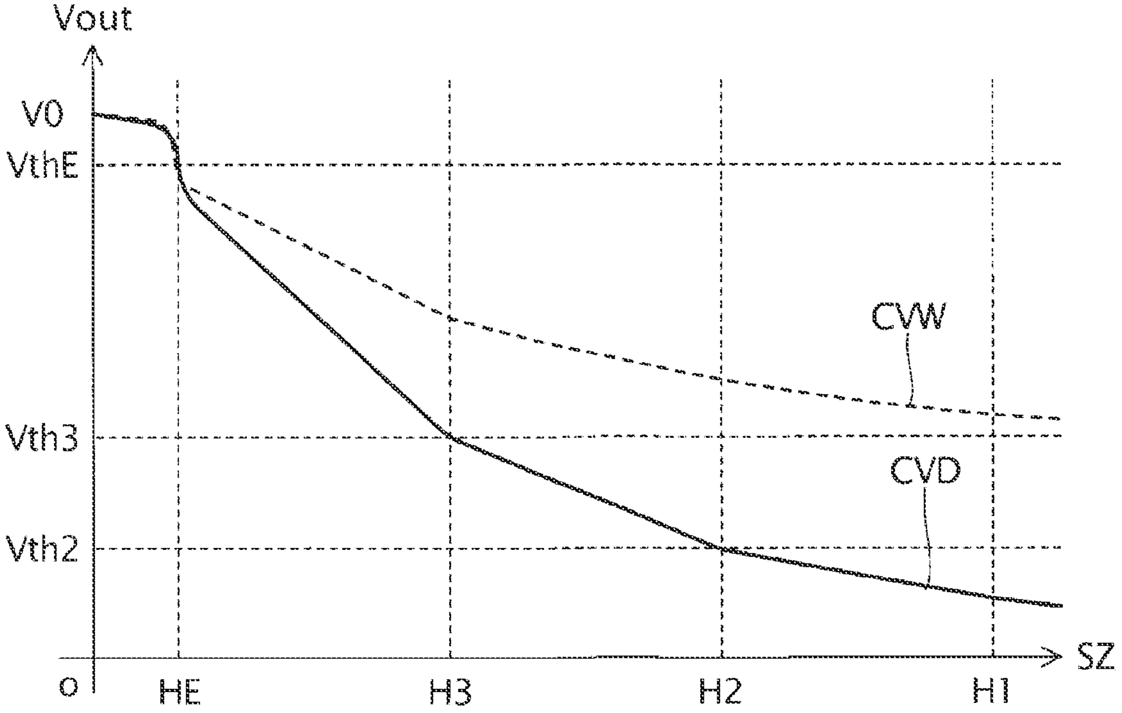
FIG. 24 is an explanatory diagram illustrating an example of a relationship between the ink liquid level distance and a detection signal.

FIG. 24 is an explanatory diagram for explaining an example of a relationship between the ink liquid level distance SZ and the detection signal Vout according to the fourth embodiment. Specifically, FIG. 24 illustrates an example of a potential change curve CVD indicating a relationship between the ink liquid level distance SZ and the potential of the detection signal Vout according to the fourth embodiment when the horizontal axis is set to the ink liquid level distance SZ and the vertical axis is set to the potential of the detection signal Vout according to the fourth embodiment. Here, the detection signal Vout according to the fourth embodiment is a detection signal Vout output by the ink accommodating device 1D. In the following, in order to distinguish the detection signal Vout according to the first embodiment, the detection signal Vout according to the fourth embodiment may be referred to as a detection signal Vout-D.

For convenience of description, FIG. 24 illustrates the potential change curve CVW with a broken line together with the potential change curve CVD.

As indicated by the potential change curve CVD in FIG. 24, the potential of the detection signal Vout-D becomes lower as the ink liquid level distance SZ becomes longer.

Further, as described above, in the resistance value change curve CRD, an amount of decrease in the ink resistor RTD is large as the ink liquid level distance SZ is increased as compared with the resistance value change curve CRW. Therefore, the potential change curve CVD also has a shape in which an amount of decrease in the detection signal Vout-D is large as the ink liquid level distance SZ is increased, as compared with the potential change curve CVW.

In the fourth embodiment, as illustrated in FIG. 24, when a temperature of the ink IK in the ink tank TK[m] is a reference temperature t1 and when the ink liquid level distance SZ in the ink tank TK[m] is the distance HE, the potential indicated by the detection signal Vout-D is defined as the threshold potential VthE. Further, in the fourth embodiment, when a temperature of the ink IK in the ink tank TK[m] is a reference temperature t1 and when the ink liquid level distance SZ in the ink tank TK[m] is the distance H3, the potential indicated by the detection signal Vout-D is defined as a threshold potential Vth3. Further, in the fourth embodiment, when a temperature of the ink IK in the ink tank TK[m] is a reference temperature t1 and when the ink liquid level distance SZ in the ink tank TK[m] is the distance H2, the potential indicated by the detection signal Vout-D is defined as a threshold potential Vth2.

As described above, in the fourth embodiment, the detection signal Vout-D output by the ink accommodating device 1D is changed greatly as compared with the detection signal Vout-W with respect to the amount of change in the ink liquid level distance SZ. Therefore, according to the fourth embodiment, even when fluctuation occurs in the potential of the detection signal Vout-D due to the temperature change of the ink IK in the ink tank TK[m], the noise superimposing on the detection signal Vout-D, or the like, compared to the reference example, the remaining amount of the ink IK in the ink tank TK[m] can be accurately detected based on the detection signal Vout-D.

4.2. Conclusion of Fourth Embodiment

As described above, the ink jet printer according to the fourth embodiment includes: the ink tank TK[m] accommodating the conductive ink IK; the rod-shaped electrode rod DD1 accommodated in the ink tank TK[m]; the rod-shaped electrode rod DD2 accommodated in the ink tank TK[m]; the ink amount detection circuit 2 that is electrically coupled to the electrode rod DD1 and the electrode rod DD2 and that detects the remaining amount of the ink IK accommodated in the ink tank TK[m] in response to the electric signal from at least one of the electrode rod DD1 and the electrode rod DD2; and the liquid discharging head HU[m] discharging the ink IK supplied from the ink tank TK[m], in which the electrode rod DD1 has a conical shape and includes the electrode configuration part ZD11 having the outer periphery GD11 with the length ND11 and the electrode configuration part ZD12 having the outer periphery GD12 with the length ND12 that is shorter than the length ND11.

In the present embodiment, the electrode rod DD1 is an example of a "first electrode", the electrode rod DD2 is an example of a "second electrode", the electrode configuration part ZD11 is an example of a "first part", the electrode configuration part ZD12 is an example of a "second part", the length ND11 is an example of a "first length", and the length ND12 is an example of a "second length".

As described above, in the present embodiment, since the electrode rod DD1 includes the electrode configuration part ZD11 having the outer periphery GD11 with the length ND11 and the electrode configuration part ZD12 having the outer periphery GD12 with the length ND12 that is shorter than the length ND11, as compared with the embodiment in which the electrode rod DD1 has a uniform thickness, it is possible to cause large change in the signal levels of the electric signals from the electrode rod DD1 and the electrode rod DD2 in accordance with the change in the amount of the ink IK accommodated in the ink tank TK[m]. Therefore, according to the present embodiment, as compared with the embodiment in which the outer periphery of the electrode rod DD1 has a uniform length, the remaining amount of the ink IK accommodated in the ink tank TK[m] can be accurately detected.

In the fourth embodiment, although a description is made by exemplifying the case where the electrode rod DD2 has a columnar shape with a uniform thickness, the present disclosure is not limited to such an embodiment. In the ink jet printer according to the fourth embodiment, the electrode rod DD2 may also have a conical shape, similar to the electrode rod DD1.

In this case, as compared with the embodiment in which the electrode rod DD2 has a uniform thickness, it is possible to cause a large change in the signal levels of the electric signals from the electrode rod DD1 and the electrode rod DD2 in accordance with the change in the amount of the ink IK accommodated in the ink tank TK[m]. Therefore, according to the present embodiment, as compared with the embodiment in which the outer periphery of the electrode rod DD2 has a uniform length, the remaining amount of the ink IK accommodated in the ink tank TK[m] can be accurately detected.

5. Fifth Embodiment

In the following, an ink jet printer according to a fifth embodiment will be explained with reference to FIGS. 25 to 29.

5.1. Ink Jet Printer According to Fifth Embodiment

The ink jet printer according to the fifth embodiment differs from the ink jet printer 100 according to the first embodiment in that an ink accommodating device 1F is provided instead of the ink accommodating device 1.

Figure 25:
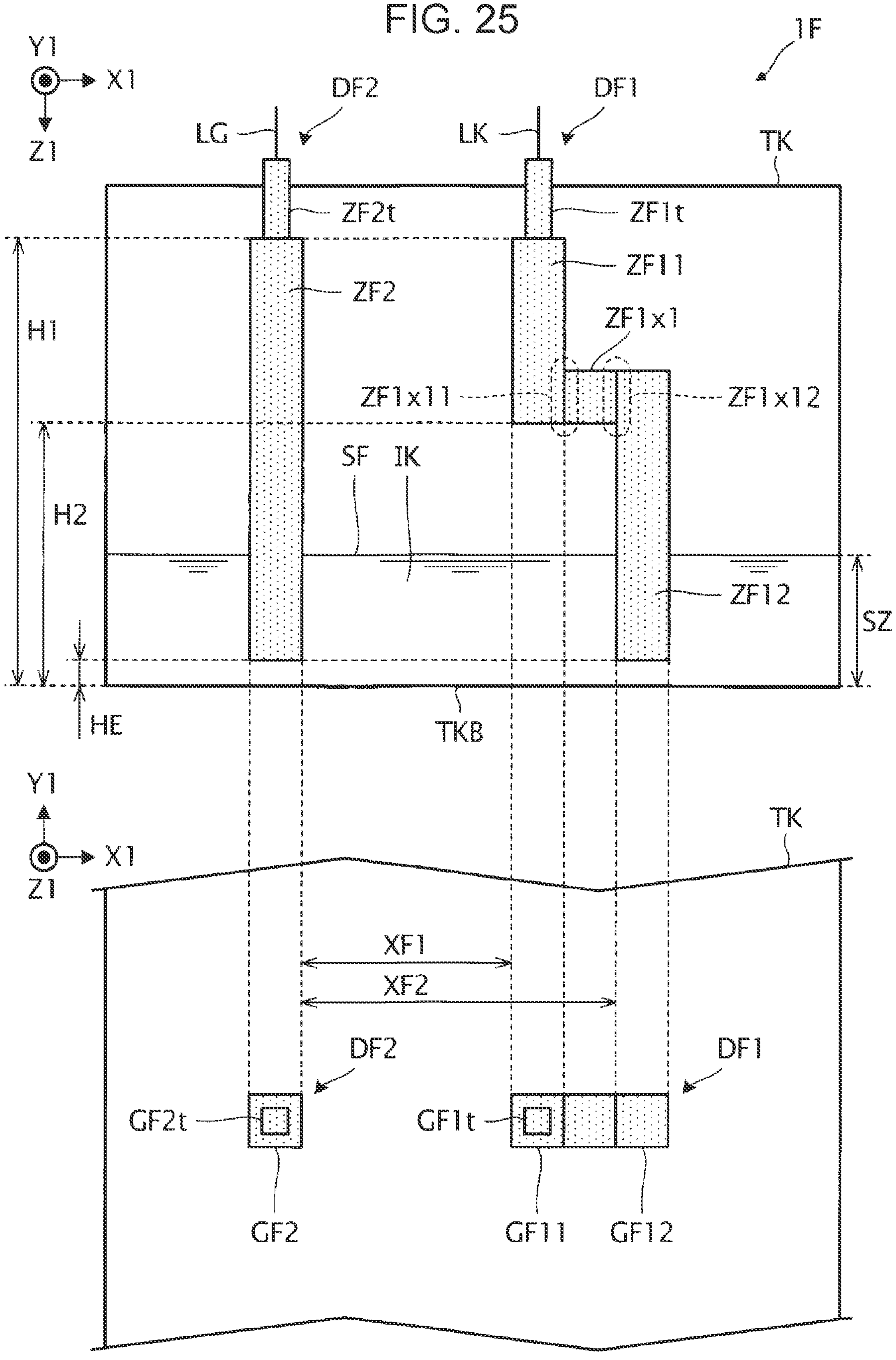
FIG. 25 is an explanatory diagram illustrating an example of a configuration of an electrode rod and an electrode rod according to a fifth embodiment.

FIG. 25 is a configuration diagram for explaining an example of a configuration of an electrode rod DF1 and an electrode rod DF2 provided in the ink accommodating device 1F. It is assumed that the ink accommodating device 1F is configured in the same manner as the ink accommodating device 1 according to the first embodiment regarding the ink tank TK[m] except that the electrode rod DF1 is accommodated instead of the electrode rod DA1, and the electrode rod DF2 is accommodated instead of the electrode rod DA2.

As illustrated in FIG. 25, the electrode rod DF1 includes a conductive electrode configuration part ZF11, a conductive electrode configuration part ZF12, a conductive bending part ZF1*x*1, a conductive coupling part ZF1*x*11, a conductive coupling part ZF1*x*12, and a conductive coupling part ZF1*t*.

The electrode configuration part ZF11 is a quadrangular prism-shaped electrode extending in the Z1 direction and having a substantially uniform thickness, and has an outer periphery GF11 with a length NF11 when cutting on a plane with the Z1 direction as the normal direction. That is, in the fifth embodiment, it is assumed that the electrode configuration part ZF11 has a quadrangular cross-sectional shape. However, the present disclosure is not limited to such an embodiment, and the electrode configuration part ZF11 may have a polygonal cross-sectional shape other than a quadrangle.

The electrode configuration part ZF12 is a quadrangular prism-shaped electrode extending in the Z1 direction and having a substantially uniform thickness, and has an outer periphery GF12 with a length NF12 when cutting on a plane with the Z1 direction as the normal direction. That is, in the fifth embodiment, it is assumed that the electrode configuration part ZF12 has a quadrangular cross-sectional shape. However, the present disclosure is not limited to such an embodiment, and the electrode configuration part ZF12 may have a polygonal cross-sectional shape other than a quadrangle.

Further, in the fifth embodiment, it is assumed that the length NF12 and the length NF11 are substantially the same length. However, the present disclosure is not limited to such an embodiment, and the length NF12 may be shorter than the length NF11.

The bending part ZF1*x*1 is an electrode extending in the X1 direction.

The coupling part ZF1*x*11 is an electrode positioned in the X1 direction when viewed from the electrode configuration part ZF11 and positioned in the X2 direction when viewed from the bending part ZF1*x*1, and couples the electrode configuration part ZF11 and the bending part ZF1*x*1 to each other.

The coupling part ZF1x12 is an electrode positioned in the X2 direction when viewed from the electrode configuration part ZF12 and positioned in the X1 direction when viewed from the bending part ZF1x1, and couples the electrode configuration part ZF12 and the bending part ZF1x1 to each other.

The coupling part ZF1t is positioned in the Z2 direction when viewed from the electrode configuration part ZF11, is coupled to the electrode configuration part ZF11, and is electrically coupled to the wiring LK. That is, the coupling part ZF1t electrically couples the electrode configuration part ZF11 and the wiring LK.

In the fifth embodiment, the coupling part ZF1t is a quadrangular prism-shaped electrode extending in the Z1 direction and has an outer periphery GF1t with a length NF1t when cutting on a plane with the Z1 direction as the normal direction. That is, in the fifth embodiment, it is assumed that the coupling part ZF1t has a quadrangular cross-sectional shape. However, the present disclosure is not limited to such an embodiment, and the coupling part ZF1t may have a polygonal cross-sectional shape other than a quadrangle.

In the following, parts of the electrode rod DF1 excluding the coupling part ZF1t, that is, the electrode configuration part ZF11, the electrode configuration part ZF12, the bending part ZF1x1, the coupling part ZF1x11, and the coupling part ZF1x12 are referred to as an electrode configuration part ZF1.

The electrode rod DF2 is an electrode extending in the Z1 direction and includes a conductive electrode configuration part ZF2 and a conductive coupling part ZF2t.

The electrode configuration part ZF2 is a quadrangular prism-shaped electrode extending in the Z1 direction and having a substantially uniform thickness, and has an outer periphery GF2 with a length NF2 when cutting on a plane with the Z1 direction as the normal direction. That is, in the fifth embodiment, it is assumed that the electrode configuration part ZF2 has a quadrangular cross-sectional shape. However, the present disclosure is not limited to such an embodiment, and the electrode configuration part ZF2 may have a polygonal cross-sectional shape other than a quadrangle.

The coupling part ZF2t is positioned in the Z2 direction when viewed from the electrode configuration part ZF2, is coupled to the electrode configuration part ZF2, and is electrically coupled to the wiring LG. That is, the coupling part ZF2t electrically couples the electrode configuration part ZF2 and the wiring LG.

In the fifth embodiment, the coupling part ZF2t is a quadrangular prism-shaped electrode extending in the Z1 direction and has an outer periphery GF2t with a length NF2t when cutting on a plane with the Z1 direction as the normal direction. That is, in the fifth embodiment, it is assumed that the coupling part ZF2t has a quadrangular cross-sectional shape. However, the present disclosure is not limited to such an embodiment, and the coupling part ZF2t may have a polygonal cross-sectional shape other than a quadrangle.

Further, in the fifth embodiment, it is assumed that the electrode rod DF1 and the electrode rod DF2 are provided such that a distance, which is from an end portion of the electrode configuration part ZF12 in the Z1 direction to the bottom surface TKB of the ink tank TK[m], in the Z axis direction and a distance, which is from an end portion of the electrode configuration part ZF2 in the Z1 direction to the bottom surface TKB of the ink tank TK[m], in the Z axis direction become a distance HE.

Further, in the fifth embodiment, it is assumed that the electrode rod DF1 is provided such that a distance, which is from an end portion of the electrode configuration part ZF11 in the Z1 direction to the bottom surface TKB of the ink tank TK[m], in the Z axis direction becomes a distance H2.

Further, in the fifth embodiment, it is assumed that the electrode rod DF1 and the electrode rod DF2 are provided such that a distance, which is from an end portion of the electrode configuration part ZF1 in the Z2 direction to the bottom surface TKB of the ink tank TK[m], in the Z axis direction and a distance, which is from an end portion of the electrode configuration part ZF2 in the Z2 direction to the bottom surface TKB of the ink tank TK[m], in the Z axis direction become a distance H1.

Further, in the fifth embodiment, it is assumed that the electrode rod DF1 is positioned in the X1 direction when viewed from the electrode rod DF2. In the following, a distance between the electrode configuration part ZF11 and the electrode configuration part ZF2 in the X1 direction is referred to as a distance XF1, and a distance between the electrode configuration part ZF12 and the electrode configuration part ZF2 in the X1 direction is referred to as a distance XF2. In the fifth embodiment, the distance XF2 is longer than the distance XF1. Further, in the fifth embodiment, it is assumed that the distance XF2 is substantially the same length as the distance XW according to the reference example.

Figure 26:
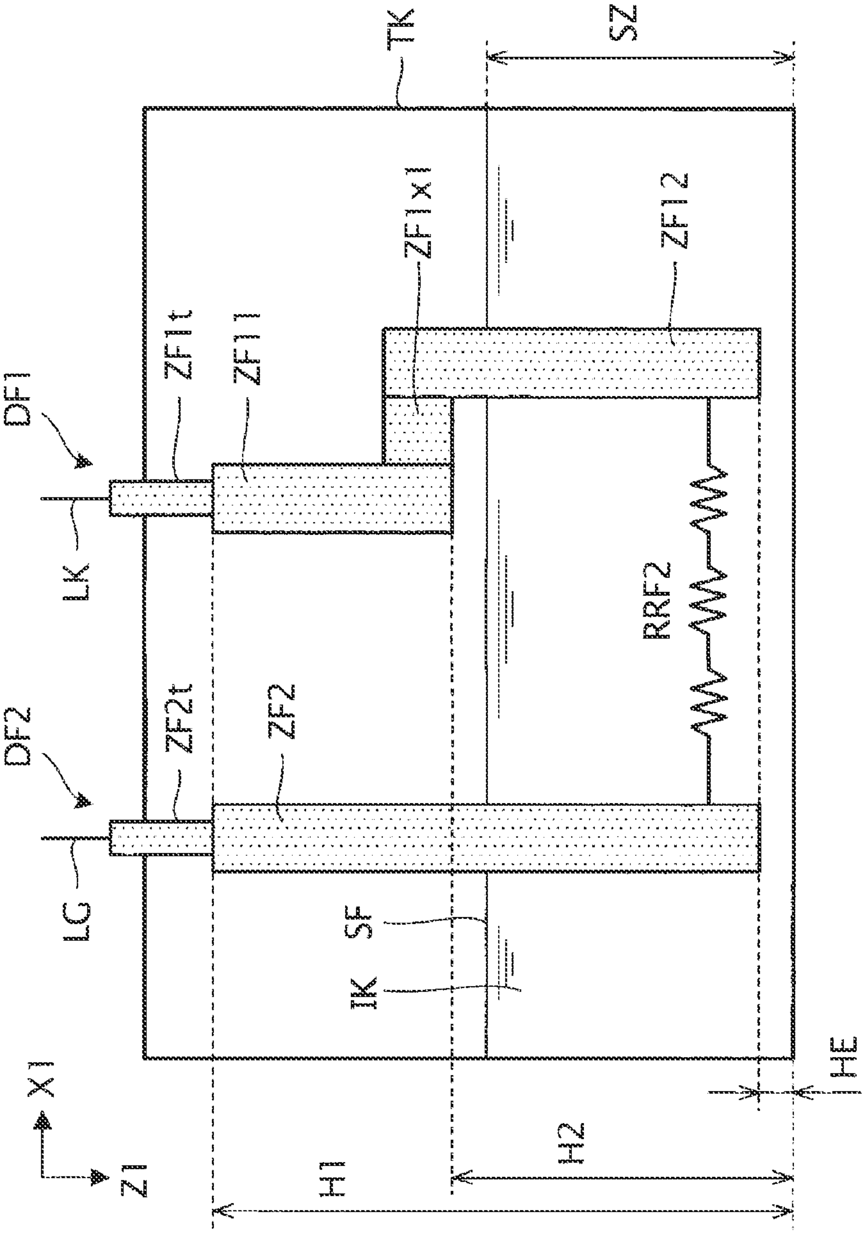
FIG. 26 is an explanatory diagram illustrating an example of an ink resistor.
Figure 27:
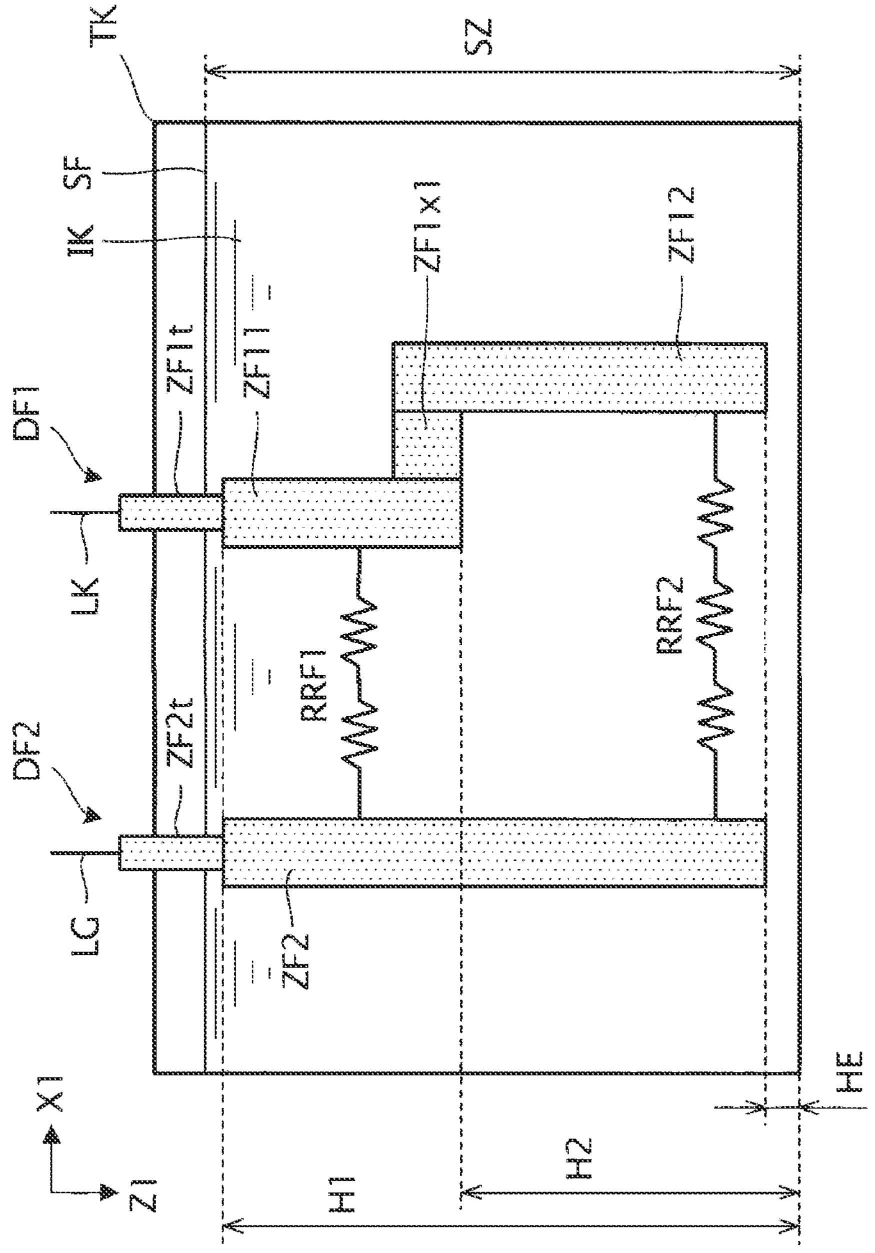
FIG. 27 is an explanatory diagram illustrating an example of an ink resistor.

FIGS. 26 and 27 are explanatory diagrams for explaining an example of the ink resistor RT formed between the electrode rod DF1 and the electrode rod DF2. In the following, in order to distinguish the ink resistor RT according to the first embodiment, the ink resistor RT formed between the electrode rod DF1 and the electrode rod DF2 may be referred to as the ink resistor RT according to the fifth embodiment or an ink resistor RTF.

As illustrated in FIG. 27, when the ink IK is present between the electrode configuration part ZF11 and the electrode configuration part ZF2, that is, when the ink liquid level distance SZ is equal to or longer than the distance H2, the electrode configuration part ZF11 and the electrode configuration part ZF2 are electrically coupled through the ink IK. In the following, a resistor included in the ink IK that electrically couples the electrode configuration part ZF11 and the electrode configuration part ZF2 is referred to as a resistor RRF1.

As illustrated in FIGS. 26 and 27, when the ink IK is present between the electrode configuration part ZF12 and the electrode configuration part ZF2, that is, when the ink liquid level distance SZ is equal to or longer than the distance HE, the electrode configuration part ZF12 and the electrode configuration part ZF2 are electrically coupled through the ink IK. In the following, a resistor included in the ink IK that electrically couples the electrode configuration part ZF12 and the electrode configuration part ZF2 is referred to as a resistor RRF2.

When the ink liquid level distance SZ is equal to or longer than the distance HE and shorter than the distance H2, the resistor RRF2 becomes the above-described ink resistor RTF.

Further, when the ink liquid level distance SZ is equal to or longer than the distance H2, a composite resistance of the resistor RRF1 and the resistor RRF2 when the resistor RRF1 and the resistor RRF2 are coupled in parallel is the ink resistor RTF described above.

Figure 28:
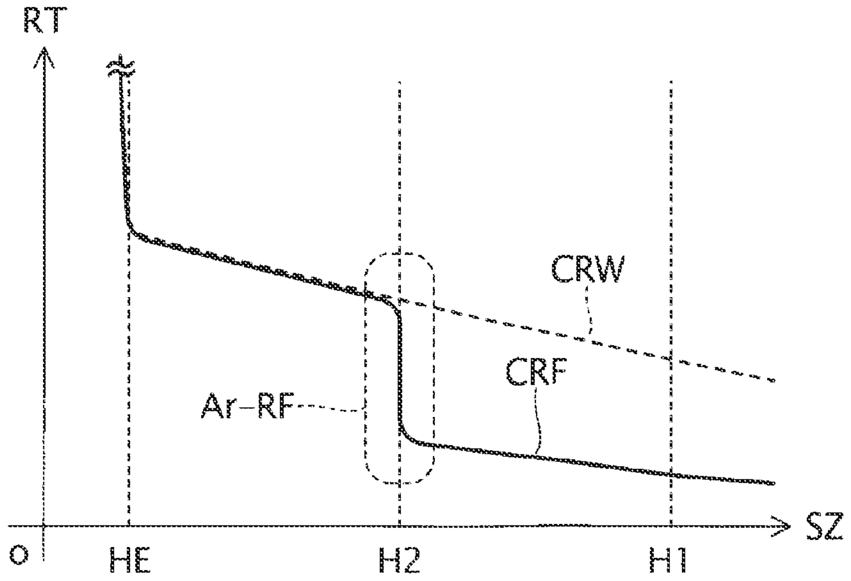
FIG. 28 is an explanatory diagram illustrating an example of a relationship between the ink liquid level distance and an ink resistor.

FIG. 28 is an explanatory diagram for explaining an example of a relationship between the ink liquid level distance SZ and the ink resistor RTF. Specifically, FIG. 28 illustrates an example of a resistance value change curve CRF indicating a relationship between the ink liquid level distance SZ and the resistance value of the ink resistor RTF when the horizontal axis is set to the ink liquid level distance SZ and the vertical axis is set to the resistance value of the ink resistor RTF.

For convenience of description, FIG. 28 illustrates the resistance value change curve CRW with a broken line together with the resistance value change curve CRF.

As described above, when the ink liquid level distance SZ is equal to or longer than the distance HE, the electrode configuration part ZF12 is in contact with the ink IK and the electrode configuration part ZF2 is in contact with the ink IK. Therefore, as indicated by the resistance value change curve CRF in FIG. 28, when the ink liquid level distance SZ is equal to or longer than the distance HE, the ink resistor RTF becomes a small resistance value as compared with the case where the ink liquid level distance SZ is shorter than the distance HE.

Further, when the ink liquid level distance SZ is equal to or longer than the distance H2, the electrode configuration part ZF11 is in contact with the ink IK. As described above, the distance XF1 is shorter than the distance XF2. The resistance value of the ink resistor RTF becomes smaller as the length of the ink resistor RTF becomes shorter. Therefore, the resistance value change curve CRF includes a change region Ar—RF where the ink resistor RTF is changed greatly in a part where the ink liquid level distance SZ becomes the distance H2. As indicated by the resistance value change curve CRF, when the ink liquid level distance SZ is equal to or longer than the distance H2, the ink resistor RTF becomes a small resistance value as compared with the case where the ink liquid level distance SZ is shorter than the distance H2.

The resistance value of the ink resistor RTF becomes smaller as a cross-sectional area becomes larger. Therefore, as indicated by the resistance value change curve CRF, the ink resistor RTF becomes smaller as the ink liquid level distance SZ becomes longer.

Figure 29:
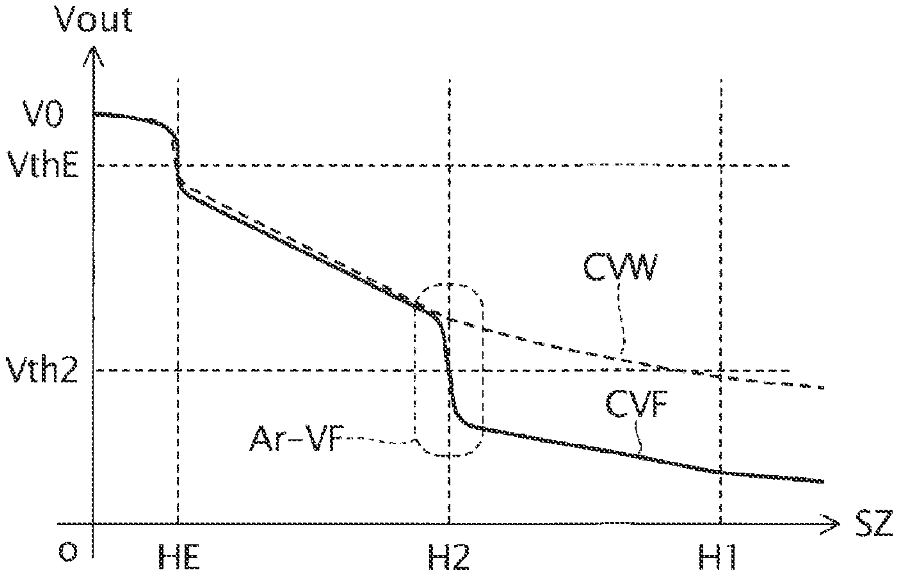
FIG. 29 is an explanatory diagram illustrating an example of a relationship between the ink liquid level distance and a detection signal.

FIG. 29 is an explanatory diagram for explaining an example of a relationship between the ink liquid level distance SZ and the detection signal Vout according to the fifth embodiment. Specifically, FIG. 29 illustrates an example of a potential change curve CVF indicating a relationship between the ink liquid level distance SZ and the potential of the detection signal Vout according to the fifth embodiment when the horizontal axis is set to the ink liquid level distance SZ and the vertical axis is set to the potential of the detection signal Vout according to the fifth embodiment. Here, the detection signal Vout according to the fifth embodiment is a detection signal Vout output by the ink accommodating device 1F. In the following, in order to distinguish the detection signal Vout according to the first embodiment, the detection signal Vout according to the fifth embodiment may be referred to as a detection signal Vout-F.

For convenience of description, FIG. 29 illustrates the potential change curve CVW with a broken line together with the potential change curve CVF.

As indicated by the potential change curve CVF in FIG. 29, the potential of the detection signal Vout-F becomes lower as the ink liquid level distance SZ becomes longer.

Further, as described above, the resistance value change curve CRF includes the change region Ar—RF where the ink resistor RTF is changed greatly in a part where the ink liquid level distance SZ becomes the distance H2. Therefore, the potential change curve CVF also includes a change region Ar-VF where the detection signal Vout-F is changed greatly in a part where the ink liquid level distance SZ becomes the distance H2.

In the fifth embodiment, as illustrated in FIG. 29, when a temperature of the ink IK in the ink tank TK[m] is a reference temperature t1 and when the ink liquid level distance SZ in the ink tank TK[m] is the distance HE, the potential indicated by the detection signal Vout-F is defined as the threshold potential VthE. Further, in the fifth embodiment, when a temperature of the ink IK in the ink tank TK[m] is a reference temperature t1 and when the ink liquid level distance SZ in the ink tank TK[m] is the distance H2, the potential indicated by the detection signal Vout-F is defined as a threshold potential Vth2.

As described above, in the fifth embodiment, the detection signal Vout-F output by the ink accommodating device 1F includes the change region Ar-VF, which is a region where the detection signal Vout-F is changed greatly with respect to the amount of change in the ink liquid level distance SZ. Therefore, according to the fifth embodiment, even when fluctuation occurs in the potential of the detection signal Vout-F due to the temperature change of the ink IK in the ink tank TK[m], the noise superimposing on the detection signal Vout-F, or the like, compared to the reference example, the remaining amount of the ink IK in the ink tank TK[m] can be accurately detected based on the detection signal Vout-F.

5.2. Conclusion of Fifth Embodiment

As described above, the ink jet printer according to the fifth embodiment includes: the ink tank TK[m] accommodating the conductive ink IK; the electrode rod DF1 accommodated in the ink tank TK[m]; the electrode rod DF2 accommodated in the ink tank TK[m]; the ink amount detection circuit 2 that is electrically coupled to the electrode rod DF1 and the electrode rod DF2 and that detects the remaining amount of the ink IK accommodated in the ink tank TK[m] in response to the electric signal from at least one of the electrode rod DF1 and the electrode rod DF2; and the liquid discharging head HU[m] discharging the ink IK supplied from the ink tank TK[m], in which the electrode rod DF1 includes the electrode configuration part ZF11 of which a distance from the electrode rod DF2 is the distance XF1, and the electrode configuration part ZF12 of which a distance from the electrode rod DF2 is the distance XF2 that is longer than the distance XF1.

In the present embodiment, the electrode rod DF1 is an example of a “first electrode”, the electrode rod DF2 is an example of a “second electrode”, the electrode configuration part ZF11 is an example of a “first part”, the electrode configuration part ZF12 is an example of a “second part”, the distance XF1 is an example of a “first distance”, and the distance XF2 is an example of a “second distance”.

As described above, the electrode rod DF1 according to the present embodiment includes the electrode configuration part ZF11 of which a distance from the electrode rod DF2 is the distance XF1 and the electrode configuration part ZF12 of which a distance from the electrode rod DF2 is the distance XF2 that is longer than the distance XF1. Therefore, according to the present embodiment, as in the reference example, as compared with the embodiment in which the rod-shaped electrode rod DW1 and the rod-shaped electrode rod DW2 extend substantially parallel, it is possible to cause a large change in the signal levels of the electric signals from the electrode rod DF1 and the electrode rod DF2 in accordance with the change in the amount of the ink IK accommodated in the ink tank TK[m]. Accordingly, according to the present embodiment, as in the reference example, as compared with the embodiment in which the rod-shaped electrode rod DW1 and the rod-shaped electrode rod DW2 extend substantially parallel, the remaining amount of the ink IK accommodated in the ink tank TK[m] can be accurately detected.

Further, in the ink jet printer according to the fifth embodiment, the electrode configuration part ZF11 is provided to extend in the Z1 direction, and the electrode rod DF1 includes the bending part ZF1$x$1, which extends in the X1 direction intersecting the Z1 direction, and the coupling part ZF1$x$11, which couples the electrode configuration part ZF11 and the bending part ZF1$x$1, between the electrode configuration part ZF11 and the electrode configuration part ZF12.

In the present embodiment, the Z1 direction is an example of a "first direction", the X1 direction is an example of a "first intersecting direction", the bending part ZF1$x$1 is an example of a "first intersecting part", and the coupling part ZF1$x$11 is an example of a "first coupling part".

As described above, according to the present embodiment, the electrode rod DF1 includes the bending part ZF1$x$1 extending in the X1 direction. Therefore, according to the present embodiment, a distance between the electrode configuration part ZF12 and the electrode rod DF2 can be made longer than the distance between the electrode configuration part ZF11 and the electrode rod DF2. Accordingly, according to the present embodiment, as in the reference example, as compared with the embodiment in which the rod-shaped electrode rod DW1 and the rod-shaped electrode rod DW2 extend substantially parallel, the remaining amount of the ink IK accommodated in the ink tank TK[m] can be accurately detected.

Further, in the ink jet printer according to the fifth embodiment, the electrode rod DF1 includes the coupling part ZF1$x$12 that couples the electrode configuration part ZF12 and the bending part ZF1$x$1.

In the present embodiment, the coupling part ZF1$x$12 is an example of a "second coupling part".

According to the present embodiment, since the distance between the electrode configuration part ZF12 and the electrode rod DF2 can be made longer than the distance between the electrode configuration part ZF11 and the electrode rod DF2, as compared with the embodiment in which the rod-shaped electrode rod DW1 and the rod-shaped electrode rod DW2 extend substantially parallel as in the reference example, the remaining amount of the ink IK accommodated in the ink tank TK[m] can be accurately detected.

Further, in the ink jet printer according to the fifth embodiment, the X1 direction is a direction substantially orthogonal to the Z1 direction.

In the present embodiment, "substantially orthogonal" is a concept that includes a case of intersecting at 90 degrees and a case where it can be regarded as intersecting at 90 degrees when an error is considered. Specifically, in the present embodiment, "substantially orthogonal" means a case of intersecting at 80 degrees or more and 100 degrees or less.

Therefore, according to the present embodiment, for example, as compared with the embodiment in which the X1 direction and the Z1 direction are substantially parallel, a difference between the distance between the electrode configuration part ZF12 and the electrode rod DF2, and the distance between the electrode configuration part ZF11 and the electrode rod DF2, can be increased. Therefore, according to the present embodiment, as in the reference example, as compared with the embodiment in which the rod-shaped electrode rod DW1 and the rod-shaped electrode rod DW2 extend substantially parallel, the remaining amount of the ink IK accommodated in the ink tank TK[m] can be accurately detected.

Further, in the ink jet printer according to the fifth embodiment, the electrode configuration part ZF12 may be provided to extend in the Z1 direction.

Further, in the ink jet printer according to the fifth embodiment, the cross-sectional shape of the electrode rod DF1 may a polygon.

According to the embodiment, for example, as compared with the embodiment in which the cross-sectional shape of the electrode rod DF1 is a curved surface, the electrode rod DF1 in the ink tank TK[m] can be easily disposed, and the distance between the electrode rod DF1 and the electrode rod DF2 can be easily set to a desired distance.

6. Sixth Embodiment

In the following, an ink jet printer according to a sixth embodiment will be explained with reference to FIGS. 30 to 32.

6.1. Ink Jet Printer According to Sixth Embodiment

The ink jet printer according to the sixth embodiment differs from the ink jet printer 100 according to the first embodiment in that an ink accommodating device 1G is provided instead of the ink accommodating device 1.

Figure 30:
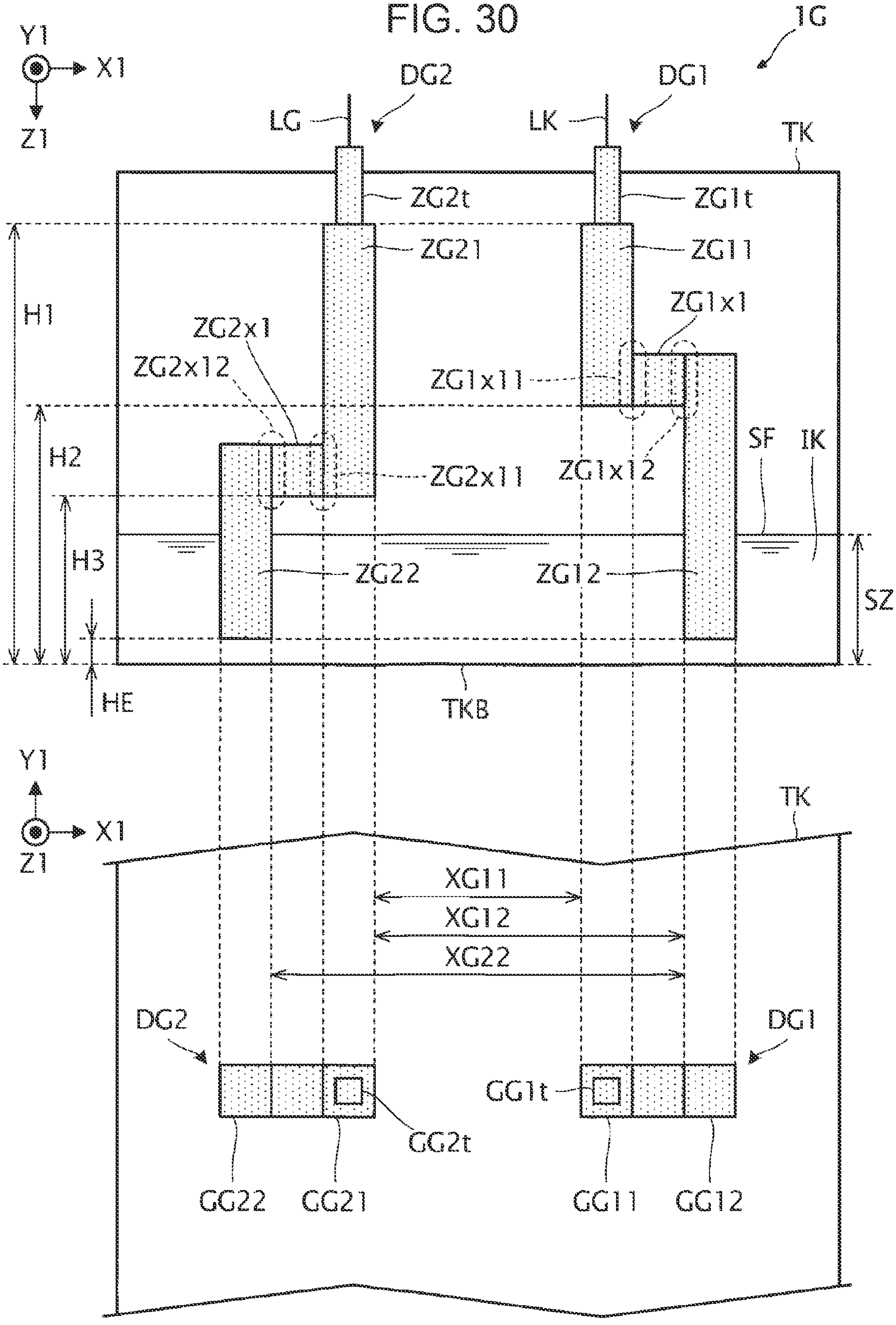
FIG. 30 is an explanatory diagram illustrating an example of a configuration of an electrode rod and an electrode rod according to a sixth embodiment.

FIG. 30 is a configuration diagram for explaining an example of a configuration of an electrode rod DG1 and an electrode rod DG2 provided in the ink accommodating device 1G. It is assumed that the ink accommodating device 1G is configured in the same manner as the ink accommodating device 1 according to the first embodiment regarding the ink tank TK[m] except that the electrode rod DG1 is accommodated instead of the electrode rod DA1, and the electrode rod DG2 is accommodated instead of the electrode rod DA2.

As illustrated in FIG. 30, the electrode rod DG1 has the same shape as that of the electrode rod DF1 according to the fifth embodiment and includes a conductive electrode configuration part ZG11, a conductive electrode configuration part ZG12, a conductive bending part ZG1$x$1, a conductive coupling part ZG1$x$11, a conductive coupling part ZG1$x$12, and a conductive coupling part ZG1$t$.

The electrode configuration part ZG11 has the same shape as that of the electrode configuration part ZF11 according to the fifth embodiment and has an outer periphery GG11 with a length NG11 when cutting on a plane with the Z1 direction as the normal direction.

The electrode configuration part ZG12 has the same shape as that of the electrode configuration part ZF12 according to the fifth embodiment and has an outer periphery GG12 with a length NG12 when cutting on a plane with the Z1 direction as the normal direction. Further, in the sixth embodiment, although it is assumed that the length NG12 and the length NG11 are substantially the same length, the length NG12 may be shorter than the length NG11.

The bending part ZG1$x$1 is an electrode that has the same shape as that of the bending part ZF1$x$1 according to the fifth embodiment and that extends in the X1 direction.

The coupling part ZG1$x$11 couples the electrode configuration part ZG11 and the bending part ZG1$x$1.

The coupling part ZG1$x$12 couples the electrode configuration part ZG12 and the bending part ZG1$x$1.

The coupling part ZG1$t$ is positioned in the Z2 direction when viewed from the electrode configuration part ZG11, is coupled to the electrode configuration part ZG11, and is electrically coupled to the wiring LK. In the sixth embodiment, the coupling part ZG1*t* has the same shape as that of the coupling part ZF1*t* according to the fifth embodiment and has an outer periphery GG1*t* with a length NG1*t* when cutting on a plane with the Z1 direction as the normal direction.

In the following, a part of the electrode rod DG1 excluding the coupling part ZG1*t* is referred to as an electrode configuration part ZG1.

The electrode rod DG2 includes a conductive electrode configuration part ZG21, a conductive electrode configuration part ZG22, a conductive bending part ZG2*x*1, a conductive coupling part ZG2*x*11, a conductive coupling part ZG2*x*12, and a conductive coupling part ZG2*t*.

The electrode configuration part ZG21 is a quadrangular prism-shaped electrode extending in the Z1 direction and having a substantially uniform thickness, and has an outer periphery GG21 with a length NG21 when cutting on a plane with the Z1 direction as the normal direction. In the sixth embodiment, although it is assumed that the electrode configuration part ZG21 has a quadrangular cross-sectional shape, the electrode configuration part ZG21 may have a polygonal cross-sectional shape other than a quadrangle.

The electrode configuration part ZG22 is a quadrangular prism-shaped electrode extending in the Z1 direction and having a substantially uniform thickness, and has an outer periphery GG22 with a length NG22 when cutting on a plane with the Z1 direction as the normal direction. In the sixth embodiment, although it is assumed that the electrode configuration part ZG22 has a quadrangular cross-sectional shape, the electrode configuration part ZG22 may have a polygonal cross-sectional shape other than a quadrangle. Further, in the sixth embodiment, although it is assumed that the length NG22 and the length NG21 are substantially the same length, the length NG22 may be shorter than the length NG21.

The bending part ZG2*x*1 is an electrode extending in the X1 direction.

The coupling part ZG2*x*11 couples the electrode configuration part ZG21 and the bending part ZG2*x*1.

The coupling part ZG2*x*12 couples the electrode configuration part ZG22 and the bending part ZG2*x*1.

The coupling part ZG2*t* is positioned in the Z2 direction when viewed from the electrode configuration part ZG21, is coupled to the electrode configuration part ZG21, and is electrically coupled to the wiring LG. In the sixth embodiment, the coupling part ZG2*t* has the same shape as that of the coupling part ZF2*t* according to the fifth embodiment and has an outer periphery GG2*t* with a length NG2*t* when cutting on a plane with the Z1 direction as the normal direction.

In the following, a part of the electrode rod DG2 excluding the coupling part ZG2*t* is referred to as an electrode configuration part ZG2.

Further, in the sixth embodiment, it is assumed that the electrode rod DG1 and the electrode rod DG2 are provided such that a distance, which is from an end portion of the electrode configuration part ZG12 in the Z1 direction to the bottom surface TKB of the ink tank TK[m], in the Z axis direction and a distance, which is from an end portion of the electrode configuration part ZG22 in the Z1 direction to the bottom surface TKB of the ink tank TK[m], in the Z axis direction become a distance HE.

Further, in the sixth embodiment, it is assumed that the electrode rod DG2 is provided such that a distance, which is from an end portion of the electrode configuration part ZG21 in the Z1 direction to the bottom surface TKB of the ink tank TK[m], in the Z axis direction becomes a distance H3.

Further, in the sixth embodiment, it is assumed that the electrode rod DG1 is provided such that a distance, which is from an end portion of the electrode configuration part ZG11 in the Z1 direction to the bottom surface TKB of the ink tank TK[m], in the Z axis direction becomes a distance H2.

Further, in the sixth embodiment, it is assumed that the electrode rod DG1 and the electrode rod DG2 are provided such that a distance, which is from an end portion of the electrode configuration part ZG1 in the Z2 direction to the bottom surface TKB of the ink tank TK[m], in the Z axis direction and a distance, which is from an end portion of the electrode configuration part ZG2 in the Z2 direction to the bottom surface TKB of the ink tank TK[m], in the Z axis direction become a distance H1.

Further, in the sixth embodiment, it is assumed that the electrode rod DG1 is positioned in the X1 direction when viewed from the electrode rod DG2. In the following, a distance between the electrode configuration part ZG11 and the electrode configuration part ZG21 in the X1 direction is referred to as a distance XG11, a distance between the electrode configuration part ZG12 and the electrode configuration part ZG21 in the X1 direction is referred to as a distance XG12, and a distance between the electrode configuration part ZG12 and the electrode configuration part ZG22 in the X1 direction is referred to as a distance XG22. In the sixth embodiment, the distance XG22 is longer than the distance XG12, and the distance XG12 is longer than the distance XG11. Further, in the sixth embodiment, it is assumed that the distance XG22 is substantially the same length as the distance XW according to the reference example.

Figure 31:
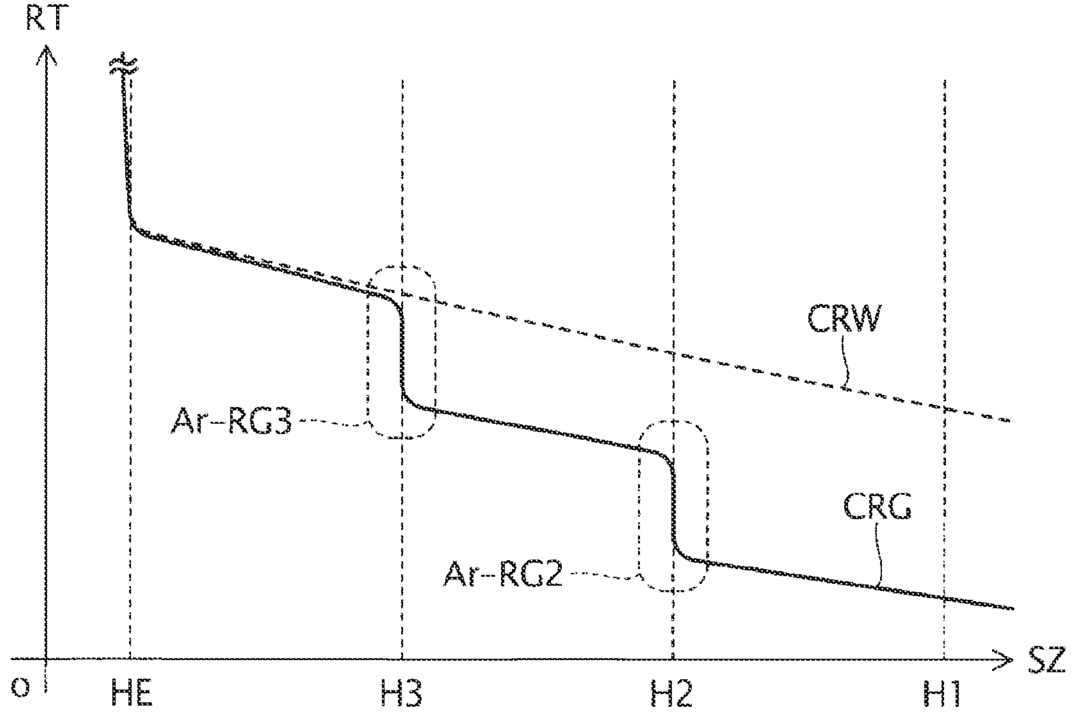
FIG. 31 is an explanatory diagram illustrating an example of a relationship between the ink liquid level distance and an ink resistor.

FIG. 31 is an explanatory diagram for explaining an example of a relationship between the ink liquid level distance SZ and an ink resistor RT according to the sixth embodiment. Specifically, FIG. 31 illustrates an example of a resistance value change curve CRG indicating a relationship between the ink liquid level distance SZ and a resistance value of the ink resistor RT according to the sixth embodiment when the horizontal axis is set to ink liquid level distance SZ and the vertical axis is set to the resistance value of the ink resistor RT according to the sixth embodiment. Here, the ink resistor RT according to the sixth embodiment is a resistor included in the ink IK that electrically couples the electrode rod DG1 and the electrode rod DG2 when the electrode rod DG1 and the electrode rod DG2, which are accommodated in the ink tank TK[m], are electrically coupled via the ink IK accommodated in the ink tank TK[m]. In the following, in order to distinguish the ink resistor RT according to the first embodiment, the ink resistor RT according to the sixth embodiment may be referred to as an ink resistor RTG.

For convenience of description, FIG. 31 illustrates the resistance value change curve CRW with a broken line together with the resistance value change curve CRG.

As described above, when the ink liquid level distance SZ is equal to or longer than the distance HE, the electrode configuration part ZG12 is in contact with the ink IK and the electrode configuration part ZG22 is in contact with the ink IK. Therefore, as indicated by the resistance value change curve CRG in FIG. 31, when the ink liquid level distance SZ is equal to or longer than the distance HE, the ink resistor RTG becomes a small resistance value as compared with the case where the ink liquid level distance SZ is shorter than the distance HE.

Further, when the ink liquid level distance SZ is equal to or longer than the distance H3, the electrode configuration part ZG21 is in contact with the ink IK. As described above, the distance XG12 is shorter than the distance XG22. Therefore, the resistance value change curve CRG includes a change region Ar-RG3 where the ink resistor RTG is changed greatly in a part where the ink liquid level distance SZ becomes the distance H3. As indicated by the resistance value change curve CRG, when the ink liquid level distance SZ is equal to or longer than the distance H3, the ink resistor RTG becomes a small resistance value as compared with the case where the ink liquid level distance SZ is shorter than the distance H3.

Further, when the ink liquid level distance SZ is equal to or longer than the distance H2, the electrode configuration part ZG11 is in contact with the ink IK. As described above, the distance XG11 is shorter than the distance XG12. Therefore, the resistance value change curve CRG includes a change region Ar-RG2 where the ink resistor RTG is changed greatly in a part where the ink liquid level distance SZ becomes the distance H2. As indicated by the resistance value change curve CRG, when the ink liquid level distance SZ is equal to or longer than the distance H2, the ink resistor RTG becomes a small resistance value as compared with the case where the ink liquid level distance SZ is shorter than the distance H2.

The resistance value of the ink resistor RTG becomes smaller as a cross-sectional area becomes larger. Therefore, as indicated by the resistance value change curve CRG, the ink resistor RTG becomes smaller as the ink liquid level distance SZ becomes longer.

Figure 32:
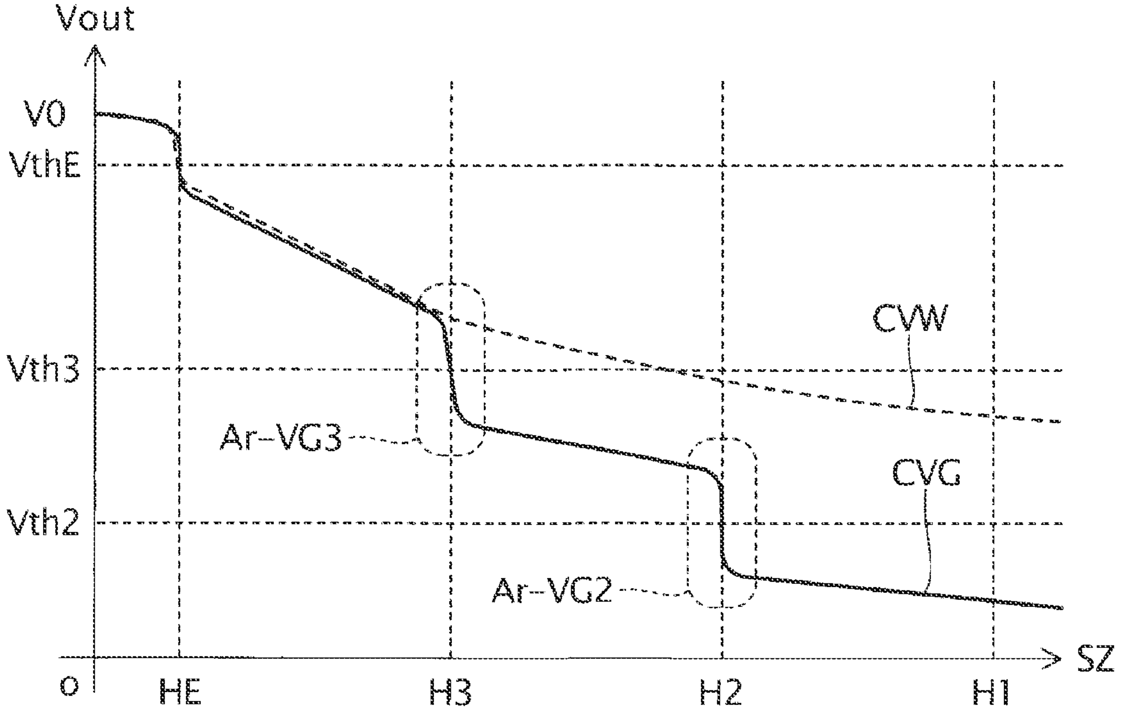
FIG. 32 is an explanatory diagram illustrating an example of a relationship between the ink liquid level distance and a detection signal.

FIG. 32 is an explanatory diagram for explaining an example of a relationship between the ink liquid level distance SZ and the detection signal Vout according to the sixth embodiment. Specifically, FIG. 32 illustrates an example of a potential change curve CVG indicating a relationship between the ink liquid level distance SZ and the potential of the detection signal Vout according to the sixth embodiment when the horizontal axis is set to the ink liquid level distance SZ and the vertical axis is set to the potential of the detection signal Vout according to the sixth embodiment. Here, the detection signal Vout according to the sixth embodiment is a detection signal Vout output by the ink accommodating device 1G. In the following, in order to distinguish the detection signal Vout according to the first embodiment, the detection signal Vout according to the sixth embodiment may be referred to as a detection signal Vout-G.

For convenience of description, FIG. 32 illustrates the potential change curve CVW with a broken line together with the potential change curve CVG.

As indicated by the potential change curve CVG in FIG. 32, the potential of the detection signal Vout-G becomes lower as the ink liquid level distance SZ becomes longer.

Further, as described above, the resistance value change curve CRG includes the change region Ar-RG3 where the ink resistor RTG is changed greatly in a part where the ink liquid level distance SZ becomes the distance H3. Therefore, the potential change curve CVG also includes a change region Ar-VG3 where the detection signal Vout-G is changed greatly in a part where the ink liquid level distance SZ becomes the distance H3.

Further, as described above, the resistance value change curve CRG includes the change region Ar-RG2 where the ink resistor RTG is changed greatly in a part where the ink liquid level distance SZ becomes the distance H2. Therefore, the potential change curve CVG also includes a change region Ar-VG2 where the detection signal Vout-G is changed greatly in a part where the ink liquid level distance SZ becomes the distance H2.

In the sixth embodiment, as illustrated in FIG. 32, when a temperature of the ink IK in the ink tank TK[m] is a reference temperature t1 and when the ink liquid level distance SZ in the ink tank TK[m] is the distance HE, the potential indicated by the detection signal Vout-G is defined as the threshold potential VthE. Further, in the sixth embodiment, when a temperature of the ink IK in the ink tank TK[m] is a reference temperature t1 and when the ink liquid level distance SZ in the ink tank TK[m] is the distance H3, the potential indicated by the detection signal Vout-G is defined as a threshold potential Vth3. Further, in the sixth embodiment, when a temperature of the ink IK in the ink tank TK[m] is a reference temperature t1 and when the ink liquid level distance SZ in the ink tank TK[m] is the distance H2, the potential indicated by the detection signal Vout-G is defined as a threshold potential Vth2.

As described above, in the sixth embodiment, the detection signal Vout-G output by the ink accommodating device 1G includes the change region Ar-VG2 and the change region Ar-VG3, which are regions where the detection signal Vout-G is changed greatly with respect to an amount of change in the ink liquid level distance SZ. Therefore, according to the sixth embodiment, even when fluctuation occurs in the potential of the detection signal Vout-G due to the temperature change of the ink IK in the ink tank TK[m], the noise superimposing on the detection signal Vout-G, or the like, compared to the reference example, the remaining amount of the ink IK in the ink tank TK[m] can be accurately detected based on the detection signal Vout-G.

6.2. Conclusion of Sixth Embodiment

As described above, the ink jet printer according to the sixth embodiment includes: the ink tank TK[m] accommodating the conductive ink IK; the electrode rod DG1 accommodated in the ink tank TK[m]; the electrode rod DG2 accommodated in the ink tank TK[m]; the ink amount detection circuit 2 that is electrically coupled to the electrode rod DG1 and the electrode rod DG2 and that detects the remaining amount of the ink IK accommodated in the ink tank TK[m] in response to the electric signal from at least one of the electrode rod DG1 and the electrode rod DG2; and the liquid discharging head HU[m] discharging the ink IK supplied from the ink tank TK[m], in which the electrode rod DG1 includes the electrode configuration part ZG11 of which a distance from the electrode rod DG2 is the distance XG11, and the electrode configuration part ZG12 of which a distance from the electrode rod DG2 is the distance XG12 that is longer than the distance XG11, and the electrode rod DG2 includes the electrode configuration part ZG21 of which a distance from the electrode rod DG1 is the distance XG11, and the electrode configuration part ZG22 of which a distance from the electrode rod DG1 is the distance XG22 that is longer than the distance XG11.

In the present embodiment, the electrode rod DG1 is an example of a "first electrode", the electrode rod DG2 is an example of a "second electrode", the electrode configuration part ZG11 is an example of a "first part", the electrode configuration part ZG12 is an example of a "second part", the electrode configuration part ZG21 is an example of a "third part", the electrode configuration part ZG22 is an example of a "fourth part", the distance XG11 is an example of a "first distance" and a "third distance, the distance XG12 is an example of a "second distance", and the distance XG22 is an example of a "fourth distance".

As described above, the electrode rod DG1 according to the present embodiment includes the electrode configuration part ZG11 of which a distance from the electrode rod DG2 is the distance XG11 and the electrode configuration part ZG12 of which a distance from the electrode rod DG2 is the distance XG12 that is longer than the distance XG11. Further, the electrode rod DG2 according to the present embodiment includes the electrode configuration part ZG21 of which a distance from the electrode rod DG1 is the distance XG11 and the electrode configuration part ZG22 of which a distance from the electrode rod DG1 is the distance XG22 that is longer than the distance XG11. Therefore, according to the present embodiment, as in the reference example, as compared with the embodiment in which the rod-shaped electrode rod DW1 and the rod-shaped electrode rod DW2 extend substantially parallel, it is possible to cause a large change in the signal levels of the electric signals from the electrode rod DG1 and the electrode rod DG2 in accordance with the change in the amount of the ink IK accommodated in the ink tank TK[m]. Accordingly, according to the present embodiment, as in the reference example, as compared with the embodiment in which the rod-shaped electrode rod DW1 and the rod-shaped electrode rod DW2 extend substantially parallel, the remaining amount of the ink IK accommodated in the ink tank TK[m] can be accurately detected.

Further, in the ink jet printer according to the sixth embodiment, the electrode configuration part ZG11 is provided to extend in the Z1 direction, the electrode rod DG1 includes the bending part ZG1*x*1, which extends in the X1 direction intersecting the Z1 direction, and the coupling part ZG1*x*11, which couples the electrode configuration part ZG11 and the bending part ZG1*x*1, between the electrode configuration part ZG11 and the electrode configuration part ZG12, the electrode configuration part ZG21 is provided to extend in the Z1 direction, and the electrode rod DG2 includes the bending part ZG2*x*1, which extends in the X1 direction intersecting the Z1 direction, and the coupling part ZG2*x*11, which couples the electrode configuration part ZG21 and the bending part ZG2*x*1, between the electrode configuration part ZG21 and the electrode configuration part ZG22.

In the present embodiment, the Z1 direction is an example of a "first direction" and a "third direction", the X1 direction is an example of a "first intersecting direction" and a "second intersecting direction", the bending part ZG1*x*1 is an example of a "first intersecting part", and the coupling part ZG1*x*11 is an example of a "first coupling part". The bending part ZG2*x*1 is an example of a "second intersecting part", and the coupling part ZG2*x*11 is an example of a "third coupling part".

As described above, according to the present embodiment, the electrode rod DG2 includes the bending part ZG2*x*1 extending in the X1 direction. Therefore, according to the present embodiment, a distance between the electrode configuration part ZG22 and the electrode rod DG1 can be made longer than the distance between the electrode configuration part ZG21 and the electrode rod DG1. Accordingly, according to the present embodiment, as in the reference example, as compared with the embodiment in which the rod-shaped electrode rod DW1 and the rod-shaped electrode rod DW2 extend substantially parallel, the remaining amount of the ink IK accommodated in the ink tank TK[m] can be accurately detected.

Further, in the ink jet printer according to the sixth embodiment, the electrode rod DG1 includes the coupling part ZG1*x*12 that couples the electrode configuration part ZG12 and the bending part ZG1*x*1, and the electrode rod DG2 includes the coupling part ZG2*x*12 that couples the electrode configuration part ZG22 and the bending part ZG2*x*1.

In the present embodiment, the coupling part ZG1*x*12 is an example of a "third coupling part", and the coupling part ZG2*x*12 is an example of a "fourth coupling part".

According to the present embodiment, since the distance between the electrode configuration part ZG22 and the electrode rod DG1 can be made longer than the distance between the electrode configuration part ZG21 and the electrode rod DG1, as compared with the embodiment in which the rod-shaped electrode rod DW1 and the rod-shaped electrode rod DW2 extend substantially parallel as in the reference example, the remaining amount of the ink IK accommodated in the ink tank TK[m] can be accurately detected.

Further, in the ink jet printer according to the sixth embodiment, the cross-sectional shape of the electrode rod DG1 may be a polygon, and the cross-sectional shape of the electrode rod DG2 may be a polygon.

According to the embodiment, for example, as compared with the embodiment in which the cross-sectional shapes of the electrode rod DG1 and the electrode rod DG2 are a curved surfaces, the electrode rod DG1 and the electrode rod DG2 in the ink tank TK[m] can be easily disposed, and the distance between the electrode rod DG1 and the electrode rod DG2 can be easily set to a desired distance.

7. Seventh Embodiment

In the following, an ink jet printer according to a seventh embodiment will be explained with reference to FIGS. 33 to 35.

7.1. Ink Jet Printer According to Seventh Embodiment

The ink jet printer according to the seventh embodiment differs from the ink jet printer 100 according to the first embodiment in that an ink accommodating device 1H is provided instead of the ink accommodating device 1.

Figure 33:
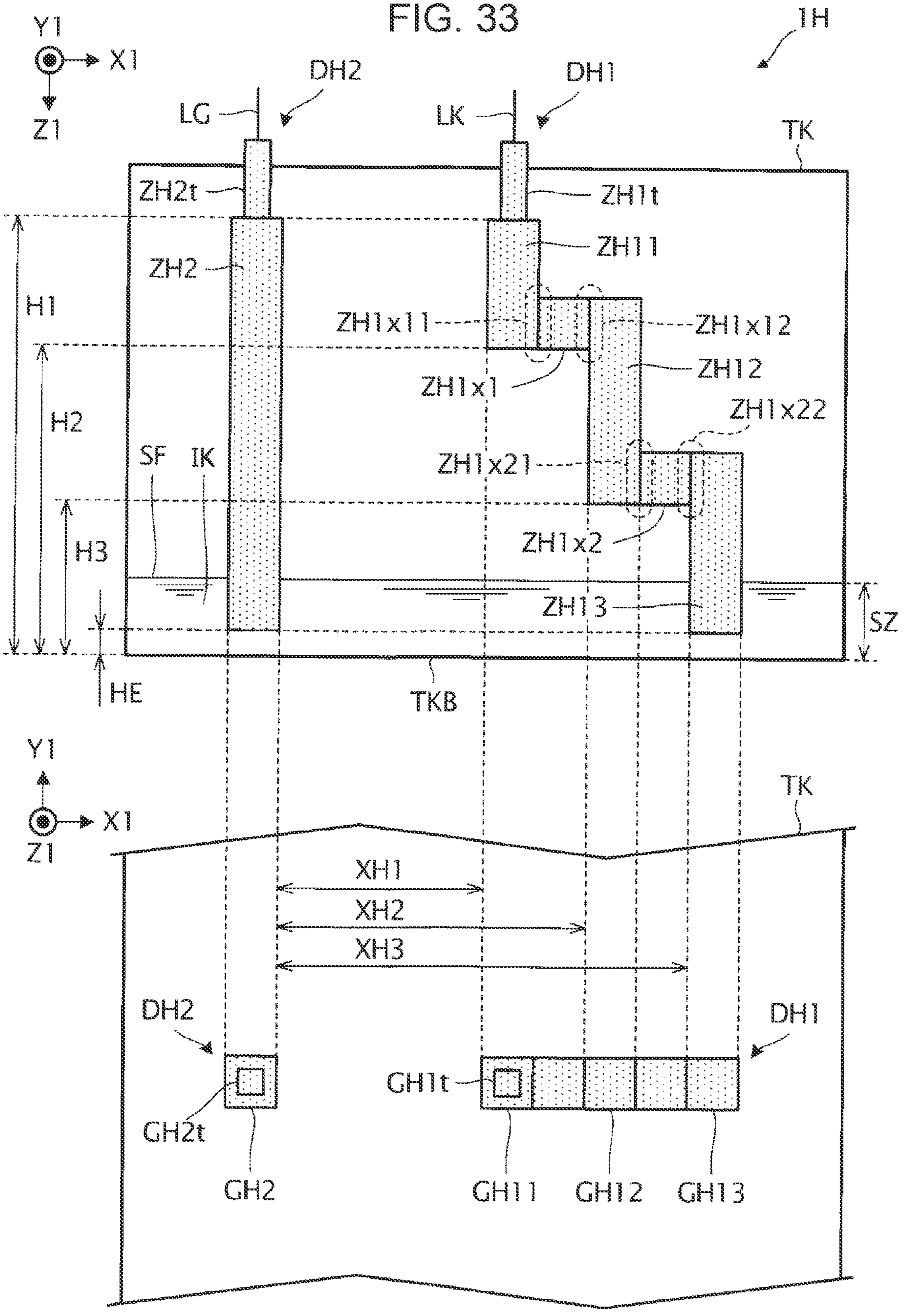
FIG. 33 is an explanatory diagram illustrating an example of a configuration of an electrode rod and an electrode rod according to a seventh embodiment.

FIG. 33 is a configuration diagram for explaining an example of a configuration of an electrode rod DH1 and an electrode rod DH2 provided in the ink accommodating device 1H. It is assumed that the ink accommodating device 1H is configured in the same manner as the ink accommodating device 1 according to the first embodiment regarding the ink tank TK[m] except that the electrode rod DH1 is accommodated instead of the electrode rod DA1, and the electrode rod DH2 is accommodated instead of the electrode rod DA2.

As illustrated in FIG. 33, the electrode rod DH1 includes a conductive electrode configuration part ZH11, a conductive electrode configuration part ZH12, a conductive electrode configuration part ZH13, a conductive bending part ZH1*x*1, a conductive bending part ZH1*x*2, a conductive coupling part ZH1*x*11, a conductive coupling part ZH1*x*12, a conductive coupling part ZH1*x*21, a conductive coupling part ZH1*x*22, and a conductive coupling part ZH1*t*. In the following, a part of the electrode rod DH1 excluding the coupling part ZH1*t* may be referred to as an electrode configuration part ZH1.

The electrode configuration part ZH11 is a quadrangular prism-shaped electrode extending in the Z1 direction and having a substantially uniform thickness, and has an outer periphery GH11 with a length NH11 when cutting on a plane with the Z1 direction as the normal direction. In the seventh embodiment, although it is assumed that the electrode configuration part ZH11 has a quadrangular cross-sectional shape, the electrode configuration part ZH11 may have a polygonal cross-sectional shape other than a quadrangle.

The electrode configuration part ZH12 is a quadrangular prism-shaped electrode extending in the Z1 direction and having a substantially uniform thickness, and has an outer periphery GH12 with a length NH12 when cutting on a plane with the Z1 direction as the normal direction. In the seventh embodiment, although it is assumed that the electrode configuration part ZH12 has a quadrangular cross-sectional shape, the electrode configuration part ZH12 may have a polygonal cross-sectional shape other than a quadrangle. Further, in the seventh embodiment, although it is assumed that the length NH12 and the length NH11 are substantially the same length, the length NH12 may be shorter than the length NH11.

The electrode configuration part ZH13 is a quadrangular prism-shaped electrode extending in the Z1 direction and having a substantially uniform thickness, and has an outer periphery GH13 with a length NH13 when cutting on a plane with the Z1 direction as the normal direction. In the seventh embodiment, although it is assumed that the electrode configuration part ZH13 has a quadrangular cross-sectional shape, the electrode configuration part ZH13 may have a polygonal cross-sectional shape other than a quadrangle. Further, in the seventh embodiment, although it is assumed that the length NH13 and the length NH12 are substantially the same length, the length NH13 may be shorter than the length NH12.

The bending part ZH1*x*1 is an electrode extending in the X1 direction.

The bending part ZH1*x*2 is an electrode extending in the X1 direction.

The coupling part ZH1*x*11 couples the electrode configuration part ZH11 and the bending part ZH1*x*1.

The coupling part ZH1*x*12 couples the electrode configuration part ZH12 and the bending part ZH1*x*1.

The coupling part ZH1*x*21 couples the electrode configuration part ZH12 and the bending part ZH1*x*2.

The coupling part ZH1*x*22 couples the electrode configuration part ZH13 and the bending part ZH1*x*2.

The coupling part ZH1*t* is positioned in the Z2 direction when viewed from the electrode configuration part ZH11, is coupled to the electrode configuration part ZH11, and is electrically coupled to the wiring LK. In the seventh embodiment, the coupling part ZH1*t* has the same shape as that of the coupling part ZG1*t* according to the sixth embodiment and has an outer periphery GH1*t* with a length NH1*t* when cutting on a plane with the Z1 direction as the normal direction.

The electrode rod DH2 has the same shape as that of the electrode rod DF2 according to the fifth embodiment and has a conductive electrode configuration part ZH2 and a conductive coupling part ZH2*t*.

The electrode configuration part ZH2 has the same shape as that of the electrode configuration part ZF2 according to the fifth embodiment and has an outer periphery GH2 with a length NH2 when cutting on a plane with the Z1 direction as the normal direction.

The coupling part ZH2*t* has the same shape as that of the coupling part ZF2*t* according to the fifth embodiment and has an outer periphery GH2*t* with a length NH2*t* when cutting on a plane with the Z1 direction as the normal direction. The coupling part ZH2*t* electrically couples the electrode configuration part ZH2 and the wiring LG.

Further, in the seventh embodiment, it is assumed that the electrode rod DH1 and the electrode rod DH2 are provided such that a distance, which is from an end portion of the electrode configuration part ZH13 in the Z1 direction to the bottom surface TKB of the ink tank TK[m], in the Z axis direction and a distance, which is from an end portion of the electrode configuration part ZH2 in the Z1 direction to the bottom surface TKB of the ink tank TK[m], in the Z axis direction become a distance HE.

Further, in the seventh embodiment, it is assumed that the electrode rod DH1 is provided such that a distance, which is from an end portion of the electrode configuration part ZH12 in the Z1 direction to the bottom surface TKB of the ink tank TK[m], in the Z axis direction becomes a distance H3.

Further, in the seventh embodiment, it is assumed that the electrode rod DH1 is provided such that a distance, which is from an end portion of the electrode configuration part ZH11 in the Z1 direction to the bottom surface TKB of the ink tank TK[m], in the Z axis direction becomes a distance H2.

Further, in the seventh embodiment, it is assumed that the electrode rod DH1 and the electrode rod DH2 are provided such that a distance, which is from an end portion of the electrode configuration part ZH1 in the Z2 direction to the bottom surface TKB of the ink tank TK[m], in the Z axis direction and a distance, which is from an end portion of the electrode configuration part ZH2 in the Z2 direction to the bottom surface TKB of the ink tank TK[m], in the Z axis direction become a distance H1.

Further, in the seventh embodiment, it is assumed that the electrode rod DH1 is positioned in the X1 direction when viewed from the electrode rod DH2. In the following, a distance between the electrode configuration part ZH11 and the electrode configuration part ZH2 in the X1 direction is referred to as a distance XH1, a distance between the electrode configuration part ZH12 and the electrode configuration part ZH2 in the X1 direction is referred to as a distance XH2, and a distance between the electrode configuration part ZH13 and the electrode configuration part ZH2 in the X1 direction is referred to as a distance XH3. In the seventh embodiment, the distance XH3 is longer than the distance XH2, and the distance XH2 is longer than the distance XH1. Further, in the seventh embodiment, it is assumed that the distance XH3 is substantially the same length as the distance XW according to the reference example.

Figure 34:
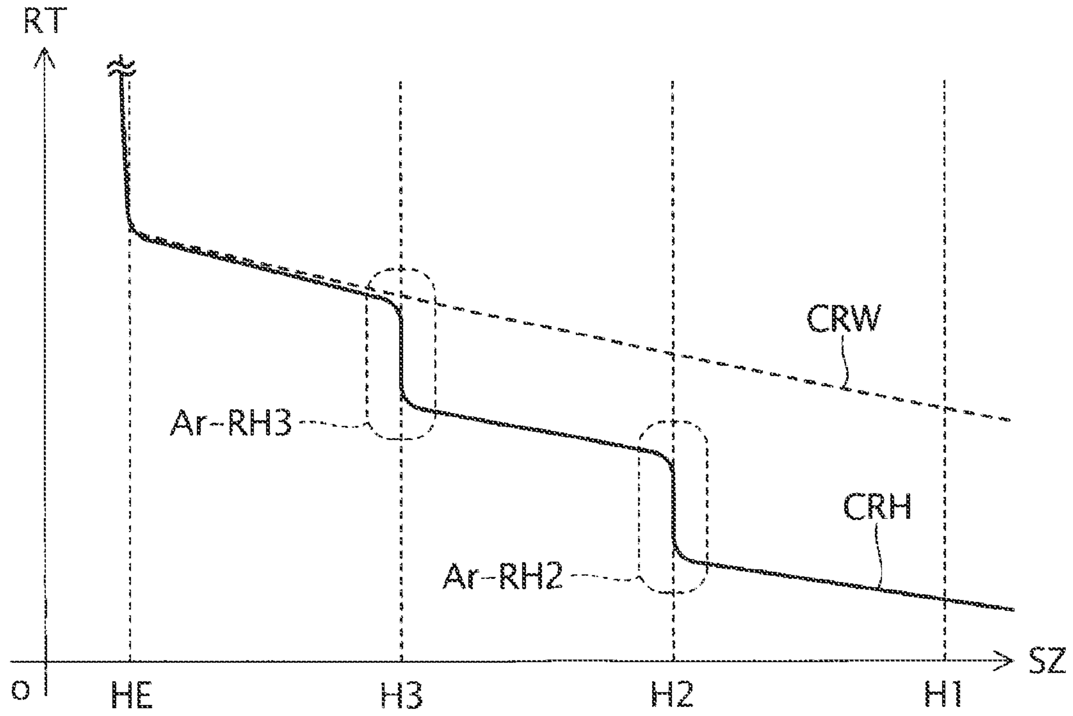
FIG. 34 is an explanatory diagram illustrating an example of a relationship between the ink liquid level distance and an ink resistor.

FIG. 34 is an explanatory diagram for explaining an example of a relationship between the ink liquid level distance SZ and an ink resistor RT according to the seventh embodiment. Specifically, FIG. 34 illustrates an example of a resistance value change curve CRH indicating a relationship between the ink liquid level distance SZ and a resistance value of the ink resistor RT according to the seventh embodiment when the horizontal axis is set to ink liquid level distance SZ and the vertical axis is set to the resistance value of the ink resistor RT according to the seventh embodiment. Here, the ink resistor RT according to the seventh embodiment is a resistor included in the ink IK that electrically couples the electrode rod DH1 and the electrode rod DH2 when the electrode rod DH1 and the electrode rod DH2, which are accommodated in the ink tank TK[m], are electrically coupled via the ink IK accommodated in the ink tank TK[m]. In the following, in order to distinguish the ink resistor RT according to the first embodiment, the ink resistor RT according to the seventh embodiment may be referred to as an ink resistor RTH.

For convenience of description, FIG. 34 illustrates the resistance value change curve CRW with a broken line together with the resistance value change curve CRH.

As described above, when the ink liquid level distance SZ is equal to or longer than the distance HE, the electrode configuration part ZH13 is in contact with the ink IK and the electrode configuration part ZH2 is in contact with the ink IK. Therefore, as indicated by the resistance value change curve CRH in FIG. 34, when the ink liquid level distance SZ is equal to or longer than the distance HE, the ink resistor RTH becomes a small resistance value as compared with the case where the ink liquid level distance SZ is shorter than the distance HE.

Further, when the ink liquid level distance SZ is equal to or longer than the distance H3, the electrode configuration part ZH12 is in contact with the ink IK. As described above, the distance XH2 is shorter than the distance XH3. Therefore, the resistance value change curve CRH includes a change region Ar-RH3 where the ink resistor RTH is changed greatly in a part where the ink liquid level distance SZ becomes the distance H3. As indicated by the resistance value change curve CRH, when the ink liquid level distance SZ is equal to or longer than the distance H3, the ink resistor RTH becomes a small resistance value as compared with the case where the ink liquid level distance SZ is shorter than the distance H3.

Further, when the ink liquid level distance SZ is equal to or longer than the distance H2, the electrode configuration part ZH11 is in contact with the ink IK. As described above, the distance XH1 is shorter than the distance XH2. Therefore, the resistance value change curve CRH includes a change region Ar-RH2 where the ink resistor RTH is changed greatly in a part where the ink liquid level distance SZ becomes the distance H2. As indicated by the resistance value change curve CRH, when the ink liquid level distance SZ is equal to or longer than the distance H2, the ink resistor RTH becomes a small resistance value as compared with the case where the ink liquid level distance SZ is shorter than the distance H2.

The resistance value of the ink resistor RTH becomes smaller as a cross-sectional area becomes larger. Therefore, as indicated by the resistance value change curve CRH, the ink resistor RTH becomes smaller as the ink liquid level distance SZ becomes longer.

Figure 35:
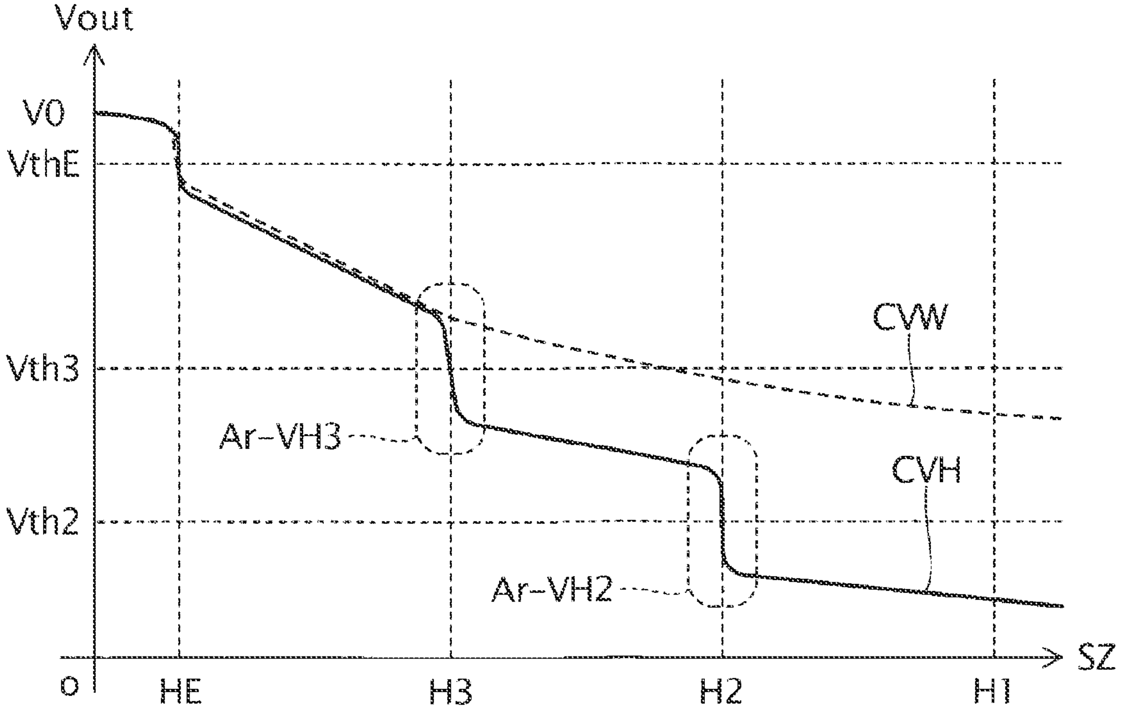
FIG. 35 is an explanatory diagram illustrating an example of a relationship between the ink liquid level distance and a detection signal.

FIG. 35 is an explanatory diagram for explaining an example of a relationship between the ink liquid level distance SZ and the detection signal Vout according to the seventh embodiment. Specifically, FIG. 35 illustrates an example of a potential change curve CVH indicating a relationship between the ink liquid level distance SZ and the potential of the detection signal Vout according to the seventh embodiment when the horizontal axis is set to the ink liquid level distance SZ and the vertical axis is set to the potential of the detection signal Vout according to the seventh embodiment. Here, the detection signal Vout according to the seventh embodiment is a detection signal Vout output by the ink accommodating device 1H. In the following, in order to distinguish the detection signal Vout according to the first embodiment, the detection signal Vout according to the seventh embodiment may be referred to as a detection signal Vout-H.

For convenience of description, FIG. 35 illustrates the potential change curve CVW with a broken line together with the potential change curve CVH.

As indicated by the potential change curve CVH in FIG. 35, the potential of the detection signal Vout-H becomes lower as the ink liquid level distance SZ becomes longer.

Further, as described above, the resistance value change curve CRH includes the change region Ar-RH3 where the ink resistor RTH is changed greatly in a part where the ink liquid level distance SZ becomes the distance H3. Therefore, the potential change curve CVH also includes a change region Ar-VH3 where the detection signal Vout-H is changed greatly in a part where the ink liquid level distance SZ becomes the distance H3.

Further, as described above, the resistance value change curve CRH includes the change region Ar-RH2 where the ink resistor RTH is changed greatly in a part where the ink liquid level distance SZ becomes the distance H2. Therefore, the potential change curve CVH also includes a change region Ar-VH2 where the detection signal Vout-H is changed greatly in a part where the ink liquid level distance SZ becomes the distance H2.

In the seventh embodiment, as illustrated in FIG. 35, when a temperature of the ink IK in the ink tank TK[m] is a reference temperature t1 and when the ink liquid level distance SZ in the ink tank TK[m] is the distance HE, the potential indicated by the detection signal Vout-H is defined as the threshold potential VthE. Further, in the seventh embodiment, when a temperature of the ink IK in the ink tank TK[m] is a reference temperature t1 and when the ink liquid level distance SZ in the ink tank TK[m] is the distance H3, the potential indicated by the detection signal Vout-H is defined as a threshold potential Vth3. Further, in the seventh embodiment, when a temperature of the ink IK in the ink tank TK[m] is a reference temperature t1 and when the ink liquid level distance SZ in the ink tank TK[m] is the distance H2, the potential indicated by the detection signal Vout-H is defined as a threshold potential Vth2.

7.2. Conclusion of Seventh Embodiment

As described above, in the seventh embodiment, the detection signal Vout-H output by the ink accommodating device 1H includes the change region Ar-VH2 and the change region Ar-VH3, which are regions where the detection signal Vout-H is changed greatly with respect to an amount of change in the ink liquid level distance SZ. Therefore, according to the seventh embodiment, even when fluctuation occurs in the potential of the detection signal Vout-H due to the temperature change of the ink IK in the ink tank TK[m], the noise superimposing on the detection signal Vout-H, or the like, compared to the reference example, the remaining amount of the ink IK in the ink tank TK[m] can be accurately detected based on the detection signal Vout-H.

8. Eighth Embodiment

In the following, an ink jet printer according to an eighth embodiment will be explained with reference to FIGS. 36 to 38.

8.1. Ink Jet Printer According to Eighth Embodiment

The ink jet printer according to the eighth embodiment differs from the ink jet printer 100 according to the first embodiment in that an ink accommodating device 1I is provided instead of the ink accommodating device 1.

Figure 36:
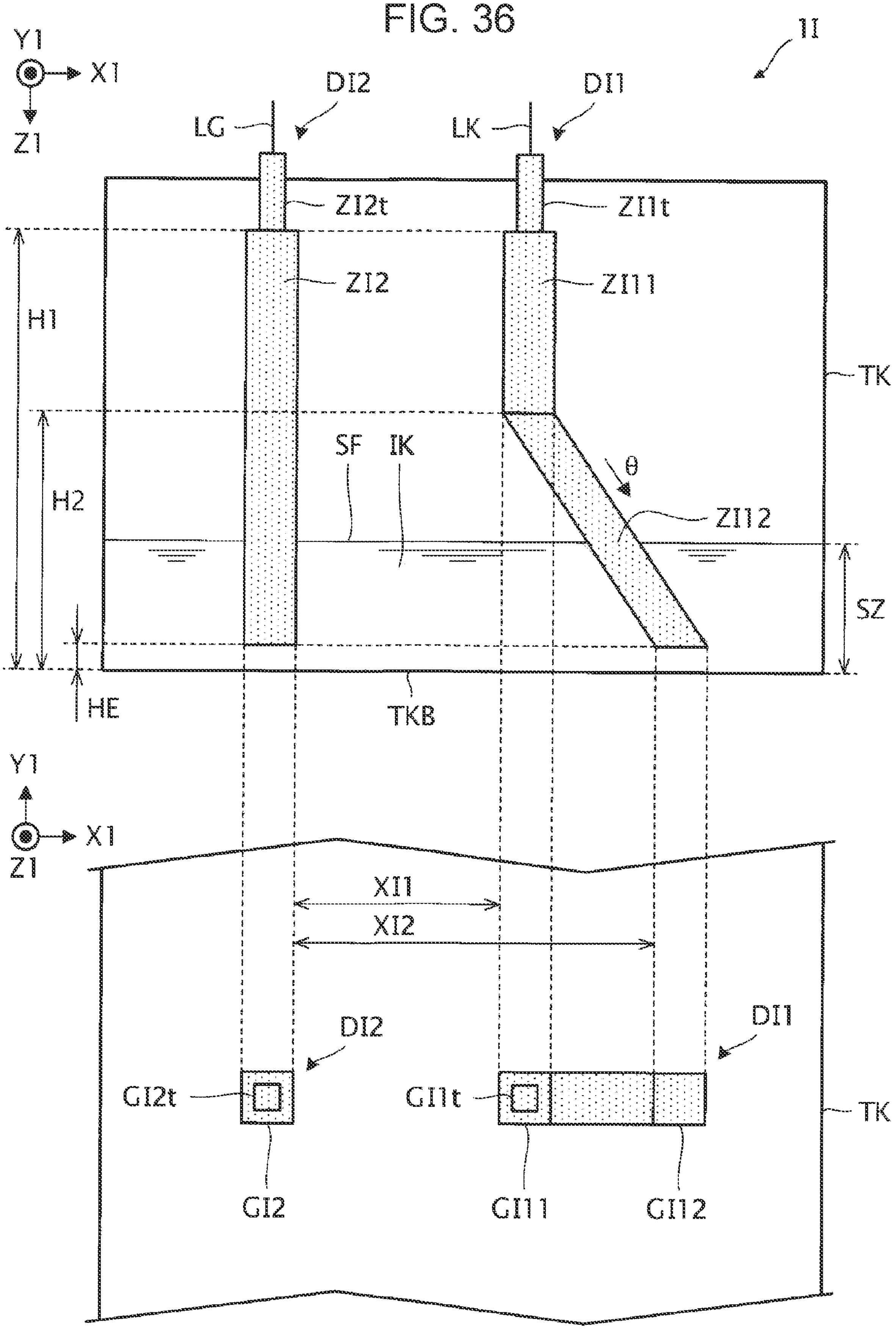
FIG. 36 is an explanatory diagram illustrating an example of a configuration of an electrode rod and an electrode rod according to an eighth embodiment.

FIG. 36 is a configuration diagram for explaining an example of a configuration of an electrode rod DI1 and an electrode rod DI2 provided in the ink accommodating device 1I. It is assumed that the ink accommodating device 1I is configured in the same manner as the ink accommodating device 1 according to the first embodiment regarding the ink tank TK[m] except that the electrode rod DI1 is accommodated instead of the electrode rod DA1, and the electrode rod DI2 is accommodated instead of the electrode rod DA2.

As illustrated in FIG. 36, the electrode rod DI1 includes a conductive electrode configuration part ZI11, a conductive electrode configuration part ZI12, and a conductive coupling part ZI1*t*. In the following, a part of the electrode rod DI1 excluding the coupling part ZI1*t* may be referred to as an electrode configuration part ZI1.

The electrode configuration part ZI11 is a quadrangular prism-shaped electrode extending in the Z1 direction and having a substantially uniform thickness, and has an outer periphery GI11 with a length NI11 when cutting on a plane with the Z1 direction as the normal direction. In the present embodiment, although it is assumed that the electrode configuration part ZI11 has a quadrangular cross-sectional shape, the present disclosure is not limited to such an embodiment, and the electrode configuration part ZI11 may have a polygonal cross-sectional shape other than a quadrangle.

The electrode configuration part ZI12 is a quadrangular prism-shaped electrode extending in the θ direction and having a substantially uniform thickness, and has an outer periphery GI12 with a length NI12 when cutting on a plane with the Z1 direction as the normal direction. Here, the θ direction is a direction between the Z1 direction and the X1 direction. In the present embodiment, although it is assumed that the length NI12 and the length NI11 are substantially the same length, the length NI12 may be shorter than the length NI11. Further, the electrode configuration part ZI12 is positioned in the Z1 direction when viewed from the electrode configuration part ZI11 and is coupled to the electrode configuration part ZI11.

The coupling part ZI1*t* is positioned in the Z2 direction when viewed from the electrode configuration part ZI11 and electrically couples the electrode configuration part ZI11 and the wiring LK. In the eighth embodiment, the coupling part ZI1*t* has the same shape as that of the coupling part ZH1*t* according to the seventh embodiment and has an outer periphery GI1*t* with a length NI1*t* when cutting on a plane with the Z1 direction as the normal direction.

The electrode rod DI2 has the same shape as that of the electrode rod DF2 according to the fifth embodiment and has a conductive electrode configuration part ZI2 and a conductive coupling part ZI2*t*.

The electrode configuration part ZI2 has the same shape as that of the electrode configuration part ZF2 according to the fifth embodiment and has an outer periphery GI2 with a length NI2 when cutting on a plane with the Z1 direction as the normal direction.

The coupling part ZI2*t* has the same shape as that of the coupling part ZF2*t* according to the fifth embodiment and has an outer periphery GI2*t* with a length NI2*t* when cutting on a plane with the Z1 direction as the normal direction. The coupling part ZI2*t* electrically couples the electrode configuration part ZI2 and the wiring LG.

Further, in the eighth embodiment, it is assumed that the electrode rod DI1 and the electrode rod DI2 are provided such that a distance, which is from an end portion of the electrode configuration part ZI1 in the Z1 direction to the bottom surface TKB of the ink tank TK[m], in the Z axis direction and a distance, which is from an end portion of the electrode configuration part ZI2 in the Z1 direction to the bottom surface TKB of the ink tank TK[m], in the Z axis direction become a distance HE.

Further, in the eighth embodiment, it is assumed that the electrode rod DI1 is provided such that a distance, which is from an end portion of the electrode configuration part ZI11 in the Z1 direction to the bottom surface TKB of the ink tank TK[m], in the Z axis direction becomes a distance H2.

Further, in the eighth embodiment, it is assumed that the electrode rod DI1 and the electrode rod DI2 are provided such that a distance, which is from an end portion of the electrode configuration part ZI1 in the Z2 direction to the bottom surface TKB of the ink tank TK[m], in the Z axis direction and a distance, which is from an end portion of the electrode configuration part ZI2 in the Z2 direction to the bottom surface TKB of the ink tank TK[m], in the Z axis direction become a distance H1.

Further, in the eighth embodiment, it is assumed that the electrode rod DI1 is positioned in the X1 direction when viewed from the electrode rod DI2. In the following, a distance between the electrode configuration part ZI11 and the electrode configuration part ZI2 in the X1 direction is referred to as a distance XI1, and a distance between an end portion of the electrode configuration part ZI12 in the Z1 direction and the electrode configuration part ZI2 in the X1 direction is referred to as a distance in the XI2. In the eighth embodiment, the distance XI2 is longer than the distance XI1. Further, in the eighth embodiment, it is assumed that the distance XI2 is substantially the same length as the distance XW according to the reference example.

Figure 37:
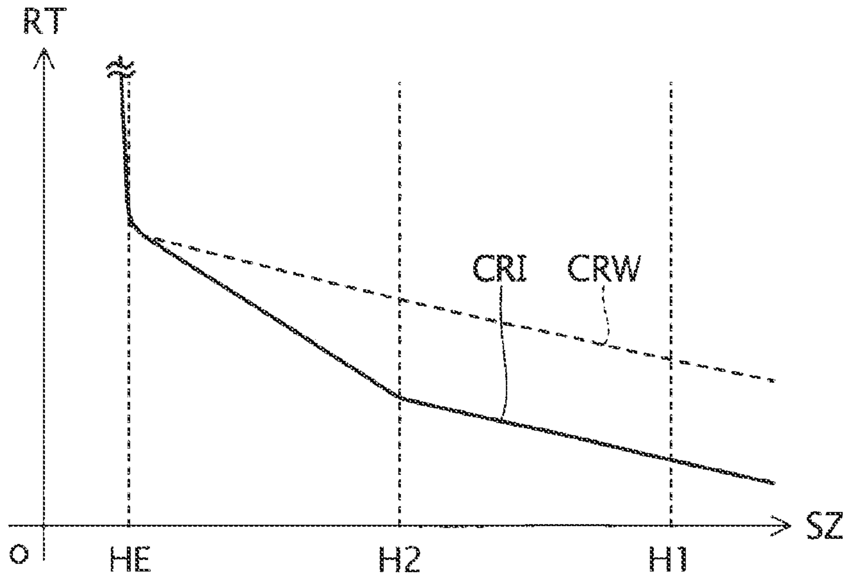
FIG. 37 is an explanatory diagram illustrating an example of a relationship between the ink liquid level distance and an ink resistor.

FIG. 37 is an explanatory diagram for explaining an example of a relationship between the ink liquid level distance SZ and an ink resistor RT according to the eighth embodiment. Specifically, FIG. 37 illustrates an example of a resistance value change curve CRI indicating a relationship between the ink liquid level distance SZ and a resistance value of the ink resistor RT according to the eighth embodiment when the horizontal axis is set to ink liquid level distance SZ and the vertical axis is set to the resistance value of the ink resistor RT according to the eighth embodiment. Here, the ink resistor RT according to the eighth embodiment is a resistor included in the ink IK that electrically couples the electrode rod DI1 and the electrode rod DI2 when the electrode rod DI1 and the electrode rod DI2, which are accommodated in the ink tank TK[m], are electrically coupled via the ink IK accommodated in the ink tank TK[m]. In the following, in order to distinguish the ink resistor RT according to the first embodiment, the ink resistor RT according to the eighth embodiment may be referred to as an ink resistor RTI.

For convenience of description, FIG. 37 illustrates the resistance value change curve CRW with a broken line together with the resistance value change curve CRI.

As described above, when the ink liquid level distance SZ is equal to or longer than the distance HE, the electrode configuration part ZI1 is in contact with the ink IK and the electrode configuration part ZI2 is in contact with the ink IK. Therefore, as indicated by the resistance value change curve CRI in FIG. 37, when the ink liquid level distance SZ is equal to or longer than the distance HE, the ink resistor RTI becomes a small resistance value as compared with the case where the ink liquid level distance SZ is shorter than the distance HE.

The resistance value of the ink resistor RTI becomes smaller as a cross-sectional area becomes larger. Therefore, as indicated by the resistance value change curve CRI, the ink resistor RTI becomes smaller as the ink liquid level distance SZ becomes longer.

Further, in the eighth embodiment, as described above, the electrode configuration part ZI12 extends in the θ direction, and the distance XI1 is shorter than the distance XI2. Therefore, when the ink liquid level distance SZ is equal to or longer than the distance HE and equal to or shorter than the distance H2, as compared with the resistance value of the ink resistor RTW indicated by the resistance value change curve CRW, a resistance value of the ink resistor RTI indicated by the resistance value change curve CRI becomes smaller suddenly as the ink liquid level distance SZ becomes longer.

Figure 38:
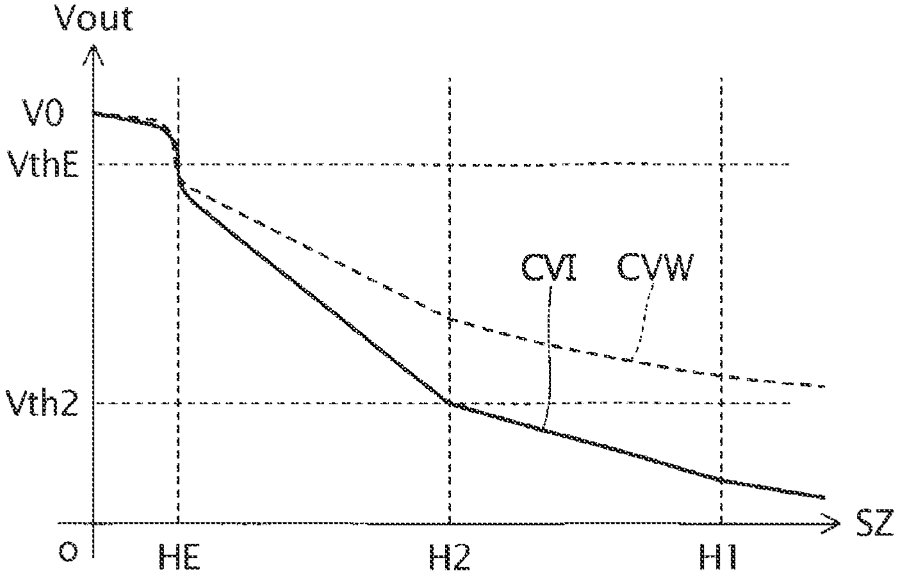
FIG. 38 is an explanatory diagram illustrating an example of a relationship between the ink liquid level distance and a detection signal.

FIG. 38 is an explanatory diagram for explaining an example of a relationship between the ink liquid level distance SZ and the detection signal Vout according to the eighth embodiment. Specifically, FIG. 38 illustrates an example of a potential change curve CVI indicating a relationship between the ink liquid level distance SZ and the potential of the detection signal Vout according to the eighth embodiment when the horizontal axis is set to the ink liquid level distance SZ and the vertical axis is set to the potential of the detection signal Vout according to the eighth embodiment. Here, the detection signal Vout according to the eighth embodiment is a detection signal Vout output by the ink accommodating device 1I. In the following, in order to distinguish the detection signal Vout according to the first embodiment, the detection signal Vout according to the eighth embodiment may be referred to as a detection signal Vout-I.

For convenience of description, FIG. 38 illustrates the potential change curve CVW with a broken line together with the potential change curve CVI.

As indicated by the potential change curve CVI in FIG. 38, the potential of the detection signal Vout-I becomes lower as the ink liquid level distance SZ becomes longer. Further, as described above, in the resistance value change curve CRI, an amount of decrease in the ink resistor RTI is large as the ink liquid level distance SZ is increased as compared with the resistance value change curve CRW. Therefore, the potential change curve CVI also has a shape in which an amount of decrease in the detection signal Vout-I is large as the ink liquid level distance SZ is increased, as compared with the potential change curve CVW.

In the eighth embodiment, as illustrated in FIG. 38, when a temperature of the ink IK in the ink tank TK[m] is a reference temperature t1 and when the ink liquid level distance SZ in the ink tank TK[m] is the distance HE, the potential indicated by the detection signal Vout-I is defined as the threshold potential VthE. Further, in the eighth embodiment, when a temperature of the ink IK in the ink tank TK[m] is a reference temperature t1 and when the ink liquid level distance SZ in the ink tank TK[m] is the distance H2, the potential indicated by the detection signal Vout-I is defined as a threshold potential Vth2.

8.2. Conclusion of Eighth Embodiment

As described above, in the eighth embodiment, the detection signal Vout-I output by the ink accommodating device 1I is changed greatly as compared with the detection signal Vout-W with respect to the amount of change in the ink liquid level distance SZ. Therefore, according to the eighth embodiment, even when fluctuation occurs in the potential of the detection signal Vout-I due to the temperature change of the ink IK in the ink tank TK[m], the noise superimposing on the detection signal Vout-I, or the like, compared to the reference example, the remaining amount of the ink IK in the ink tank TK[m] can be accurately detected based on the detection signal Vout-I.

9. Ninth Embodiment

In the following, an ink jet printer according to a ninth embodiment will be explained with reference to FIGS. 39 to 41.

9.1. Ink Jet Printer According to Ninth Embodiment

The ink jet printer according to the ninth embodiment differs from the ink jet printer 100 according to the first embodiment in that an ink accommodating device 1J is provided instead of the ink accommodating device 1.

Figure 39:
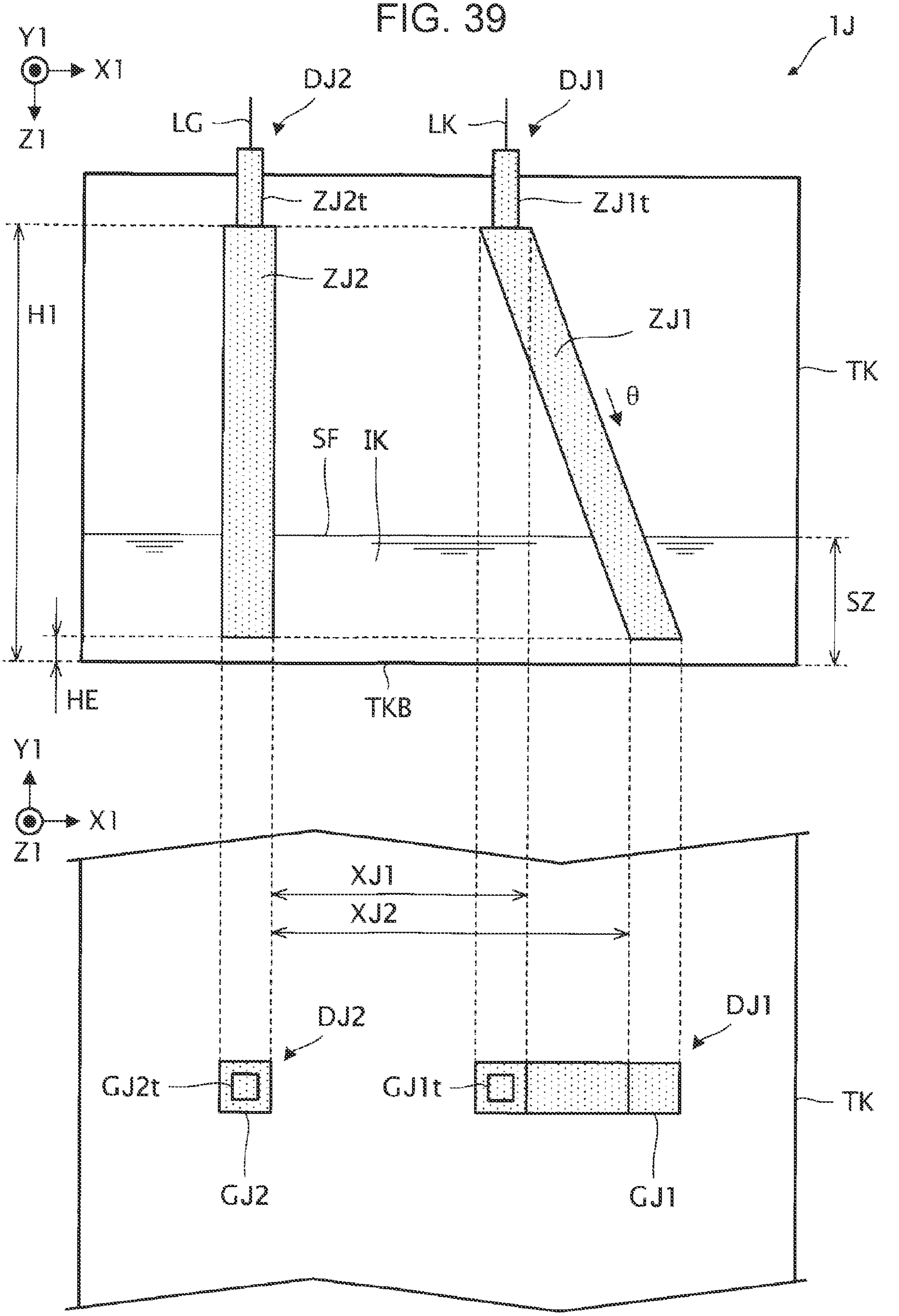
FIG. 39 is an explanatory diagram illustrating an example of a configuration of an electrode rod and an electrode rod according to a ninth embodiment.

FIG. 39 is a configuration diagram for explaining an example of a configuration of an electrode rod DJ1 and an electrode rod DJ2 provided in the ink accommodating device 1J. It is assumed that the ink accommodating device 1J is configured in the same manner as the ink accommodating device 1 according to the first embodiment regarding the ink tank TK[m] except that the electrode rod DJ1 is accommodated instead of the electrode rod DA1, and the electrode rod DJ2 is accommodated instead of the electrode rod DA2.

As illustrated in FIG. 39, the electrode rod DJ1 has a conductive electrode configuration part ZJ1 and a conductive coupling part ZJ1*t*.

The electrode configuration part ZJ1 is a quadrangular prism-shaped electrode extending in the θ direction and having a substantially uniform thickness, and has an outer periphery GJ1 with a length NJ1 when cutting on a plane with the Z1 direction as the normal direction. In the present embodiment, although it is assumed that the electrode configuration part ZJ1 has a quadrangular cross-sectional shape, the present disclosure is not limited to such an embodiment, and the electrode configuration part ZJ1 may have a polygonal cross-sectional shape other than a quadrangle.

The coupling part ZJ1*t* is positioned in the Z2 direction when viewed from the electrode configuration part ZJ1 and electrically couples the electrode configuration part ZJ1 and the wiring LK. In the ninth embodiment, the coupling part ZJ1*t* has the same shape as that of the coupling part ZI1*t* according to the eighth embodiment and has an outer periphery GJ1*t* with a length NJ1*t* when cutting on a plane with the Z1 direction as the normal direction.

The electrode rod DJ2 has the same shape as that of the electrode rod DF2 according to the fifth embodiment and has a conductive electrode configuration part ZJ2 and a conductive coupling part ZJ2*t*.

The electrode configuration part ZJ2 has the same shape as that of the electrode configuration part ZF2 according to the fifth embodiment and has an outer periphery GJ2 with a length NJ2 when cutting on a plane with the Z1 direction as the normal direction.

The coupling part ZJ2*t* has the same shape as that of the coupling part ZF2*t* according to the fifth embodiment and has an outer periphery GJ2*t* with a length NJ2*t* when cutting on a plane with the Z1 direction as the normal direction. The coupling part ZJ2*t* electrically couples the electrode configuration part ZJ2 and the wiring LG.

Further, in the ninth embodiment, it is assumed that the electrode rod DJ1 and the electrode rod DJ2 are provided such that a distance, which is from an end portion of the electrode configuration part ZJ1 in the Z1 direction to the bottom surface TKB of the ink tank TK[m], in the Z axis direction and a distance, which is from an end portion of the electrode configuration part ZJ2 in the Z1 direction to the bottom surface TKB of the ink tank TK[m], in the Z axis direction become a distance HE.

Further, in the ninth embodiment, it is assumed that the electrode rod DJ1 and the electrode rod DJ2 are provided such that a distance, which is from an end portion of the electrode configuration part ZJ1 in the Z2 direction to the bottom surface TKB of the ink tank TK[m], in the Z axis direction and a distance, which is from an end portion of the electrode configuration part ZJ2 in the Z2 direction to the bottom surface TKB of the ink tank TK[m], in the Z axis direction become a distance H1.

Further, in the ninth embodiment, it is assumed that the electrode rod DJ1 is positioned in the X1 direction when viewed from the electrode rod DJ2. In the following, a distance between an end portion of the electrode configuration part ZJ1 in the Z2 direction and an end portion of the electrode configuration part ZJ2 in the Z2 direction, in the X1 direction is referred to as a distance XJ1, and a distance between an end portion of the electrode configuration part ZJ1 in the Z1 direction and an end portion of the electrode configuration part ZJ2 in the Z1 direction, in the X1 direction is referred to as a distance in the XJ2. In the ninth embodiment, the distance XJ2 is longer than the distance XJ1. Further, in the ninth embodiment, it is assumed that the distance XJ2 is substantially the same length as the distance XW according to the reference example.

Figure 40:
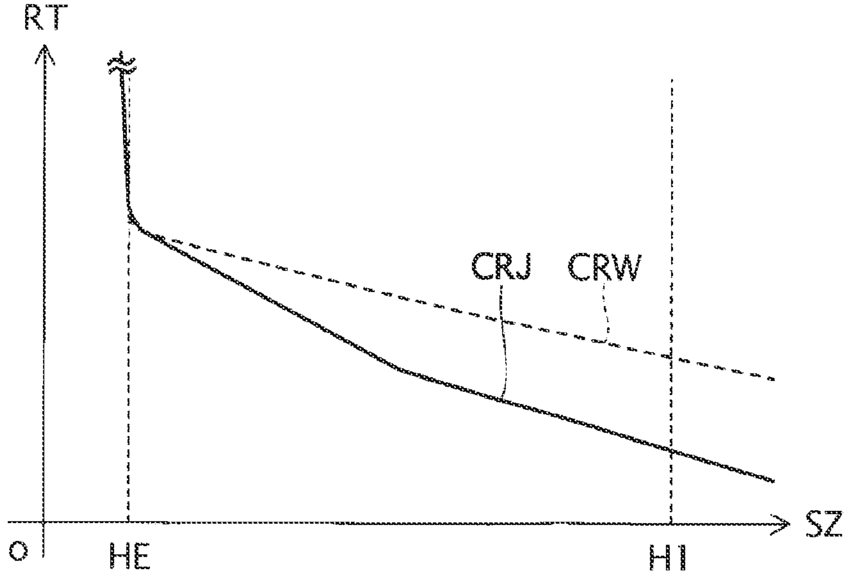
FIG. 40 is an explanatory diagram illustrating an example of a relationship between the ink liquid level distance and an ink resistor.

FIG. 40 is an explanatory diagram for explaining an example of a relationship between the ink liquid level distance SZ and an ink resistor RT according to the ninth embodiment. Specifically, FIG. 40 illustrates an example of a resistance value change curve CRJ indicating a relationship between the ink liquid level distance SZ and a resistance value of the ink resistor RT according to the ninth embodiment when the horizontal axis is set to ink liquid level distance SZ and the vertical axis is set to the resistance value of the ink resistor RT according to the ninth embodiment. Here, the ink resistor RT according to the ninth embodiment is a resistor included in the ink IK that electrically couples the electrode rod DJ1 and the electrode rod DJ2 when the electrode rod DJ1 and the electrode rod DJ2, which are accommodated in the ink tank TK[m], are electrically coupled via the ink IK accommodated in the ink tank TK[m]. In the following, in order to distinguish the ink resistor RT according to the first embodiment, the ink resistor RT according to the ninth embodiment may be referred to as an ink resistor RTJ.

For convenience of description, FIG. 40 illustrates the resistance value change curve CRW with a broken line together with the resistance value change curve CRJ.

As described above, when the ink liquid level distance SZ is equal to or longer than the distance HE, the electrode configuration part ZJ1 is in contact with the ink IK and the electrode configuration part ZJ2 is in contact with the ink IK. Therefore, as indicated by the resistance value change curve CRJ in FIG. 40, when the ink liquid level distance SZ is equal to or longer than the distance HE, the ink resistor RTJ becomes a small resistance value as compared with the case where the ink liquid level distance SZ is shorter than the distance HE.

The resistance value of the ink resistor RTJ becomes smaller as a cross-sectional area becomes larger. Therefore, as indicated by the resistance value change curve CRJ, the ink resistor RTJ becomes smaller as the ink liquid level distance SZ becomes longer.

Further, in the ninth embodiment, as described above, the electrode configuration part ZJ1 extends in the θ direction, and the distance XJ1 is shorter than the distance XJ2. Therefore, when the ink liquid level distance SZ is equal to or longer than the distance HE, as compared with the resistance value of the ink resistor RTW indicated by the resistance value change curve CRW, a resistance value of the ink resistor RTJ indicated by the resistance value change curve CRJ becomes smaller suddenly as the ink liquid level distance SZ becomes longer.

Figure 41:
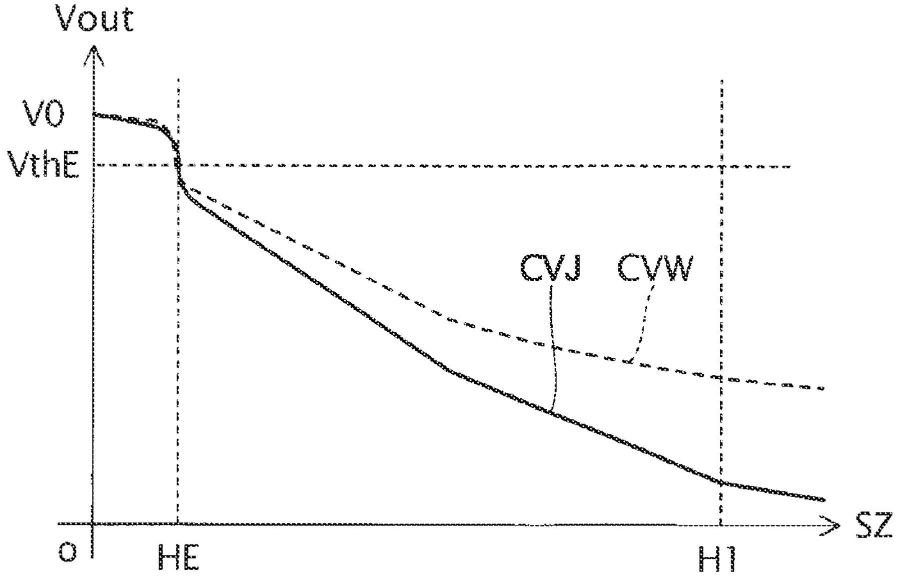
FIG. 41 is an explanatory diagram illustrating an example of a relationship between the ink liquid level distance and a detection signal.

FIG. 41 is an explanatory diagram for explaining an example of a relationship between the ink liquid level distance SZ and the detection signal Vout according to the ninth embodiment. Specifically, FIG. 41 illustrates an example of a potential change curve CVJ indicating a relationship between the ink liquid level distance SZ and the potential of the detection signal Vout according to the ninth embodiment when the horizontal axis is set to the ink liquid level distance SZ and the vertical axis is set to the potential of the detection signal Vout according to the ninth embodiment. Here, the detection signal Vout according to the ninth embodiment is a detection signal Vout output by the ink accommodating device 1J. In the following, in order to distinguish the detection signal Vout according to the first embodiment, the detection signal Vout according to the ninth embodiment may be referred to as a detection signal Vout-J.

For convenience of description, FIG. 41 illustrates the potential change curve CVW with a broken line together with the potential change curve CVJ.

As indicated by the potential change curve CVJ in FIG. 41, the potential of the detection signal Vout-J becomes lower as the ink liquid level distance SZ becomes longer. Further, as described above, in the resistance value change curve CRJ, an amount of decrease in the ink resistor RTJ is large as the ink liquid level distance SZ is increased as compared with the resistance value change curve CRW. Therefore, the potential change curve CVJ also has a shape in which an amount of decrease in the detection signal Vout-J is large as the ink liquid level distance SZ is increased, as compared with the potential change curve CVW.

In the ninth embodiment, as illustrated in FIG. 41, when a temperature of the ink IK in the ink tank TK[m] is a reference temperature t1 and when the ink liquid level distance SZ in the ink tank TK[m] is the distance HE, the potential indicated by the detection signal Vout-J is defined as the threshold potential VthE.

As described above, in the ninth embodiment, the detection signal Vout-J output by the ink accommodating device 1J is changed greatly as compared with the detection signal Vout-W with respect to the amount of change in the ink liquid level distance SZ. Therefore, according to the ninth embodiment, even when fluctuation occurs in the potential of the detection signal Vout-J due to the temperature change of the ink IK in the ink tank TK[m], the noise superimposing on the detection signal Vout-J, or the like, compared to the reference example, the remaining amount of the ink IK in the ink tank TK[m] can be accurately detected based on the detection signal Vout-J.

9.2. Conclusion of Ninth Embodiment

As described above, the ink jet printer according to the ninth embodiment includes: the ink tank TK[m] accommodating the conductive ink IK; the electrode rod DJ1 including the electrode configuration part ZJ1 accommodated in the ink tank TK[m]; the electrode rod DJ2 including the electrode configuration part ZJ2 accommodated in the ink tank TK[m]; the ink amount detection circuit 2 that is electrically coupled to the electrode rod DJ1 and the electrode rod DJ2 and that detects the remaining amount of the ink IK accommodated in the ink tank TK[m] in response to the electric signal from at least one of the electrode rod DJ1 and the electrode rod DJ2; and the liquid discharging head HU[m] discharging the ink IK supplied from the ink tank TK[m], in which the electrode configuration part ZJ1 includes the end portion of the electrode configuration part ZJ1, of which a distance from the electrode configuration part ZJ2 is the distance XJ1, in the Z2 direction and the end portion of the electrode configuration part ZJ1, of which a distance from the electrode configuration part ZJ2 is the distance XJ2 that is longer than the distance XJ1, in the Z1 direction, the electrode configuration part ZJ1 is provided to extend in the θ direction, and the electrode configuration part ZJ2 is provided to extend in the Z1 direction.

In the present embodiment, the electrode rod DJ1 is an example of a "first electrode", the electrode rod DJ2 is an example of a "second electrode", the end portion of the electrode configuration part ZJ1 in the Z2 direction is an example of a "first part", the end portion of the electrode configuration part ZJ1 in the Z1 direction is an example of a "second part", the distance XJ1 is an example of a "first distance", the distance XJ2 is an example of a "second distance", the θ direction is an example of a "first direction", and the Z1 direction is an example of a "second direction".

As described above, the electrode configuration part ZJ1 included in the electrode rod DJ1 according to the present embodiment is provided to extend in the θ direction such that the distance from the electrode rod DJ2 becomes longer as the electrode configuration part ZJ1 moves toward the Z1 direction. Therefore, according to the present embodiment, as in the reference example, as compared with the embodiment in which the rod-shaped electrode rod DW1 and the rod-shaped electrode rod DW2 extend substantially parallel, it is possible to cause a large change in the signal levels of the electric signals from the electrode rod DJ1 and the electrode rod DJ2 in accordance with the change in the amount of the ink IK accommodated in the ink tank TK[m]. Accordingly, according to the present embodiment, as in the reference example, as compared with the embodiment in which the rod-shaped electrode rod DW1 and the rod-shaped electrode rod DW2 extend substantially parallel, the remaining amount of the ink IK accommodated in the ink tank TK[m] can be accurately detected.

10. Tenth Embodiment

In the following, an ink jet printer according to a tenth embodiment will be explained with reference to FIGS. 42 to 46.

10.1. Ink Jet Printer According to Tenth Embodiment

The ink jet printer according to the tenth embodiment differs from the ink jet printer 100 according to the first embodiment in that an ink accommodating device 1L is provided instead of the ink accommodating device 1.

Figure 42:
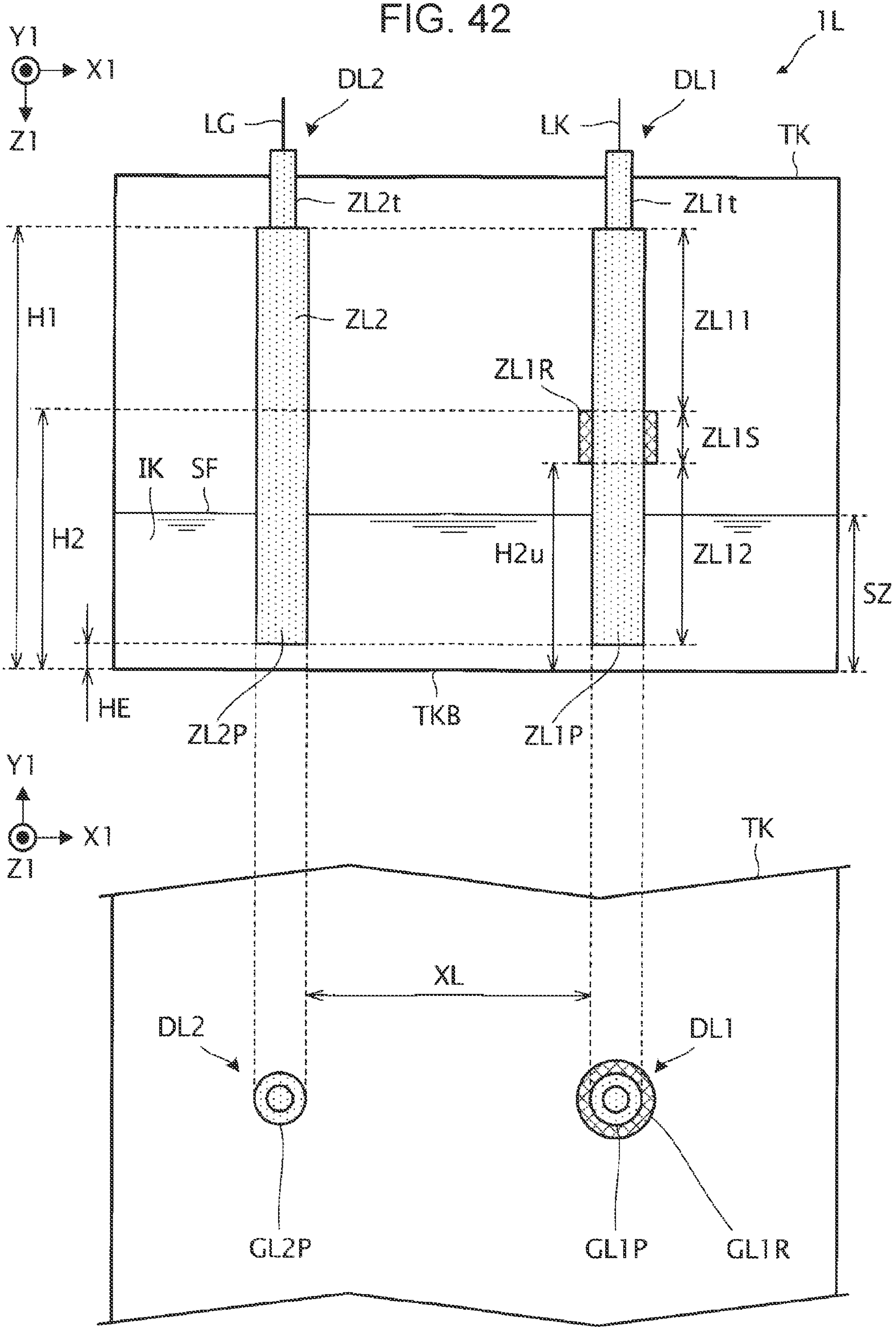
FIG. 42 is an explanatory diagram illustrating an example of a configuration of an electrode rod and an electrode rod according to a tenth embodiment.

FIG. 42 is a configuration diagram for explaining an example of a configuration of an electrode rod DL1 and an electrode rod DL2 provided in the ink accommodating device 1L. It is assumed that the ink accommodating device 1L is configured in the same manner as the ink accommodating device 1 according to the first embodiment regarding the ink tank TK[m] except that the electrode rod DL1 is accommodated instead of the electrode rod DA1, and the electrode rod DL2 is accommodated instead of the electrode rod DA2.

As illustrated in FIG. 42, the electrode rod DL1 includes a conductive conduction part ZL1P, an insulating insulation part ZL1R, and a conductive coupling part ZL1*t*. In the following, a part of the electrode rod DL1 excluding the coupling part ZL1*t* may be referred to as an electrode configuration part ZL1. That is, in the present embodiment, the electrode configuration part ZL1 includes the conduction part ZL1P and the insulation part ZL1R.

The conduction part ZL1P is a columnar-shaped conductor extending in the Z1 direction and having a substantially uniform thickness, and has an outer periphery GL1P with a length NL1P when cutting on a plane with the Z1 direction as the normal direction. In the tenth embodiment, it is assumed that the length NL1P is substantially the same length as the length NW1 according to the reference example.

The insulation part ZL1R is a cylindrical-shaped insulator provided to cover the outer periphery GL1P included in the conduction part ZL1P in a part of a range in the Z1 direction and has an outer periphery GL1R with a length NL1R that is longer than the length NL1P when cutting on a plane with the Z1 direction as the normal direction.

The coupling part ZL1*t* is positioned in the Z2 direction when viewed from the conduction part ZL1P and electrically couples the conduction part ZL1P and the wiring LK.

The electrode rod DL2 includes a conductive conduction part ZL2P and a conductive coupling part ZL2*t*. In the following, a part of the electrode rod DL2 excluding the coupling part ZL2*t* may be referred to as an electrode configuration part ZL2. That is, in the present embodiment, the conduction part ZL2P corresponds to the electrode configuration part ZL2.

The conduction part ZL2P is a columnar-shaped conductor extending in the Z1 direction and having a substantially uniform thickness, and has an outer periphery GL2P with a length NL2P when cutting on a plane with the Z1 direction as the normal direction. In the tenth embodiment, it is assumed that the length NL2P is substantially the same length as the length NW2 according to the reference example.

The coupling part ZL2*t* is positioned in the Z2 direction when viewed from the conduction part ZL2P, and electrically couples the conduction part ZL2P and the wiring LG.

Further, in the tenth embodiment, it is assumed that the electrode rod DL1 and the electrode rod DL2 are provided such that a distance, which is from an end portion of the conduction part ZL1P in the Z1 direction to the bottom surface TKB of the ink tank TK[m], in the Z axis direction and a distance, which is from an end portion of the conduction part ZL2P in the Z1 direction to the bottom surface TKB of the ink tank TK[m], in the Z axis direction become a distance HE.

Further, in the tenth embodiment, it is assumed that the electrode rod DL1 is provided such that a distance, which is from an end portion of the insulation part ZL1R in the Z1 direction to the bottom surface TKB of the ink tank TK[m], in the Z axis direction becomes a distance H2*u*, and a distance, which is from an end portion of the insulation part ZL1R in the Z2 direction to the bottom surface TKB of the ink tank TK[m], in the Z axis direction becomes a distance H2. Here, the distance H2*u* is a distance that is longer than the distance HE and shorter than the distance H2.

In the tenth embodiment, a part of the electrode rod DL1, where the conduction part ZL1P is exposed, that is, a part positioned in the Z2 direction from the insulation part ZL1R is referred to as an electrode configuration part ZL11. In the present embodiment, the electrode configuration part ZL11 is a part of the electrode rod DL1 of which a distance to the bottom surface TKB in the Z axis direction is equal to or longer than the distance H2 and is equal to or shorter than the distance H1.

Further, a part of the electrode rod DL1, where the conduction part ZL1P is exposed, that is, a part positioned in the Z1 direction from the insulation part ZL1R is referred to as an electrode configuration part ZL12. In the present embodiment, the electrode configuration part ZL12 is a part of the electrode rod DL1 of which a distance to the bottom surface TKB in the Z axis direction is equal to or longer than the distance HE and is equal to or shorter than the distance H2*u*.

Further, a part of the electrode rod DL1, which is positioned between the electrode configuration part ZL11 and the electrode configuration part ZL12 and in which the conduction part ZL1P is covered with the insulation part ZL1R, is referred to as an electrode insulation part ZL1S. In the present embodiment, the electrode insulation part ZL1S is a part of the electrode rod DL1 of which a distance to the bottom surface TKB in the Z axis direction is equal to or longer than the distance H2*u* and is equal to or shorter than the distance H2.

Further, in the tenth embodiment, it is assumed that the electrode rod DL1 is positioned in the X1 direction when viewed from the electrode rod DL2. In the following, a distance between the conduction part ZL1P and the conduction part ZL2P in the X1 direction is referred to as a distance XL. Further, in the tenth embodiment, it is assumed that the distance XL is substantially the same length as the distance XW according to the reference example.

Figure 43:
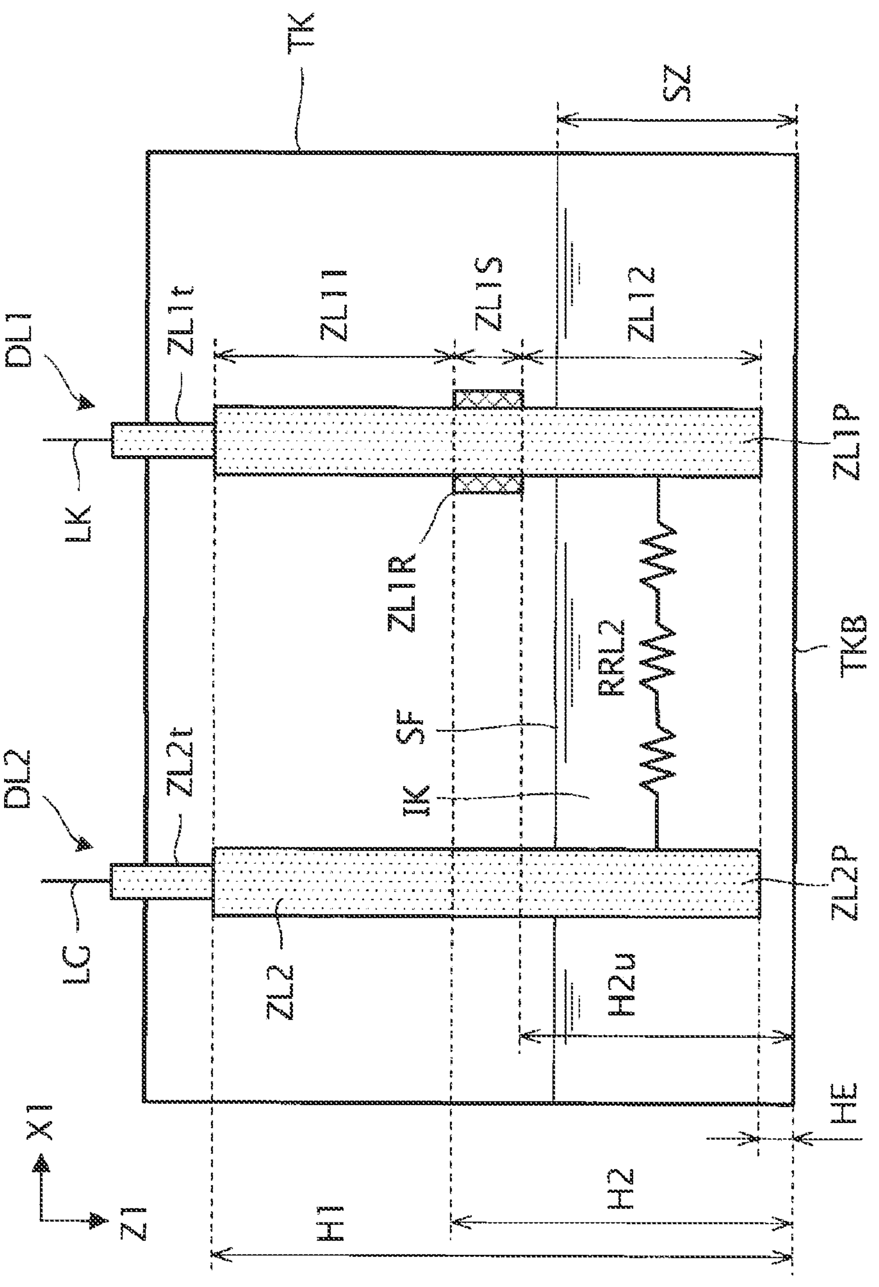
FIG. 43 is an explanatory diagram illustrating an example of an ink resistor.
Figure 44:
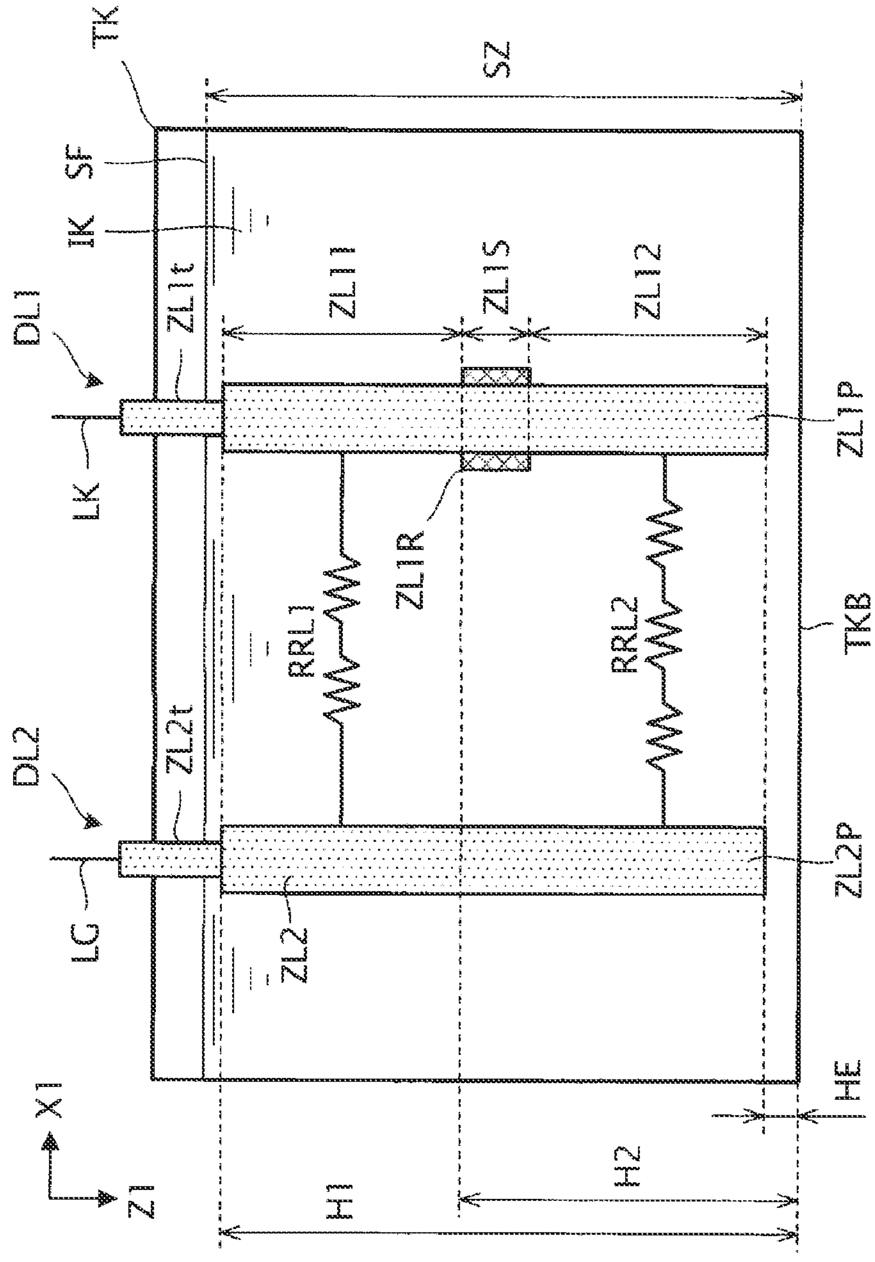
FIG. 44 is an explanatory diagram illustrating an example of the ink resistor.

FIGS. 43 and 44 are explanatory diagrams for explaining an example of the ink resistor RT formed between the electrode rod DL1 and the electrode rod DL2. In the following, in order to distinguish the ink resistor RT according to the first embodiment, the ink resistor RT formed between the electrode rod DL1 and the electrode rod DL2 may be referred to as the ink resistor RT according to the tenth embodiment or an ink resistor RTL.

As illustrated in FIG. 44, when the ink IK is present between the electrode configuration part ZL11 and the electrode configuration part ZL2, that is, when the ink liquid level distance SZ is equal to or longer than the distance H2, the electrode configuration part ZL11 and the electrode configuration part ZL2 are electrically coupled through the ink IK. In the following, a resistor included in the ink IK that electrically couples the electrode configuration part ZL11 and the electrode configuration part ZL2 is referred to as a resistor RRL1.

As illustrated in FIGS. 43 and 44, when the ink IK is present between the electrode configuration part ZL12 and the electrode configuration part ZL2, that is, when the ink liquid level distance SZ is equal to or longer than the distance HE, the electrode configuration part ZL12 and the electrode configuration part ZL2 are electrically coupled through the ink IK. In the following, a resistor included in the ink IK that electrically couples the electrode configuration part ZL12 and the electrode configuration part ZL2 is referred to as a resistor RRL2.

When the ink liquid level distance SZ is equal to or longer than the distance HE and shorter than the distance H2, the resistor RRL2 becomes the above-described ink resistor RTL.

Further, when the ink liquid level distance SZ is equal to or longer than the distance H2, a composite resistance of the resistor RRL1 and the resistor RRL2 when the resistor RRL1 and the resistor RRL2 are coupled in parallel is the ink resistor RTL described above.

Figure 45:
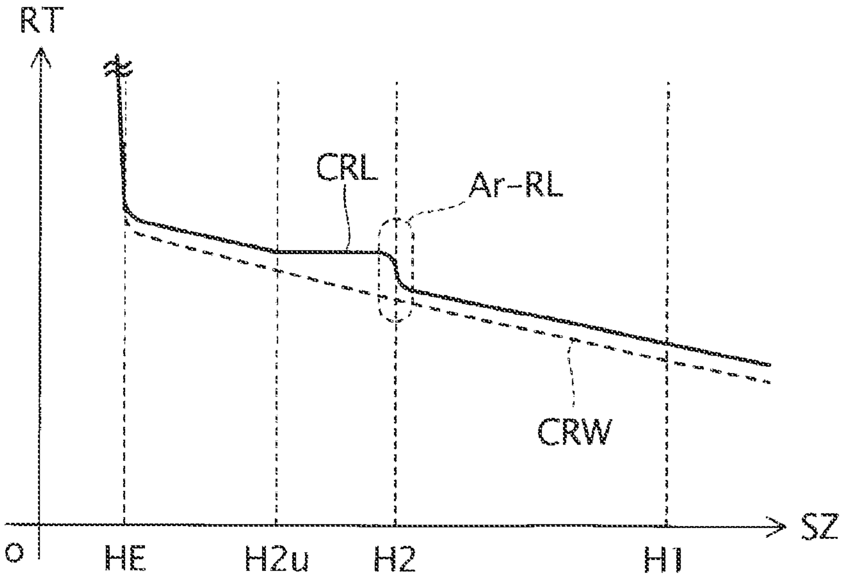
FIG. 45 is an explanatory diagram illustrating an example of a relationship between the ink liquid level distance and the ink resistor.

FIG. 45 is an explanatory diagram for explaining an example of a relationship between the ink liquid level distance SZ and the ink resistor RTL. Specifically, FIG. 45 illustrates an example of a resistance value change curve CRL indicating a relationship between the ink liquid level distance SZ and the resistance value of the ink resistor RTL when the horizontal axis is set to the ink liquid level distance SZ and the vertical axis is set to the resistance value of the ink resistor RTL.

For convenience of description, FIG. 45 illustrates the resistance value change curve CRW with a broken line together with the resistance value change curve CRL.

As described above, when the ink liquid level distance SZ is equal to or longer than the distance HE, the electrode configuration part ZL12 is in contact with the ink IK and the electrode configuration part ZL2 is in contact with the ink IK. Therefore, as indicated by the resistance value change curve CRL in FIG. 45, when the ink liquid level distance SZ is equal to or longer than the distance HE, the ink resistor RTL becomes a small resistance value as compared with the case where the ink liquid level distance SZ is shorter than the distance HE.

The resistance value of the ink resistor RTL becomes smaller as a cross-sectional area becomes larger. Therefore, as indicated by the resistance value change curve CRL, when the ink liquid level distance SZ is equal to or longer than the distance HE and equal to or shorter than the distance H2*u*, the ink resistor RTL becomes smaller as the ink liquid level distance SZ becomes longer.

Further, as described above, the electrode rod DL1 includes the insulation part ZL1R that covers the conduction part ZL1P in a range where the ink liquid level distance SZ is equal to or longer than the distance H2*u* and equal to or shorter than the distance H2. Therefore, in the present embodiment, in a range where the ink liquid level distance SZ is equal to or longer than the distance H2*u* and shorter than the distance H2, change in a cross-sectional area of the ink IK, which is interposed between the electrode rod DL1 and the electrode rod DL2 and electrically couples the conduction part ZL1P and the conduction part ZL2P, is limited. Therefore, in the present embodiment, as indicated by the resistance value change curve CRL, when the ink liquid level distance SZ is equal to or longer than the distance H2*u* and shorter than the distance H2, the ink resistor RTL is maintained substantially constant regardless of fluctuation in the length of the ink liquid level distance SZ.

Further, when the ink liquid level distance SZ is equal to or longer than the distance H2, the electrode configuration part ZL11 is in contact with the ink IK. When the electrode configuration part ZL11 is in contact with the ink IK, the cross-sectional area of the ink IK that electrically couples the conduction part ZL1P and the conduction part ZL2P becomes large. Therefore, the resistance value change curve CRL includes a change region Ar-RL where the ink resistor RTL is suddenly decreased in a part where the ink liquid level distance SZ becomes the distance H2. Further, when the ink liquid level distance SZ is equal to or longer than the distance H2, the ink resistor RTL becomes smaller as the ink liquid level distance SZ becomes longer.

Figure 46:
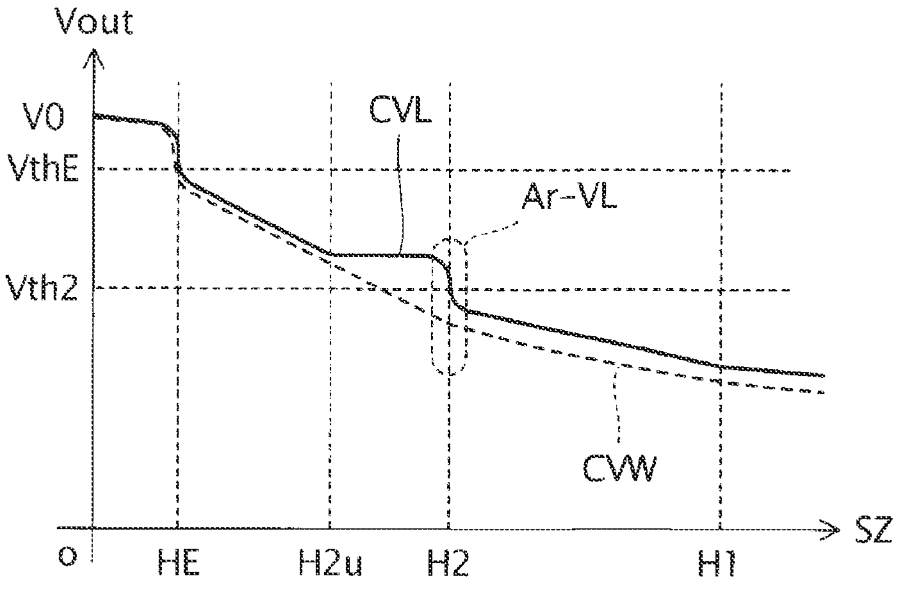
FIG. 46 is an explanatory diagram illustrating an example of a relationship between the ink liquid level distance and a detection signal.

FIG. 46 is an explanatory diagram for explaining an example of a relationship between the ink liquid level distance SZ and the detection signal Vout according to the tenth embodiment. Specifically, FIG. 46 illustrates an example of a potential change curve CVL indicating a relationship between the ink liquid level distance SZ and the potential of the detection signal Vout according to the tenth embodiment when the horizontal axis is set to the ink liquid level distance SZ and the vertical axis is set to the potential of the detection signal Vout according to the tenth embodiment. Here, the detection signal Vout according to the tenth embodiment is a detection signal Vout output by the ink accommodating device 1L. In the following, in order to distinguish the detection signal Vout according to the first embodiment, the detection signal Vout according to the tenth embodiment may be referred to as a detection signal Vout-L.

For convenience of description, FIG. 46 illustrates the potential change curve CVW with a broken line together with the potential change curve CVL.

As indicated by the potential change curve CVL in FIG. 46, when the ink liquid level distance SZ is equal to or shorter than the distance H2*u*, the potential of the detection signal Vout-L becomes lower as the ink liquid level distance SZ becomes longer.

Further, as indicated by the potential change curve CVL, when the ink liquid level distance SZ is equal to or longer than the distance H2*u* and shorter than the distance H2, the detection signal Vout-L is maintained substantially constant regardless of fluctuation in the length of the ink liquid level distance SZ.

Further, as described above, the resistance value change curve CRL includes the change region Ar-RL where the ink resistor RTL is changed greatly in a part where the ink liquid level distance SZ becomes the distance H2. Therefore, the potential change curve CVL also includes a change region Ar-VL where the detection signal Vout-L is changed greatly in a part where the ink liquid level distance SZ becomes the distance H2.

Thereafter, as indicated by the potential change curve CVL, in the part where the ink liquid level distance SZ is equal to or longer than the distance H2, the potential of the detection signal Vout-L becomes lower as the ink liquid level distance SZ becomes longer.

In the tenth embodiment, as illustrated in FIG. 46, when a temperature of the ink IK in the ink tank TK[m] is a reference temperature t1 and when the ink liquid level distance SZ in the ink tank TK[m] is the distance HE, the potential indicated by the detection signal Vout-L is defined as the threshold potential VthE. Further, in the tenth embodiment, when a temperature of the ink IK in the ink tank TK[m] is a reference temperature t1 and when the ink liquid level distance SZ in the ink tank TK[m] is the distance H2, the potential indicated by the detection signal Vout-L is defined as a threshold potential Vth2.

As described above, in the tenth embodiment, the detection signal Vout-L output by the ink accommodating device 1L includes the change region Ar-VL, which is a region where the detection signal Vout-L is changed greatly with respect to the amount of change in the ink liquid level distance SZ. Therefore, according to the tenth embodiment, even when fluctuation occurs in the potential of the detection signal Vout-L due to the temperature change of the ink IK in the ink tank TK[m], the noise superimposing on the detection signal Vout-L, or the like, compared to the reference example, the remaining amount of the ink IK in the ink tank TK[m] can be accurately detected based on the detection signal Vout-L.

10.2. Conclusion of Tenth Embodiment

As described above, the ink jet printer according to the tenth embodiment includes: the ink tank TK[m] accommodating the conductive ink IK; the electrode rod DL1 accommodated in the ink tank TK[m]; the electrode rod DL2 accommodated in the ink tank TK[m]; the ink amount detection circuit 2 that is electrically coupled to the electrode rod DL1 and the electrode rod DL2 and that detects the remaining amount of the ink IK accommodated in the ink tank TK[m] in response to the electric signal from at least one of the electrode rod DL1 and the electrode rod DL2; and the liquid discharging head HU[m] discharging the ink IK supplied from the ink tank TK[m], in which the electrode rod DL1 includes the electrode configuration part ZL11 where the conduction part ZL1P formed with a conductive member is exposed, the electrode configuration part ZL12 where the conduction part ZL1P is exposed, and the electrode insulation part ZL1S that is provided between the electrode configuration part ZL11 and the electrode configuration part ZL12 and in which the conduction part ZL1P is covered with the insulation part ZL1R formed with an insulating member.

In the present embodiment, the electrode rod DL1 is an example of a "first electrode", the electrode rod DL2 is an example of a "second electrode", the electrode configuration part ZL11 is an example of a "first part", the electrode configuration part ZL12 is an example of a "second part", the electrode insulation part ZL1S is an example of a "first insulation part", the conduction part ZL1P is an example of a "first conduction portion", and the insulation part ZL1R is an example of an "insulation member".

As described above, in the ink accommodating device 1L according to the present embodiment, the electrode rod DL1, which is accommodated in the ink tank TK[m], includes the electrode insulation part ZL1S, in which the conduction part ZL1P is covered with the insulation part ZL1R, between the electrode configuration part ZL11 and the electrode configuration part ZL12, in addition to the electrode configuration part ZL11 where the conduction part ZL1P is exposed and the electrode configuration part ZL12 where the conduction part ZL1P is exposed. Therefore, according to the present embodiment, as in the reference example, as compared with the embodiment in which the conductive electrode rod DW1 and the conductive electrode rod DW2 are accommodated in the ink tank TK[m], it is possible to provide a part that causes a large change in the signal levels of the electric signals from the electrode rod DL1 and the electrode rod DL2 in accordance with the change in the amount of the ink IK accommodated in the ink tank TK[m]. Accordingly, according to the present embodiment, as in the reference example, as compared with the embodiment in which the conductive electrode rod DW1 and the conductive electrode rod DW2 are accommodated in the ink tank TK[m], the remaining amount of the ink IK accommodated in the ink tank TK[m] can be accurately detected.

Further, in the ink jet printer according to the tenth embodiment, the remaining amount of the ink IK, which is detected by the ink amount detection circuit 2 when the electrode rod DL2 and the electrode configuration part ZL11 are not electrically coupled via the ink IK in the ink tank TK[m] and when the electrode rod DL2 and the electrode configuration part ZL12 are electrically coupled via the ink IK in the ink tank TK[m], is less than the remaining amount of the ink IK, which is detected by the ink amount detection circuit 2 when the electrode rod DL2 and the electrode configuration part ZL11 are electrically coupled via the ink IK in the ink tank TK[m] and when the electrode rod DL2 and the electrode configuration part ZL12 are electrically coupled via the ink IK in the ink tank TK[m], and is greater than the remaining amount of the ink IK, which is detected by the ink amount detection circuit 2 when the electrode rod DL2 and the electrode configuration part ZL11 are not electrically coupled via the ink IK in the ink tank TK[m] and when the electrode rod DL2 and the electrode configuration part ZL12 are not electrically coupled via the ink IK in the ink tank TK[m].

Therefore, according to the present embodiment, the remaining amount of the ink IK in the ink tank TK[m] can be detected at least in three stages.

Further, in the ink jet printer according to the tenth embodiment, the remaining amount of the ink IK, which is detected by the ink amount detection circuit 2 when the electrode rod DL2 and electrode configuration part ZL11 are electrically coupled via the ink IK in the ink tank TK[m] and when the electrode rod DL2 and the electrode configuration part ZL12 are electrically coupled via the ink IK in the ink tank TK[m], is equal to or greater than a remaining amount of ink corresponding to the distance H2, in which the ink IK can be continuously discharged from the liquid discharging head HU[m] for predetermined time or more.

In the present embodiment, the remaining amount of ink corresponding to the distance H2 is an example of a "first liquid amount".

Therefore, since the user of the ink jet printer according to the tenth embodiment can understand that the remaining amount of the ink IK accommodated in the ink tank TK[m] is a sufficient amount of ink IK that allows continuous discharge of the ink IK from the liquid discharging head HU[m], it is possible to suppress replenishing the ink tank TK[m] with an excessive amount of ink IK.

Further, in the ink jet printer according to the tenth embodiment, the remaining amount of the ink IK, which is detected by the ink amount detection circuit 2 when the electrode rod DL2 and electrode configuration part ZL11 are not electrically coupled via the ink IK in the ink tank TK[m] and when the electrode rod DL2 and the electrode configuration part ZL12 are electrically coupled via the ink IK in the ink tank TK[m], is less than the remaining amount of ink corresponding to the distance H2, in which the ink IK can be continuously discharged from the liquid discharging head HU[m] for predetermined time or more, and is equal to or greater than a remaining amount of ink corresponding to the distance HE, which is the minimum remaining amount of ink of the remaining amount of ink in which the ink IK can be discharged from the liquid discharging head HU[m].

In the present embodiment, the remaining amount of ink corresponding to the distance HE is an example of a "second liquid amount".

Therefore, since the user of the ink jet printer according to the tenth embodiment can understand in advance that the discharge of the ink IK may become impossible before the remaining amount of the ink IK accommodated in the ink tank TK[m] is decreased and discharge of the ink IK from the liquid discharging head HU[m] becomes impossible, it is possible to suppress depletion of the ink IK accommodated in the ink tank TK[m] in advance.

Further, in the ink jet printer according to the tenth embodiment, the remaining amount of the ink IK, which is detected by the ink amount detection circuit 2 when the electrode rod DL2 and electrode configuration part ZL11 are not electrically coupled via the ink IK in the ink tank TK[m] and when the electrode rod DL2 and the electrode configuration part ZL12 are not electrically coupled via the ink IK in the ink tank TK[m], is less than a remaining amount of ink corresponding to the distance HE, which is the minimum remaining amount of ink of the remaining amount of ink in which the ink IK can be discharged from the liquid discharging head HU[m].

Therefore, since the user of the ink jet printer according to the tenth embodiment can understand that the discharge of the ink IK becomes impossible when the remaining amount of the ink IK accommodated in the ink tank TK[m] is decreased and discharge of the ink IK from the liquid discharging head HU[m] becomes impossible, it is possible to quickly perform replenishment of the ink IK accommodated in the ink tank TK[m].

Further, in the ink jet printer according to the tenth embodiment, the ink tank TK[m] includes a supply port 12 for replenishing the ink tank TK[m] with the ink IK.

In the present embodiment, the supply port 12 is an example of an "opening".

11. Eleventh Embodiment

In the following, an ink jet printer according to an eleventh embodiment will be explained with reference to FIGS. 47 to 49.

11.1. Ink Jet Printer According to Eleventh Embodiment

The ink jet printer according to the eleventh embodiment differs from the ink jet printer 100 according to the first embodiment in that an ink accommodating device 1M is provided instead of the ink accommodating device 1.

Figure 47:
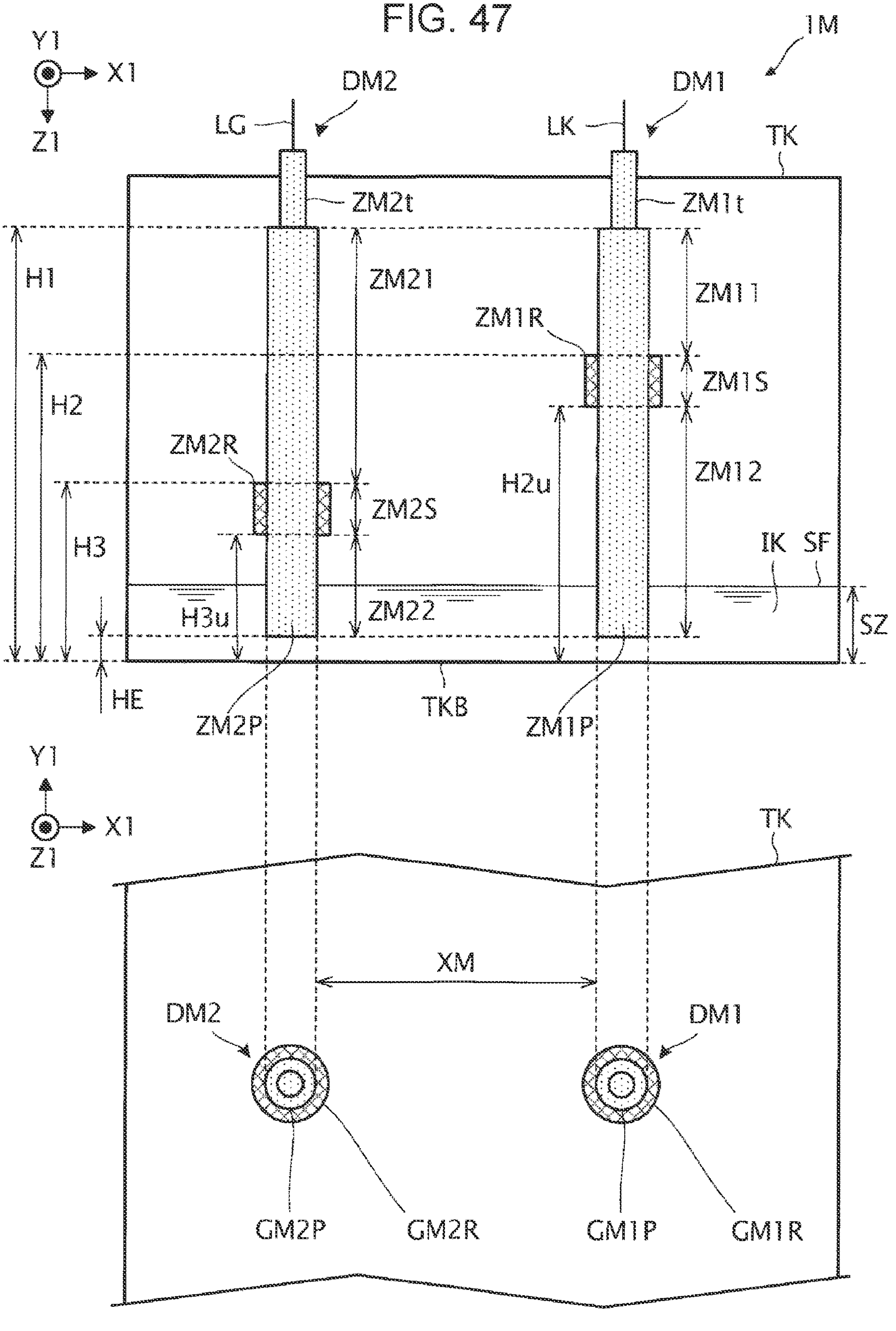
FIG. 47 is an explanatory diagram illustrating an example of a configuration of an electrode rod and an electrode rod according to an eleventh embodiment.

FIG. 47 is a configuration diagram for explaining an example of a configuration of an electrode rod DM1 and an electrode rod DM2 provided in the ink accommodating device 1M. It is assumed that the ink accommodating device 1M is configured in the same manner as the ink accommodating device 1 according to the first embodiment regarding the ink tank TK[m] except that the electrode rod DM1 is accommodated instead of the electrode rod DA1, and the electrode rod DM2 is accommodated instead of the electrode rod DA2.

As illustrated in FIG. 47, the electrode rod DM1 has the same shape as the electrode rod DL1 according to the tenth embodiment, and includes a conductive conduction part ZM1P, an insulating insulation part ZM1R, and a conductive coupling part ZM1*t*. In the following, a part of the electrode rod DM1 excluding the coupling part ZM1*t* may be referred to as an electrode configuration part ZM1. That is, in the present embodiment, the electrode configuration part ZM1 includes the conduction part ZM1P and the insulation part ZM1R.

The conduction part ZM1P is a columnar-shaped conductor extending in the Z1 direction and having a substantially uniform thickness, and has an outer periphery GM1P with a length NM1P when cutting on a plane with the Z1 direction as the normal direction. In the tenth embodiment, it is assumed that the length NM1P is substantially the same length as the length NW1 according to the reference example.

The insulation part ZM1R is a cylindrical-shaped insulator provided to cover the outer periphery GM1P included in the conduction part ZM1P in a part of a range in the Z1 direction and has an outer periphery GM1R with a length NM1R that is longer than the length NM1P when cutting on a plane with the Z1 direction as the normal direction.

The coupling part ZM1*t* is positioned in the Z2 direction when viewed from the conduction part ZM1P and electrically couples the conduction part ZM1P and the wiring LK.

The electrode rod DM2 includes a conductive conduction part ZM2P, an insulating insulation part ZM2R, and a conductive coupling part ZM2*t*. In the following, a part of the electrode rod DM2 excluding the coupling part ZM2*t* may be referred to as an electrode configuration part ZM2. That is, in the present embodiment, the electrode configuration part ZM2 includes the conduction part ZM2P and the insulation part ZM2R.

The conduction part ZM2P is a columnar-shaped conductor extending in the Z1 direction and having a substantially uniform thickness, and has an outer periphery GM2P with a length NM2P when cutting on a plane with the Z1 direction as the normal direction. In the eleventh embodiment, it is assumed that the length NM2P is substantially the same length as the length NW2 according to the reference example.

The insulation part ZM2R is a cylindrical-shaped insulator provided to cover the outer periphery GM2P included in the conduction part ZM2P in a part of a range in the Z1 direction and has an outer periphery GM2R with a length NM2R that is longer than the length NM2P when cutting on a plane with the Z1 direction as the normal direction.

The coupling part ZM2*t* is positioned in the Z2 direction when viewed from the conduction part ZM2P and electrically couples the conduction part ZM2P and the wiring LG.

Further, in the eleventh embodiment, it is assumed that the electrode rod DM1 and the electrode rod DM2 are provided such that a distance, which is from an end portion of the conduction part ZM1P in the Z1 direction to the bottom surface TKB of the ink tank TK[m], in the Z axis direction and a distance, which is from an end portion of the conduction part ZM2P in the Z1 direction to the bottom surface TKB of the ink tank TK[m], in the Z axis direction become a distance HE.

Further, in the eleventh embodiment, it is assumed that the electrode rod DM1 is provided such that a distance, which is from an end portion of the insulation part ZM1R in the Z1 direction to the bottom surface TKB of the ink tank TK[m], in the Z axis direction becomes a distance H2*u*, and a distance, which is from an end portion of the insulation part ZM1R in the Z2 direction to the bottom surface TKB of the ink tank TK[m], in the Z axis direction becomes a distance H2. In the present embodiment, the distance H2*u* is a distance that is longer than the distance H3 and shorter than the distance H2.

Further, in the eleventh embodiment, it is assumed that the electrode rod DM2 is provided such that a distance, which is from an end portion of the insulation part ZM2R in the Z1 direction to the bottom surface TKB of the ink tank TK[m], in the Z axis direction becomes a distance H3*u*, and a distance, which is from an end portion of the insulation part ZM2R in the Z2 direction to the bottom surface TKB of the ink tank TK[m], in the Z axis direction becomes a distance H3. In the present embodiment, the distance H3*u* is a distance that is longer than the distance HE and shorter than the distance H3.

In the eleventh embodiment, a part of the electrode rod DM1, where the conduction part ZM1P is exposed, that is, a part positioned in the Z2 direction from the insulation part ZM1R is referred to as an electrode configuration part ZM11. That is, the electrode configuration part ZM11 is a part of the electrode rod DM1 of which a distance to the bottom surface TKB in the Z axis direction is equal to or longer than the distance H2 and is equal to or shorter than the distance H1.

Further, a part of the electrode rod DM1, where the conduction part ZM1P is exposed, that is, a part positioned in the Z1 direction from the insulation part ZM1R is referred to as an electrode configuration part ZM12. In the present embodiment, the electrode configuration part ZM12 is a part of the electrode rod DM1 of which a distance to the bottom surface TKB in the Z axis direction is equal to or longer than the distance HE and is equal to or shorter than the distance H2*u*.

Further, a part of the electrode rod DM1, which is positioned between the electrode configuration part ZM11 and the electrode configuration part ZM12 and in which the conduction part ZM1P is covered with the insulation part ZM1R, is referred to as an electrode insulation part ZM1S. In the present embodiment, the electrode insulation part ZM1S is a part of the electrode rod DM1 of which a distance to the bottom surface TKB in the Z axis direction is equal to or longer than the distance H2*u* and is equal to or shorter than the distance H2.

Further, a part of the electrode rod DM2, where the conduction part ZM2P is exposed, that is, a part positioned in the Z2 direction from the insulation part ZM2R is referred to as an electrode configuration part ZM21. That is, the electrode configuration part ZM21 is a part of the electrode rod DM2 of which a distance to the bottom surface TKB in the Z axis direction is equal to or longer than the distance H3 and is equal to or shorter than the distance H1.

Further, a part of the electrode rod DM2, where the conduction part ZM2P is exposed, that is, a part positioned in the Z1 direction from the insulation part ZM2R is referred to as an electrode configuration part ZM22. In the present embodiment, the electrode configuration part ZM22 is a part of the electrode rod DM2 of which a distance to the bottom surface TKB in the Z axis direction is equal to or longer than the distance HE and is equal to or shorter than the distance H3*u*.

Further, a part of the electrode rod DM2, which is positioned between the electrode configuration part ZM21 and the electrode configuration part ZM22 and in which the conduction part ZM2P is covered with the insulation part ZM2R, is referred to as an electrode insulation part ZM2S. In the present embodiment, the electrode insulation part ZM2S is a part of the electrode rod DM2 of which a distance to the bottom surface TKB in the Z axis direction is equal to or longer than the distance H3*u* and is equal to or shorter than the distance H3.

Further, in the eleventh embodiment, it is assumed that the electrode rod DM1 is positioned in the X1 direction when viewed from the electrode rod DM2. In the following, a distance between the conduction part ZM1P and the conduction part ZM2P in the X1 direction is referred to as a distance XM. Further, in the eleventh embodiment, it is assumed that the distance XM is substantially the same length as the distance XW according to the reference example.

Figure 48:
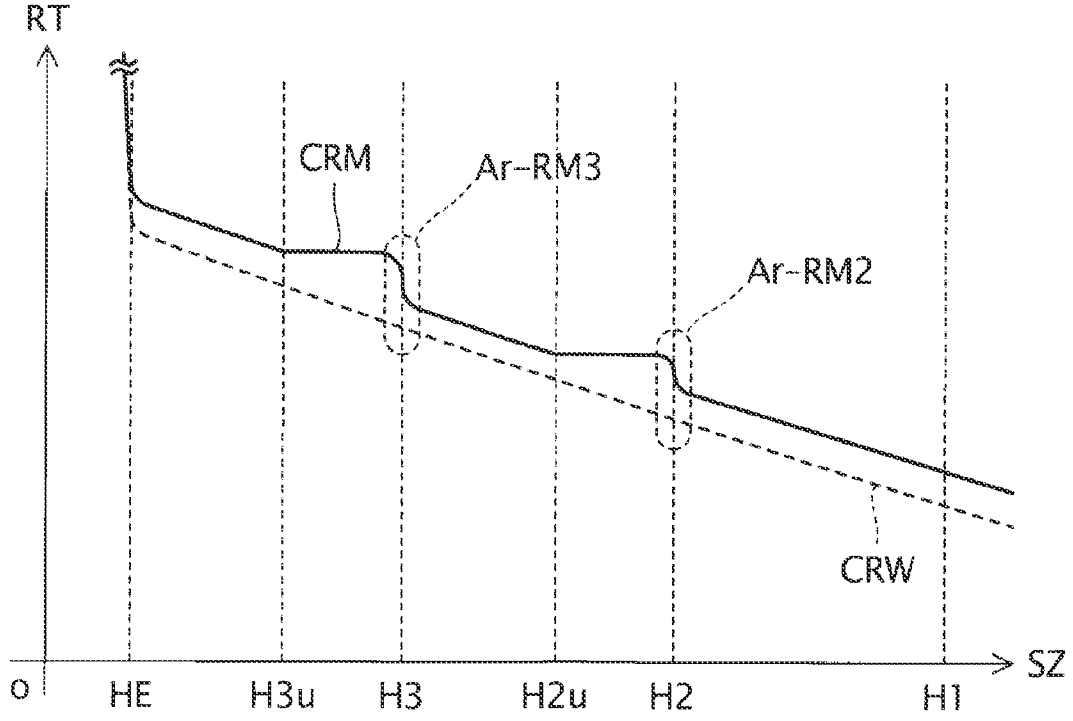
FIG. 48 is an explanatory diagram illustrating an example of a relationship between the ink liquid level distance and an ink resistor.

FIG. 48 is an explanatory diagram for explaining an example of a relationship between the ink liquid level distance SZ and an ink resistor RT according to the eleventh embodiment. Specifically, FIG. 48 illustrates an example of a resistance value change curve CRM indicating a relationship between the ink liquid level distance SZ and a resistance value of the ink resistor RT according to the eleventh embodiment when the horizontal axis is set to ink liquid level distance SZ and the vertical axis is set to the resistance value of the ink resistor RT according to the eleventh embodiment. Here, the ink resistor RT according to the eleventh embodiment is a resistor included in the ink IK that electrically couples the electrode rod DM1 and the electrode rod DM2 when the electrode rod DM1 and the electrode rod DM2, which are accommodated in the ink tank TK[m], are electrically coupled via the ink IK accommodated in the ink tank TK[m]. In the following, in order to distinguish the ink resistor RT according to the first embodiment, the ink resistor RT according to the eleventh embodiment may be referred to as an ink resistor RTM.

For convenience of description, FIG. 48 illustrates the resistance value change curve CRW with a broken line together with the resistance value change curve CRM.

As described above, when the ink liquid level distance SZ is equal to or longer than the distance HE, the conduction part ZM1P is in contact with the ink IK and the conduction part ZM2P is in contact with the ink IK. Therefore, as indicated by the resistance value change curve CRM in FIG. 48, when the ink liquid level distance SZ is equal to or longer than the distance HE, the ink resistor RTM becomes a small resistance value as compared with the case where the ink liquid level distance SZ is shorter than the distance HE.

The resistance value of the ink resistor RTM becomes smaller as a cross-sectional area becomes larger. Therefore, as indicated by the resistance value change curve CRM, when the ink liquid level distance SZ is equal to or longer than the distance HE and equal to or shorter than the distance H3*u*, the ink resistor RTM becomes smaller as the ink liquid level distance SZ becomes longer.

Further, as described above, the electrode rod DM2 includes the insulation part ZM2R that covers the conduction part ZM2P in a range where the ink liquid level distance SZ is equal to or longer than the distance H3*u* and equal to or shorter than the distance H3. Therefore, in the present embodiment, in a range where the ink liquid level distance SZ is equal to or longer than the distance H3*u* and shorter than the distance H3, change in a cross-sectional area of the ink IK, which electrically couples the conduction part ZM1P and the conduction part ZM2P, is limited. Therefore, in the present embodiment, as indicated by the resistance value change curve CRM, when the ink liquid level distance SZ is equal to or longer than the distance H3*u* and shorter than the distance H3, the ink resistor RTM is maintained substantially constant regardless of fluctuation in the length of the ink liquid level distance SZ.

Further, when the ink liquid level distance SZ is equal to or longer than the distance H3, the electrode configuration part ZM21 is in contact with the ink IK. Therefore, the resistance value change curve CRM includes a change region Ar-RM3 where the ink resistor RTM is suddenly decreased in a part where the ink liquid level distance SZ becomes the distance H3. When the ink liquid level distance SZ is equal to or longer than the distance H3 and equal to or shorter than the distance H2*u*, the ink resistor RTM becomes smaller as the ink liquid level distance SZ becomes longer.

Further, as described above, the electrode rod DM1 includes the insulation part ZM1R that covers the conduction part ZM1P in a range where the ink liquid level distance SZ is equal to or longer than the distance H2*u* and equal to or shorter than the distance H2. Therefore, in the present embodiment, in a range where the ink liquid level distance SZ is equal to or longer than the distance H2*u* and shorter than the distance H2, change in a cross-sectional area of the ink IK, which electrically couples the conduction part ZM1P and the conduction part ZM2P, is limited. Therefore, in the present embodiment, as indicated by the resistance value change curve CRM, when the ink liquid level distance SZ is equal to or longer than the distance H2*u* and shorter than the distance H2, the ink resistor RTM is maintained substantially constant regardless of fluctuation in the length of the ink liquid level distance SZ.

Further, when the ink liquid level distance SZ is equal to or longer than the distance H2, the electrode configuration part ZM11 is in contact with the ink IK. Therefore, the resistance value change curve CRM includes a change region Ar-RM2 where the ink resistor RTM is suddenly decreased in a part where the ink liquid level distance SZ becomes the distance H2. When the ink liquid level distance SZ is equal to or longer than the distance H2, the ink resistor RTM becomes smaller as the ink liquid level distance SZ becomes longer.

Figure 49:
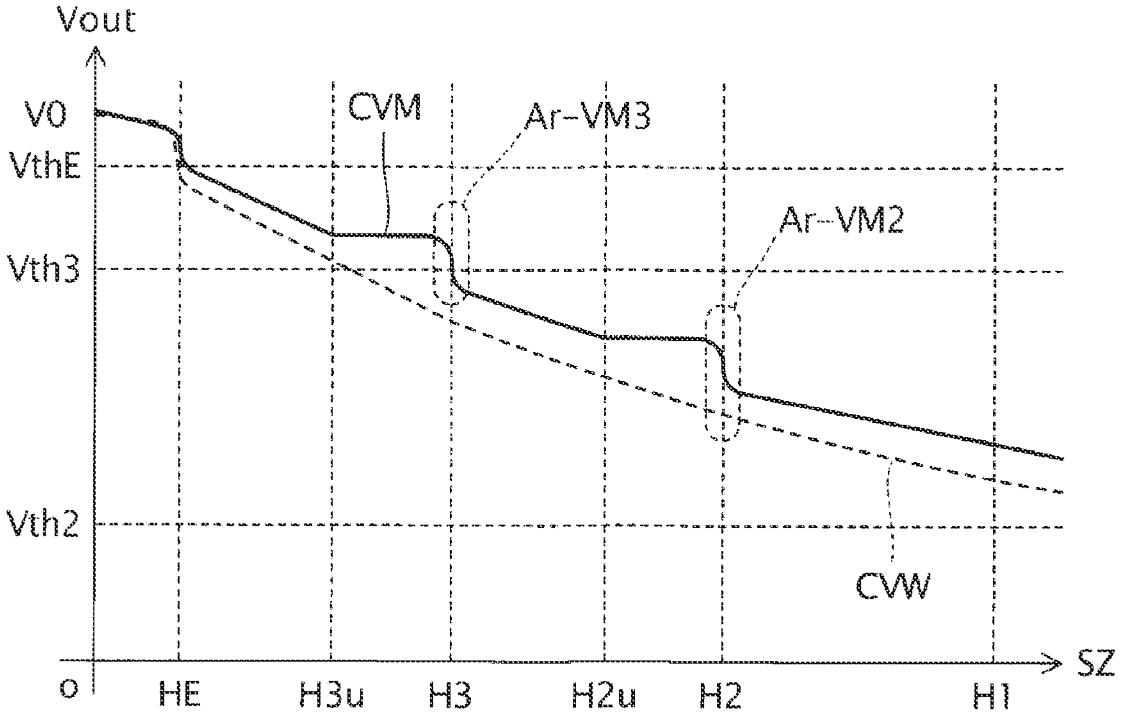
FIG. 49 is an explanatory diagram illustrating an example of a relationship between the ink liquid level distance and a detection signal.

FIG. 49 is an explanatory diagram for explaining an example of a relationship between the ink liquid level distance SZ and the detection signal Vout according to the eleventh embodiment. Specifically, FIG. 49 illustrates an example of a potential change curve CVM indicating a relationship between the ink liquid level distance SZ and the potential of the detection signal Vout according to the eleventh embodiment when the horizontal axis is set to the ink liquid level distance SZ and the vertical axis is set to the potential of the detection signal Vout according to the eleventh embodiment. Here, the detection signal Vout according to the eleventh embodiment is a detection signal Vout output by the ink accommodating device 1M. In the following, in order to distinguish the detection signal Vout according to the first embodiment, the detection signal Vout according to the eleventh embodiment may be referred to as a detection signal Vout-M.

For convenience of description, FIG. 49 illustrates the potential change curve CVW with a broken line together with the potential change curve CVM.

As indicated by the potential change curve CVM in FIG. 49, when the ink liquid level distance SZ is equal to or shorter than the distance H3*u*, the potential of the detection signal Vout-M becomes lower as the ink liquid level distance SZ becomes longer.

Further, as indicated by the potential change curve CVM, when the ink liquid level distance SZ is equal to or longer than the distance H3*u* and shorter than the distance H3, the detection signal Vout-M is maintained substantially constant regardless of fluctuation in the length of the ink liquid level distance SZ.

Further, as described above, the resistance value change curve CRM includes the change region Ar-RM3 where the ink resistor RTM is changed greatly in a part where the ink liquid level distance SZ becomes the distance H3. Therefore, the potential change curve CVM also includes a change region Ar-VM3 where the detection signal Vout-M is changed greatly in a part where the ink liquid level distance SZ becomes the distance H3.

Further, as indicated by the potential change curve CVM, when the ink liquid level distance SZ is equal to or longer than the distance H3 and equal to or shorter than the distance H2*u*, the potential of the detection signal Vout-M becomes lower as the ink liquid level distance SZ becomes longer.

Further, as indicated by the potential change curve CVM, when the ink liquid level distance SZ is equal to or longer than the distance H2*u* and shorter than the distance H2, the detection signal Vout-M is maintained substantially constant regardless of fluctuation in the length of the ink liquid level distance SZ.

Further, as described above, the resistance value change curve CRM includes the change region Ar-RM2 where the ink resistor RTM is changed greatly in a part where the ink liquid level distance SZ becomes the distance H2. Therefore, the potential change curve CVM also includes a change region Ar-VM2 where the detection signal Vout-M is changed greatly in a part where the ink liquid level distance SZ becomes the distance H2.

Further, as indicated by the potential change curve CVM, when the ink liquid level distance SZ is equal to or longer than the distance H2, the potential of the detection signal Vout-M becomes lower as the ink liquid level distance SZ becomes longer.

In the eleventh embodiment, as illustrated in FIG. 49, when a temperature of the ink IK in the ink tank TK[m] is a reference temperature t1 and when the ink liquid level distance SZ in the ink tank TK[m] is the distance HE, the potential indicated by the detection signal Vout-M is defined as the threshold potential VthE. Further, in the eleventh embodiment, when a temperature of the ink IK in the ink tank TK[m] is a reference temperature t1 and when the ink liquid level distance SZ in the ink tank TK[m] is the distance H3, the potential indicated by the detection signal Vout-M is defined as a threshold potential Vth3. Further, in the eleventh embodiment, when a temperature of the ink IK in the ink tank TK[m] is a reference temperature t1 and when the ink liquid level distance SZ in the ink tank TK[m] is the distance H2, the potential indicated by the detection signal Vout-M is defined as a threshold potential Vth2.

As described above, in the eleventh embodiment, the detection signal Vout-M output by the ink accommodating device 1M includes the change region Ar-VM2 and the change region Ar-VM3, which are regions where the detection signal Vout-M is changed greatly with respect to an amount of change in the ink liquid level distance SZ. Therefore, according to the eleventh embodiment, even when fluctuation occurs in the potential of the detection signal Vout-M due to the temperature change of the ink IK in the ink tank TK[m], the noise superimposing on the detection signal Vout-M, or the like, compared to the reference example, the remaining amount of the ink IK in the ink tank TK[m] can be accurately detected based on the detection signal Vout-M.

11.2. Conclusion of Eleventh Embodiment

As described above, the ink jet printer according to the eleventh embodiment includes: the ink tank TK[m] accommodating the conductive ink IK; the electrode rod DM1 accommodated in the ink tank TK[m]; the electrode rod DM2 accommodated in the ink tank TK[m]; the ink amount detection circuit 2 that is electrically coupled to the electrode rod DM1 and the electrode rod DM2 and that detects the remaining amount of the ink IK accommodated in the ink tank TK[m] in response to the electric signal from at least one of the electrode rod DM1 and the electrode rod DM2; and the liquid discharging head HU[m] discharging the ink IK supplied from the ink tank TK[m], in which the electrode rod DM1 includes the electrode configuration part ZM11 where the conduction part ZM1P formed with a conductive member is exposed, the electrode configuration part ZM12 where the conduction part ZM1P is exposed, and the electrode insulation part ZM1S that is provided between the electrode configuration part ZM11 and the electrode configuration part ZM12 and in which the conduction part ZM1P is covered with the insulation part ZM1R formed with an insulating member, and the electrode rod DM2 includes the electrode configuration part ZM21 where the conduction part ZM2P formed with a conductive member is exposed, the electrode configuration part ZM22 where the conduction part ZM2P is exposed, and the electrode insulation part ZM2S that is provided between the electrode configuration part ZM21 and the electrode configuration part ZM22 and in which the conduction part ZM2P is covered with the insulation part ZM2R formed with an insulating member.

In the present embodiment, the electrode rod DM1 is an example of a "first electrode", the electrode rod DM2 is an example of a "second electrode", the electrode configuration part ZM11 is an example of a "first part", the electrode configuration part ZM12 is an example of a "second part", the electrode insulation part ZM1S is an example of a "first insulation part", the conduction part ZM1P is an example of a "first conduction portion", the insulation part ZM1R is an example of an "insulation member covering a first conduction portion", the electrode configuration part ZM21 is an example of a "fourth part", the electrode configuration part ZM22 is an example of a "fifth part", the electrode insulation part ZM2S is an example of a "third insulation part", the conduction part ZM2P is an example of a "second conduction portion", and the insulation part ZM2R is an example of an "insulation member covering a second conduction portion".

As described above, in the ink accommodating device 1M according to the present embodiment, the electrode rod DM1 accommodated in the ink tank TK[m] includes the electrode insulation part ZM1S, in which the conduction part ZM1P is covered with the insulation part ZM1R, between the electrode configuration part ZM11 and the electrode configuration part ZM12. Further, in the ink accommodating device 1M according to the present embodiment, the electrode rod DM2 accommodated in the ink tank TK[m] includes the electrode insulation part ZM2S, in which the conduction part ZM2P is covered with the insulation part ZM2R, between the electrode configuration part ZM21 and the electrode configuration part ZM22. Therefore, according to the present embodiment, as in the reference example, as compared with the embodiment in which the conductive electrode rod DW1 and the conductive electrode rod DW2 are accommodated in the ink tank TK[m], it is possible to provide a part that causes a large change in the signal levels of the electric signals from the electrode rod DM1 and the electrode rod DM2 in accordance with the change in the amount of the ink IK accommodated in the ink tank TK[m]. Accordingly, according to the present embodiment, as in the reference example, as compared with the embodiment in which the conductive electrode rod DW1 and the conductive electrode rod DW2 are accommodated in the ink tank TK[m], the remaining amount of the ink IK accommodated in the ink tank TK[m] can be accurately detected.

12. Twelfth Embodiment

In the following, an ink jet printer according to a twelfth embodiment will be explained with reference to FIGS. 50 to 52.

12.1. Ink Jet Printer According to Twelfth Embodiment

The ink jet printer according to the twelfth embodiment differs from the ink jet printer 100 according to the first embodiment in that an ink accommodating device 1N is provided instead of the ink accommodating device 1.

Figure 50:
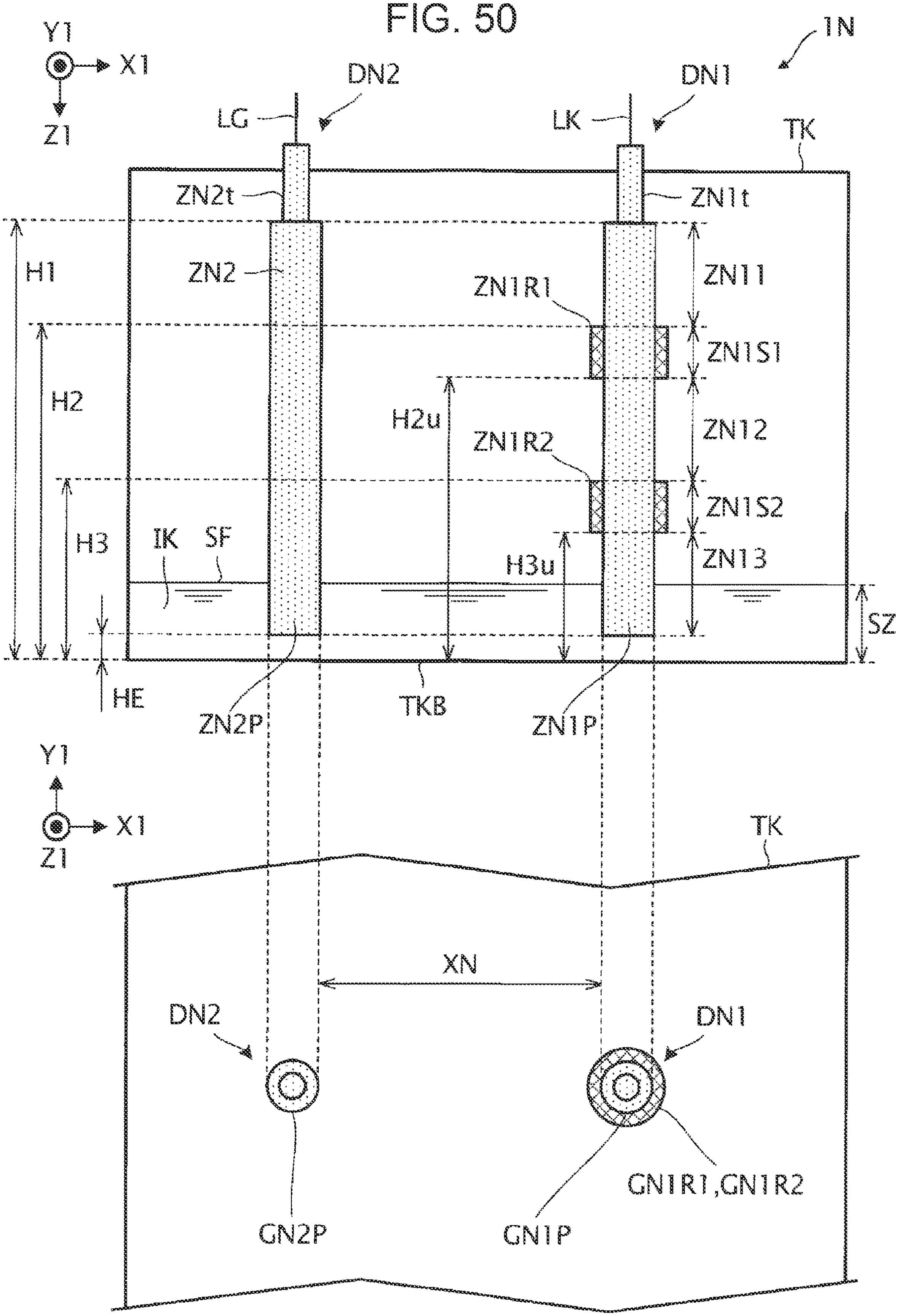
FIG. 50 is an explanatory diagram illustrating an example of a configuration of an electrode rod and an electrode rod according to a twelfth embodiment.

FIG. 50 is a configuration diagram for explaining an example of a configuration of an electrode rod DN1 and an electrode rod DN2 provided in the ink accommodating device 1N. It is assumed that the ink accommodating device 1N is configured in the same manner as the ink accommodating device 1 according to the first embodiment regarding the ink tank TK[m] except that the electrode rod DN1 is accommodated instead of the electrode rod DA1, and the electrode rod DN2 is accommodated instead of the electrode rod DA2.

As illustrated in FIG. 50, the electrode rod DN1 includes a conductive conduction part ZN1P, an insulating insulation part ZN1R1, an insulating insulation part ZN1R2, and a conductive coupling part ZN1*t*. In the following, a part of the electrode rod DN1 excluding the coupling part ZN1*t* may be referred to as an electrode configuration part ZN1. That is, in the present embodiment, the electrode configuration part ZN1 includes the conduction part ZN1P, the insulation part ZN1R1, and the insulation part ZN1R2.

The conduction part ZN1P is a columnar-shaped conductor extending in the Z1 direction and having a substantially uniform thickness, and has an outer periphery GN1P with a length NN1P when cutting on a plane with the Z1 direction as the normal direction. In the twelfth embodiment, it is assumed that the length NN1P is substantially the same length as the length NW1 according to the reference example.

The insulation part ZN1R1 is a cylindrical-shaped insulator provided to cover the outer periphery GN1P included in the conduction part ZN1P in a part of a range in the Z1 direction and has an outer periphery GN1R1 with a length NN1R that is longer than the length NN1P when cutting on a plane with the Z1 direction as the normal direction.

The insulation part ZN1R2 is a cylindrical-shaped insulator provided to cover the outer periphery GN1P included in the conduction part ZN1P in a part of a range in the Z1 direction and has an outer periphery GN1R2 with a length NN1R when cutting on a plane with the Z1 direction as the normal direction.

The coupling part ZN1*t* is positioned in the Z2 direction when viewed from the conduction part ZN1P and electrically couples the conduction part ZN1P and the wiring LK.

The electrode rod DN2 includes a conductive conduction part ZN2P and a conductive coupling part ZN2*t*. In the following, a part of the electrode rod DN2 excluding the coupling part ZN2*t* may be referred to as an electrode configuration part ZN2. That is, in the present embodiment, the conduction part ZN2P corresponds to the electrode configuration part ZN2.

The conduction part ZN2P is a columnar-shaped conductor extending in the Z1 direction and having a substantially uniform thickness, and has an outer periphery GN2P with a length NN2P when cutting on a plane with the Z1 direction as the normal direction. In the twelfth embodiment, it is assumed that the length NN2P is substantially the same length as the length NW2 according to the reference example.

The coupling part ZN2*t* is positioned in the Z2 direction when viewed from the conduction part ZN2P and electrically couples the conduction part ZN2P and the wiring LG.

Further, in the twelfth embodiment, it is assumed that the electrode rod DN1 and the electrode rod DN2 are provided such that a distance, which is from an end portion of the conduction part ZN1P in the Z1 direction to the bottom surface TKB of the ink tank TK[m], in the Z axis direction and a distance, which is from an end portion of the conduction part ZN2P in the Z1 direction to the bottom surface TKB of the ink tank TK[m], in the Z axis direction become a distance HE.

Further, in the twelfth embodiment, it is assumed that the electrode rod DN1 is provided such that a distance, which is from an end portion of the insulation part ZN1R1 in the Z1 direction to the bottom surface TKB of the ink tank TK[m], in the Z axis direction becomes the distance H2, a distance, which is from an end portion of the insulation part ZN1R1 in the Z2 direction to the bottom surface TKB of the ink tank TK[m], in the Z axis direction becomes the distance H2*u*, a distance, which is from an end portion of the insulation part ZN1R2 in the Z2 direction to the bottom surface TKB of the ink tank TK[m], in the Z axis direction becomes the distance H3, and a distance, which is from an end portion of the insulation part ZN1R2 in the Z1 direction to the bottom surface TKB of the ink tank TK[m], in the Z axis direction becomes the distance H3*u*.

In the twelfth embodiment, a part of the electrode rod DN1, where the conduction part ZN1P is exposed, that is, a part positioned in the Z2 direction from the insulation part ZN1R1 is referred to as an electrode configuration part ZN11. That is, the electrode configuration part ZN11 is a part of the electrode rod DN1 of which a distance to the bottom surface TKB in the Z axis direction is equal to or longer than the distance H2 and is equal to or shorter than the distance H1.

Further, a part of the electrode rod DN1, where the conduction part ZN1P is exposed, that is, a part positioned in the Z1 direction between the insulation part ZN1R1 and the insulation part ZN1R2 is referred to as an electrode configuration part ZN12. In the present embodiment, the electrode configuration part ZN12 is a part of the electrode rod DN1 of which a distance to the bottom surface TKB in the Z axis direction is equal to or longer than the distance H3 and is equal to or shorter than the distance H2*u*.

Further, a part of the electrode rod DN1, where the conduction part ZN1P is exposed, that is, a part positioned in the Z1 direction from the insulation part ZN1R2 is referred to as an electrode configuration part ZN13. In the present embodiment, the electrode configuration part ZN13 is a part of the electrode rod DN1 of which a distance to the bottom surface TKB in the Z axis direction is equal to or longer than the distance HE and is equal to or shorter than the distance H3*u*.

Further, a part of the electrode rod DN1, which is positioned between the electrode configuration part ZN11 and the electrode configuration part ZN12 and in which the conduction part ZN1P is covered with the insulation part ZN1R1, is referred to as an electrode insulation part ZN1S1. In the present embodiment, the electrode insulation part ZN1S1 is a part of the electrode rod DN1 of which a distance to the bottom surface TKB in the Z axis direction is equal to or longer than the distance H2*u* and is equal to or shorter than the distance H2.

Further, a part of the electrode rod DN1, which is positioned between the electrode configuration part ZN12 and the electrode configuration part ZN13 and in which the conduction part ZN1P is covered with the insulation part ZN1R2, is referred to as an electrode insulation part ZN1S2. In the present embodiment, the electrode insulation part ZN1S2 is a part of the electrode rod DN1 of which a distance to the bottom surface TKB in the Z axis direction is equal to or longer than the distance H3*u* and is equal to or shorter than the distance H3.

Further, in the twelfth embodiment, it is assumed that the electrode rod DN1 is positioned in the X1 direction when viewed from the electrode rod DN2. In the following, a distance between the conduction part ZN1P and the conduction part ZN2P in the X1 direction is referred to as a distance XN. Further, in the twelfth embodiment, it is assumed that the distance XN is substantially the same length as the distance XW according to the reference example.

Figure 51:
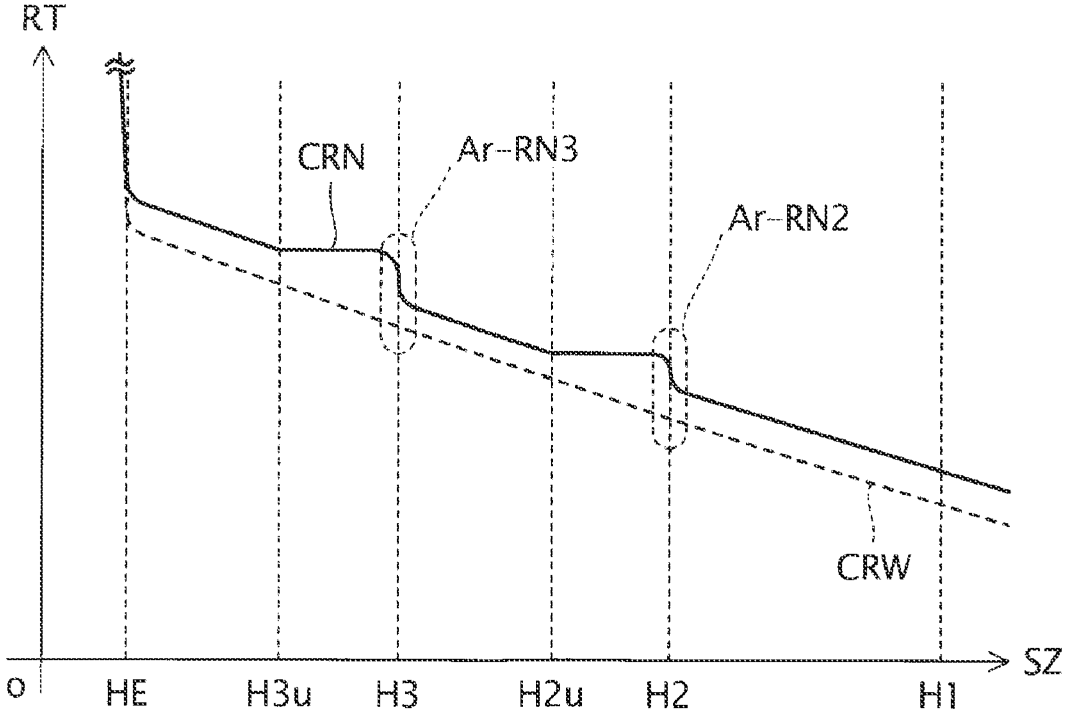
FIG. 51 is an explanatory diagram illustrating an example of a relationship between the ink liquid level distance and an ink resistor.

FIG. 51 is an explanatory diagram for explaining an example of a relationship between the ink liquid level distance SZ and an ink resistor RT according to the twelfth embodiment. Specifically, FIG. 51 illustrates an example of a resistance value change curve CRN indicating a relationship between the ink liquid level distance SZ and a resistance value of the ink resistor RT according to the twelfth embodiment when the horizontal axis is set to ink liquid level distance SZ and the vertical axis is set to the resistance value of the ink resistor RT according to the twelfth embodiment. Here, the ink resistor RT according to the twelfth embodiment is a resistor included in the ink IK that electrically couples the electrode rod DN1 and the electrode rod DN2 when the electrode rod DN1 and the electrode rod DN2, which are accommodated in the ink tank TK[m], are electrically coupled via the ink IK accommodated in the ink tank TK[m]. In the following, in order to distinguish the ink resistor RT according to the first embodiment, the ink resistor RT according to the twelfth embodiment may be referred to as an ink resistor RTN.

For convenience of description, FIG. 51 illustrates the resistance value change curve CRW with a broken line together with the resistance value change curve CRN.

Therefore, as indicated by the resistance value change curve CRN in FIG. 51, when the ink liquid level distance SZ is equal to or longer than the distance HE, the ink resistor RTN becomes a small resistance value as compared with the case where the ink liquid level distance SZ is shorter than the distance HE.

Therefore, as indicated by the resistance value change curve CRN, when the ink liquid level distance SZ is equal to or longer than the distance HE and equal to or shorter than the distance H3*u*, the ink resistor RTN becomes smaller as the ink liquid level distance SZ becomes longer.

Further, as described above, the electrode rod DN1 includes the insulation part ZN1R2 that covers the conduction part ZN1P in a range where the ink liquid level distance SZ is equal to or longer than the distance H3*u* and equal to or shorter than the distance H3. Therefore, in the present embodiment, in a range where the ink liquid level distance SZ is equal to or longer than the distance H3*u* and shorter than the distance H3, change in a cross-sectional area of the ink IK, which electrically couples the conduction part ZN1P and the conduction part ZN2P, is limited. Therefore, in the present embodiment, as indicated by the resistance value change curve CRN, when the ink liquid level distance SZ is equal to or longer than the distance H3*u* and shorter than the distance H3, the ink resistor RTN is maintained substantially constant regardless of fluctuation in the length of the ink liquid level distance SZ.

Further, when the ink liquid level distance SZ is equal to or longer than the distance H3, the electrode configuration part ZN12 is in contact with the ink IK. Therefore, the resistance value change curve CRN includes a change region Ar-RN3 where the ink resistor RTN is suddenly decreased in a part where the ink liquid level distance SZ becomes the distance H3. When the ink liquid level distance SZ is equal to or longer than the distance H3 and equal to or shorter than the distance H2*u*, the ink resistor RTN becomes smaller as the ink liquid level distance SZ becomes longer.

Further, as described above, the electrode rod DN1 includes the insulation part ZN1R1 that covers the conduction part ZN1P in a range where the ink liquid level distance SZ is equal to or longer than the distance H2*u* and equal to or shorter than the distance H2. Therefore, in the present embodiment, in a range where the ink liquid level distance SZ is equal to or longer than the distance H2*u* and shorter than the distance H2, change in a cross-sectional area of the ink IK, which electrically couples the conduction part ZN1P and the conduction part ZN2P, is limited. Therefore, in the present embodiment, as indicated by the resistance value change curve CRN, when the ink liquid level distance SZ is equal to or longer than the distance H2*u* and shorter than the distance H2, the ink resistor RTN is maintained substantially constant regardless of fluctuation in the length of the ink liquid level distance SZ.

Further, when the ink liquid level distance SZ is equal to or longer than the distance H2, the electrode configuration part ZN11 is in contact with the ink IK. Therefore, the resistance value change curve CRN includes a change region Ar-RN2 where the ink resistor RTN is suddenly decreased in a part where the ink liquid level distance SZ becomes the distance H2. When the ink liquid level distance SZ is equal to or longer than the distance H2, the ink resistor RTN becomes smaller as the ink liquid level distance SZ becomes longer.

Figure 52:
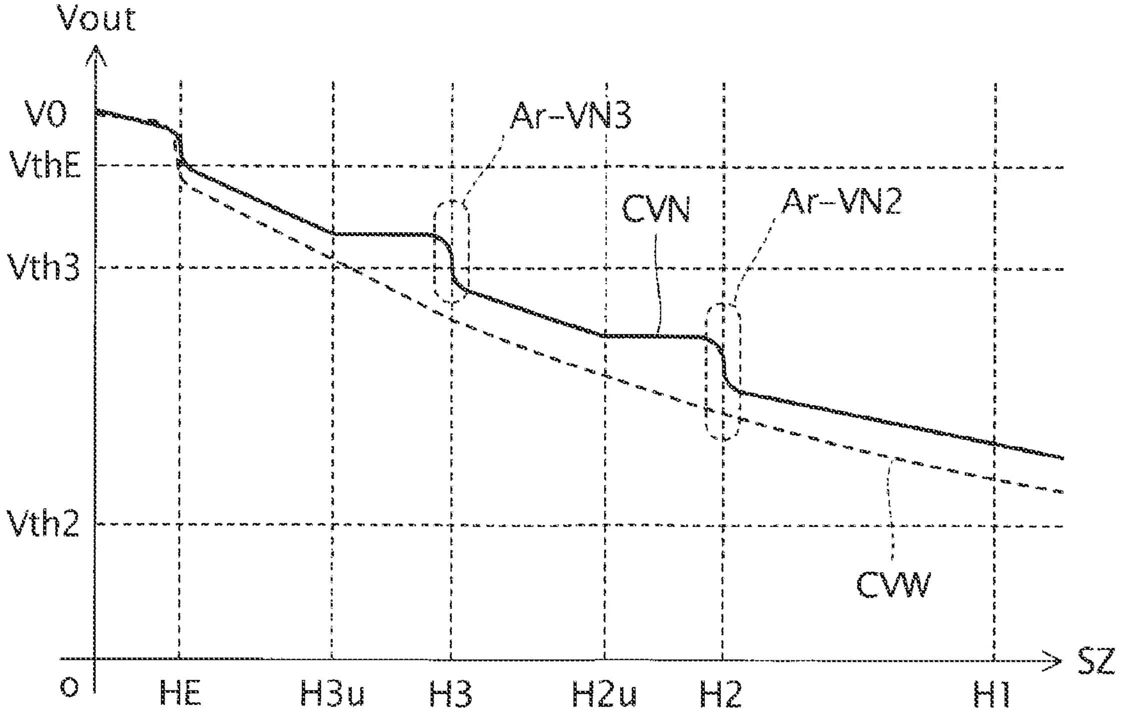
FIG. 52 is an explanatory diagram illustrating an example of a relationship between the ink liquid level distance and a detection signal.

FIG. 52 is an explanatory diagram for explaining an example of a relationship between the ink liquid level distance SZ and the detection signal Vout according to the twelfth embodiment. Specifically, FIG. 52 illustrates an example of a potential change curve CVN indicating a relationship between the ink liquid level distance SZ and the potential of the detection signal Vout according to the twelfth embodiment when the horizontal axis is set to the ink liquid level distance SZ and the vertical axis is set to the potential of the detection signal Vout according to the twelfth embodiment. Here, the detection signal Vout according to the twelfth embodiment is a detection signal Vout output by the ink accommodating device 1N. In the following, in order to distinguish the detection signal Vout according to the first embodiment, the detection signal Vout according to the twelfth embodiment may be referred to as a detection signal Vout-N.

For convenience of description, FIG. 52 illustrates the potential change curve CVW with a broken line together with the potential change curve CVN.

As indicated by the potential change curve CVN in FIG. 52, when the ink liquid level distance SZ is equal to or shorter than the distance H3*u*, the potential of the detection signal Vout-N becomes lower as the ink liquid level distance SZ becomes longer.

Further, as indicated by the potential change curve CVN, when the ink liquid level distance SZ is equal to or longer than the distance H3*u* and shorter than the distance H3, the detection signal Vout-N is maintained substantially constant regardless of fluctuation in the length of the ink liquid level distance SZ.

Further, as described above, the resistance value change curve CRN includes the change region Ar-RN3 where the ink resistor RTN is changed greatly in a part where the ink liquid level distance SZ becomes the distance H3. Therefore, the potential change curve CVN also includes a change region Ar-VN3 where the detection signal Vout-N is changed greatly in a part where the ink liquid level distance SZ becomes the distance H3.

Further, as indicated by the potential change curve CVN, when the ink liquid level distance SZ is equal to or longer than the distance H3 and equal to or shorter than the distance H2*u*, the potential of the detection signal Vout-N becomes lower as the ink liquid level distance SZ becomes longer.

Further, as indicated by the potential change curve CVN, when the ink liquid level distance SZ is equal to or longer than the distance H2*u* and shorter than the distance H2, the detection signal Vout-N is maintained substantially constant regardless of fluctuation in the length of the ink liquid level distance SZ.

Further, as described above, the resistance value change curve CRN includes the change region Ar-RN2 where the ink resistor RTN is changed greatly in a part where the ink liquid level distance SZ becomes the distance H2. Therefore, the potential change curve CVN also includes a change region Ar-VN2 where the detection signal Vout-N is changed greatly in a part where the ink liquid level distance SZ becomes the distance H2.

Further, as indicated by the potential change curve CVN, when the ink liquid level distance SZ is equal to or longer than the distance H2, the potential of the detection signal Vout-N becomes lower as the ink liquid level distance SZ becomes longer.

In the twelfth embodiment, as illustrated in FIG. 52, when a temperature of the ink IK in the ink tank TK[m] is a reference temperature t1 and when the ink liquid level distance SZ in the ink tank TK[m] is the distance HE, the potential indicated by the detection signal Vout-N is defined as the threshold potential VthE. Further, in the twelfth embodiment, when a temperature of the ink IK in the ink tank TK[m] is a reference temperature t1 and when the ink liquid level distance SZ in the ink tank TK[m] is the distance H3, the potential indicated by the detection signal Vout-N is defined as a threshold potential Vth3. Further, in the twelfth embodiment, when a temperature of the ink IK in the ink tank TK[m] is a reference temperature t1 and when the ink liquid level distance SZ in the ink tank TK[m] is the distance H2, the potential indicated by the detection signal Vout-N is defined as a threshold potential Vth2.

As described above, in the twelfth embodiment, the detection signal Vout-N output by the ink accommodating device 1N includes the change region Ar-VN2 and the change region Ar-VN3, which are regions where the detection signal Vout-N is changed greatly with respect to an amount of change in the ink liquid level distance SZ. Therefore, according to the twelfth embodiment, even when fluctuation occurs in the potential of the detection signal Vout-N due to the temperature change of the ink IK in the ink tank TK[m], the noise superimposing on the detection signal Vout-N, or the like, compared to the reference example, the remaining amount of the ink IK in the ink tank TK[m] can be accurately detected based on the detection signal Vout-N.

12.2. Conclusion of Twelfth Embodiment

As described above, the ink jet printer according to the twelfth embodiment includes: the ink tank TK[m] accommodating the conductive ink IK; the electrode rod DN1 accommodated in the ink tank TK[m]; the electrode rod DN2 accommodated in the ink tank TK[m]; the ink amount detection circuit 2 that is electrically coupled to the electrode rod DN1 and the electrode rod DN2 and that detects the remaining amount of the ink IK accommodated in the ink tank TK[m] in response to the electric signal from at least one of the electrode rod DN1 and the electrode rod DN2; and the liquid discharging head HU[m] discharging the ink IK supplied from the ink tank TK[m], in which the electrode rod DN1 includes the electrode configuration part ZN11 where the conduction part ZN1P formed with a conductive member is exposed, the electrode configuration part ZN12 where the conduction part ZN1P is exposed, the electrode insulation part ZN1S1 that is provided between the electrode configuration part ZN11 and the electrode configuration part ZN12 and in which the conduction part ZN1P is covered with the insulation part ZN1R1 formed with an insulating member, the electrode configuration part ZN13 where the conduction part ZN1P is exposed, and the electrode insulation part ZN1S2 that is provided between the electrode configuration part ZN12 and the electrode configuration part ZN13 and in which the conduction part ZN1P is covered with the insulation part ZN1R2 formed with an insulating member.

In the present embodiment, the electrode rod DN1 is an example of a "first electrode", the electrode rod DN2 is an example of a "second electrode", the electrode configuration part ZN11 is an example of a "first part", the electrode configuration part ZN12 is an example of a "second part", the electrode configuration part ZN13 is an example of a "third part", the electrode insulation part ZN1S1 is an example of a "first insulation part", the electrode insulation part ZN1S2 is an example of a "second insulation part", the conduction part ZN1P is an example of a "first conduction portion", the insulation part ZN1R1 is an example of an "insulation member covering a first conduction portion between a first part and a second part", and the insulation part ZN1R2 is an example of an "insulation member covering a first conduction portion between a second part and a third part".

As described above, in the ink accommodating device 1N according to the present embodiment, the electrode rod DN1 accommodated in the ink tank TK[m] includes the electrode insulation part ZN1S1, in which the conduction part ZN1P is covered with the insulation part ZN1R1, between the electrode configuration part ZN11 and the electrode configuration part ZN12, and includes the electrode insulation part ZN1S2, in which the conduction part ZN1P is covered with the insulation part ZN1R2, between the electrode configuration part ZN12 and the electrode configuration part ZN13. Therefore, according to the present embodiment, as in the reference example, as compared with the embodiment in which the conductive electrode rod DW1 and the conductive electrode rod DW2 are accommodated in the ink tank TK[m], it is possible to provide a part that causes a large change in the signal levels of the electric signals from the electrode rod DN1 and the electrode rod DN2 in accordance with the change in the amount of the ink IK accommodated in the ink tank TK[m]. Accordingly, according to the present embodiment, as in the reference example, as compared with the embodiment in which the conductive electrode rod DW1 and the conductive electrode rod DW2 are accommodated in the ink tank TK[m], the remaining amount of the ink IK accommodated in the ink tank TK[m] can be accurately detected.

13. Modification Example

Each embodiment illustrated above may be variously modified. A specific embodiment of the modification is exemplified below. Any two or more embodiments selected from the following examples may be appropriately combined within a range not inconsistent with each other.

13.1. Modification Example 1

In the above-described first to twelfth embodiments, although a description is made by exemplifying the case where the ink accommodating device 1 includes the ink amount detection circuit 2, the present disclosure is not limited to such an embodiment. The ink accommodating device 1 may be any device as long as it includes the ink amount detection circuit that can detect the remaining amount of the ink IK accommodated in the ink tank TK[m] based on the electric signals from the two electrode rods provided in the ink tank TK[m].

Figure 53:
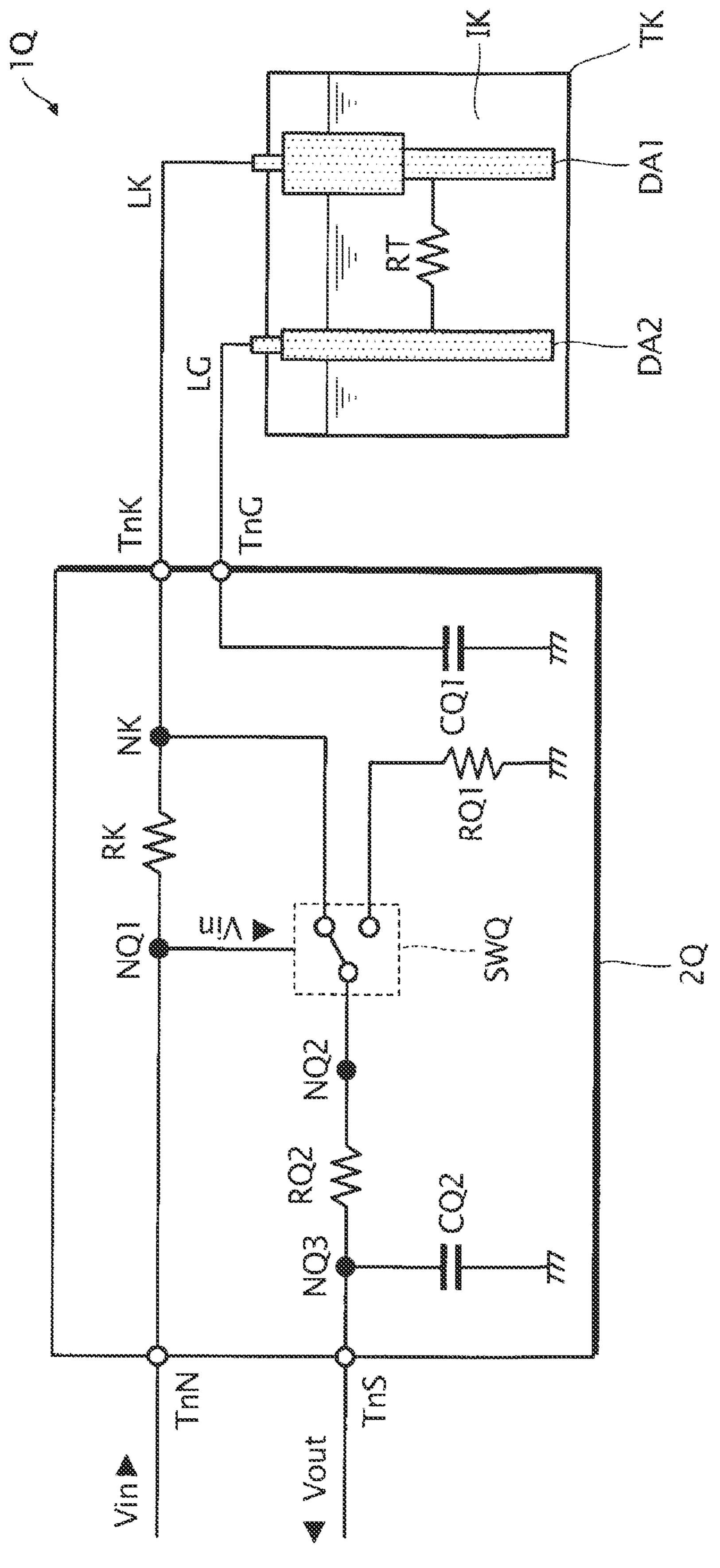
FIG. 53 is a circuit diagram illustrating an example of a configuration of an ink amount detection circuit according to Modification Example 1.

FIG. 53 is a circuit diagram illustrating an example of a configuration of an ink accommodating device 1Q included in an ink jet printer according to Modification Example 1.

The ink jet printer according to Modification Example 1 differs from the ink jet printer 100 according to the first embodiment in that an ink accommodating device 1Q is provided instead of the ink accommodating device 1. Further, the ink accommodating device 1Q is configured in the same manner as the ink accommodating device 1 according to the first embodiment in that an ink amount detection circuit 2Q is provided instead of the ink amount detection circuit 2.

In the present modification example, as illustrated in FIG. 53, although a description is made by exemplifying the case where the electrode rod DA1 and the electrode rod DA2 are accommodated in the ink tank TK[m] included in the ink accommodating device 1Q, the present disclosure is not limited to such an embodiment. The electrode rod of each embodiment described above can be accommodated in the ink tank TK[m] included in the ink accommodating device 1Q.

As illustrated in FIG. 53, the ink amount detection circuit 2Q includes an input terminal TnN, a detection terminal TnK, a reference potential coupling terminal TnG, and an output terminal TnS.

The input signal Vin is input to the input terminal TnN. The detection terminal TnK is electrically coupled to the electrode rod DA1 via a wiring LK. The reference potential coupling terminal TnG is electrically coupled to the electrode rod DA2 via a wiring LG. The output terminal TnS outputs the detection signal Vout.

Further, the ink amount detection circuit 2Q includes a node NK, a node NQ1, a node NQ2, a node NQ3, a resistor RK, a resistor RQ1, a resistor RQ2, a capacitance CQ1, a capacitance CQ2, and a switch SWQ.

The node NK is electrically coupled to the detection terminal TnK.

The node NQ1 is electrically coupled to the input terminal TnN, and the input signal Vin is supplied via the input terminal TnN.

One end of the resistor RK is electrically coupled to the node NK, and the other end is electrically coupled to the node NQ1.

In the capacitance CQ1, one electrode, of two electrodes included in the capacitance CQ1, is electrically coupled to the reference potential coupling terminal TnG and the other electrode is electrically coupled to a wiring set to a ground potential.

The switch SWQ includes two input terminals, one output terminal, and one control terminal. One input terminal, of the two input terminals included in the switch SWQ, is electrically coupled to the node NK and the other input terminal is electrically coupled to one end of the resistor RQ1. The output terminal included in the switch SWQ is electrically coupled to the node NQ2. The input signal Vin is supplied to the control terminal included in the switch SWQ via the node NQ1.

In the present Modification Example, the input signal Vin is a signal set to have a signal level of either a high level or a low level.

In the present Modification Example, when the input signal Vin supplied to the switch SWQ is at a low level, the switch SWQ electrically couples the output terminal included in the switch SWQ and one input terminal of the two input terminals included in the switch SWQ. That is, in the present Modification Example, when the input signal Vin supplied to the switch SWQ is at a low level, the switch SWQ electrically couples the node NK and the node NQ2.

Further, in the present Modification Example, when the input signal Vin supplied to the switch SWQ is at a high level, the switch SWQ electrically couples the output terminal included in the switch SWQ and the other input terminal of the two input terminals included in the switch SWQ. That is, in the present Modification Example, when the input signal Vin supplied to the switch SWQ is at a high level, the switch SWQ electrically couples one end of the resistor RQ1 and the node NQ2.

One end of the resistor RQ1 is electrically coupled to the other input terminal of the two input terminals included in the switch SWQ, and the other end is electrically coupled to a wiring set to a ground potential.

One end of the resistor RQ2 is electrically coupled to the node NQ2, and the other end is electrically coupled to the node NQ3.

In the capacitance CQ2, one electrode, of two electrodes included in the capacitance CQ2, is electrically coupled to the node NQ3 and the other electrode is electrically coupled to a wiring set to a ground potential. The resistor RQ2 and the capacitance CQ2 function as low pass filters.

The output terminal TnS is electrically coupled to the node NQ3 and outputs the detection signal Vout indicating a potential of the node NQ3.

Figure 54:
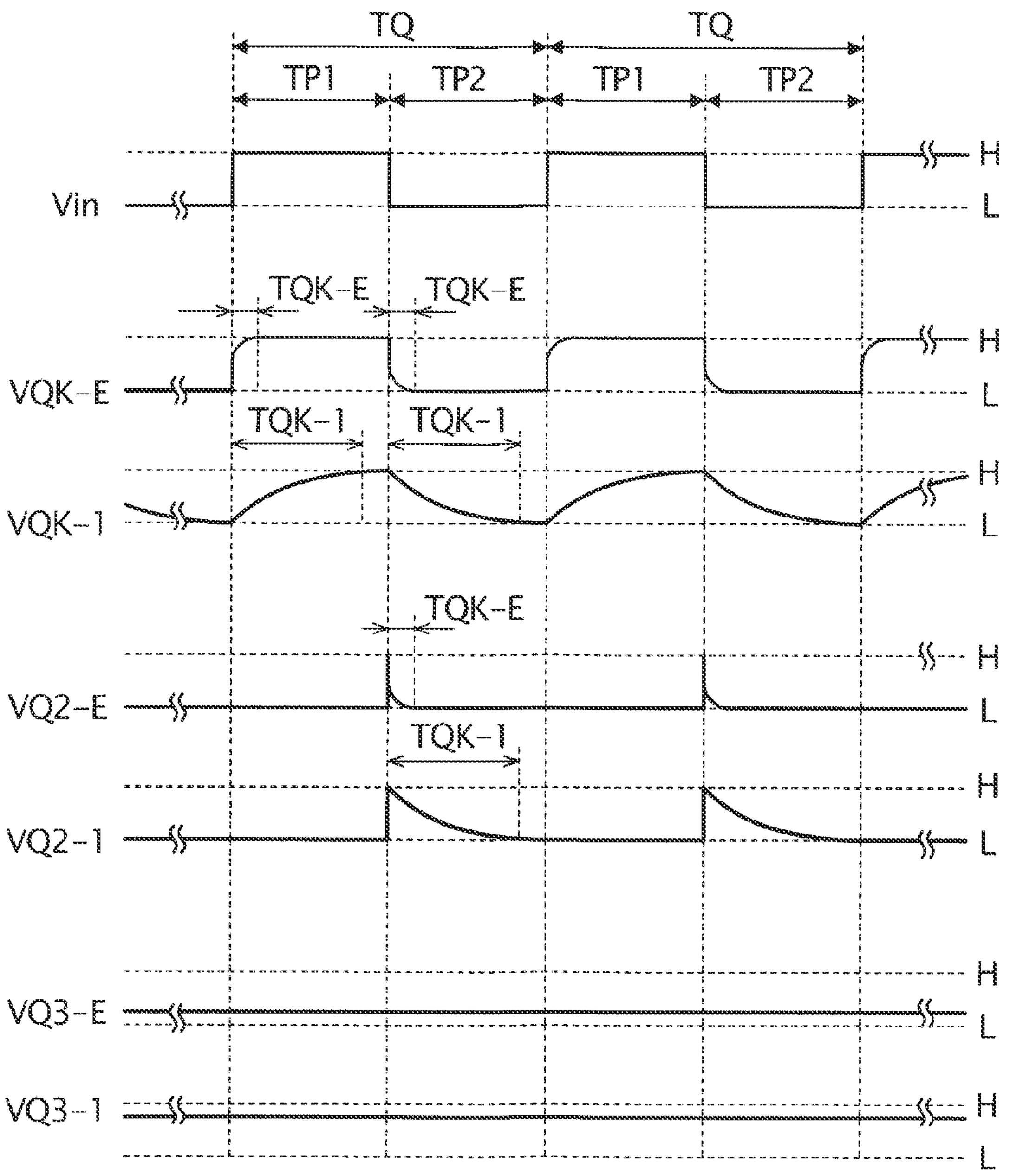
FIG. 54 is a timing chart illustrating an example of an operation of the ink amount detection circuit.

FIG. 54 is a timing chart for explaining various signals flowing through the ink amount detection circuit 2Q.

As illustrated in FIG. 54, in the present Modification Example, it is assumed that an operation period of the ink amount detection circuit 2Q is divided into a plurality of unit periods TQ. In the present Modification Example, it is assumed that each unit period TQ is divided into a control period TP1 and a control period TP2.

The input signal Vin is set to a high level in the control period TP1 in the unit period TQ and is set to a low level in the control period TP2 in the unit period TQ.

A signal VQK is a signal indicating the potential of the node NK. In the following, the signal VQK when the ink IK accommodated in the ink tank TK[m] is less than the remaining amount of ink corresponding to the distance HE, that is, when the ink IK in the ink tank TK[m] is depleted and the ink liquid level distance SZ in the ink tank TK[m] is shorter than the distance HE, is referred to as a signal VQK-E. Further, the signal VQK when the ink IK accommodated in the ink tank TK[m] is the remaining amount of ink corresponding to the distance H1, that is, when there is plenty of the ink IK in the ink tank TK[m] and the ink liquid level distance SZ in the ink tank TK[m] is the distance H1, is referred to as a signal VQK-1.

When the ink IK in the ink tank TK[m] is depleted, the electrode rod DA1 and the electrode rod DA2 are in a state of not being electrically coupled. Therefore, the signal VQK-E indicates a waveform having a shape linked to the input signal Vin. Specifically, the signal VQK-E rises from a low level to a high level with a delay of time TQK-E from a timing at which the input signal Vin rises from a low level to a high level and falls from a high level to a low level with a delay of time TQK-E from a timing at which the input signal Vin falls from a high level to a low level. Here, the time TQK-E is time shorter than a time length of the control period TP1 and shorter than a time length of the control period TP2, and is time for charging the parasitic capacitance of the wiring LK, the electrode rod DA1, or the like.

When there is plenty of ink IK in the ink tank TK[m], the electrode rod DA1 and the electrode rod DA2 are in an electrically coupled state. Therefore, the signal VQK-1 indicates a waveform in which the input signal Vin is rounded. Specifically, the signal VQK-1 rises from a low level to a high level with a delay of time TQK-1 from a timing at which the input signal Vin rises from a low level to a high level and falls from a high level to a low level with a delay of time TQK-1 from a timing at which the input signal Vin falls from a high level to a low level. Here, the time TQK-1 is time longer than the time TQK-E, and is time for charging the capacitance CQ1 in addition to the parasitic capacitance of the wiring LK, the electrode rod DA1, or the like.

A signal VQ2 is a signal indicating the potential of the node NQ2. In the following, the signal VQ2 when the ink IK in the ink tank TK[m] is depleted and the ink liquid level distance SZ in the ink tank TK[m] is shorter than the distance HE, is referred to as a signal VQ2-E. Further, the signal VQ2 when there is plenty of ink IK in the ink tank TK[m] and the ink liquid level distance SZ in the ink tank TK[m] is the distance H1, is referred to as a signal VQ2-1.

As described above, in the control period TP1 in which the input signal Vin is at a high level, the switch SWQ electrically couples the node NQ2 and one end of the resistor RQ1. Therefore, the signal VQ2 is set to a low level in the control period TP1.

Further, in the control period TP2 in which the input signal Vin is at a low level, the switch SWQ electrically couples the node NQ2 and the node NK. Therefore, in the control period TP2, the signal VQ2-E indicates a waveform having a shape for requiring time TQK-E to fall from a high level to a low level. Further, in the control period TP2, the signal VQ2-1 indicates a waveform having a shape for requiring time TQK-1 to fall from a high level to a low level.

A signal VQ3 is a signal indicating the potential of the node NQ3. In the following, the signal VQ3 when the ink IK in the ink tank TK[m] is depleted and the ink liquid level distance SZ in the ink tank TK[m] is shorter than the distance HE, is referred to as a signal VQ3-E. Further, the signal VQ3 when there is plenty of ink IK in the ink tank TK[m] and the ink liquid level distance SZ in the ink tank TK[m] is the distance H1, is referred to as a signal VQ3-1.

As described above, the resistor RQ2 and the capacitance CQ2 function as low pass filters. Therefore, the signal VQ3 becomes a signal having a waveform in which the high frequency component is removed from the signal VQ2. As described above, the time TQK-1 is longer than the time TQK-E. Therefore, the signal VQ3-1 has a potential higher than that of the signal VQ3-E. That is, in the present Modification Example, when there is plenty of ink IK in the ink tank TK[m] and the ink liquid level distance SZ in the ink tank TK[m] is the distance H1, the ink amount detection circuit 2Q outputs a higher potential detection signal Vout as compared with the case where the ink IK in the ink tank TK[m] is depleted and the ink liquid level distance SZ in the ink tank TK[m] is shorter than the distance HE.

13.2. Modification Example 2

In the above-described first to twelfth embodiments and Modification Example 1, although a description is made by exemplifying the case where the ink accommodating device 1 is provided with the M ink amount detection circuits that correspond one-to-one to the M ink tanks TK[1] to TK[M], the present disclosure is not limited to such an embodiment. The ink accommodating device 1 may be provided with the ink amount detection circuit 2 or the ink amount detection circuit 2Q, in which the number of ink amount detection circuit is less than M.

For example, the ink accommodating device 1 may be provided with one ink amount detection circuit 2. In this case, for example, the ink amount detection circuit 2 may divide the operation period of the ink amount detection circuit 2 into M unit operation periods and detect the remaining amount of the ink IK accommodated in the ink tank TK[m] in the m-th unit operation period. Specifically, the ink amount detection circuit 2 may be configured to switch the ink tank TK[m] coupled to the ink amount detection circuit 2 for each unit operation period.

13.3. Modification Example 3

In the above-described first embodiment, although a description is made by exemplifying the case where the detection terminal TnK is electrically coupled to the electrode rod DA1 via the wiring LK or the reference potential coupling terminal TnG is electrically coupled to the electrode rod DA2 via the wiring LG in the ink amount detection circuit 2, the present disclosure is not limited to such an embodiment. In the ink amount detection circuit 2, the detection terminal TnK may be electrically coupled to the electrode rod DA2 via the wiring LK and the reference potential coupling terminal TnG may be electrically coupled to the electrode rod DA1 via the wiring LG. That is, in the ink accommodating device 1, disposition positions of the electrode rod DA1 and the electrode rod DA2 may be reversely rotated.

Similarly, in the above-described second to twelfth embodiments and Modification Examples 1 and 2, a disposition relationship between the electrode rod coupled to the wiring LK and the electrode rod coupled to the wiring LG may be reversely rotated.

13.4. Modification Example 4

In the above-described first embodiment, although a description is made by exemplifying the case where the electrode rod DA1 includes the coupling part ZA1*t*, the wiring LK and the electrode configuration part ZA11 are electrically coupled by the coupling part ZA1*t*, the electrode rod DA2 includes the coupling part ZA2*t*, and the wiring LG and the electrode configuration part ZA2 are electrically coupled by the coupling part ZA2*t*, the present disclosure is not limited to such an embodiment.

For example, the electrode rod DA1 may be configured without including the coupling part ZA1*t*, and the electrode rod DA2 may be configured without including the coupling part ZA2*t*. In this case, the ink accommodating device 1 may have a configuration in which the wiring LK is coupled to the electrode configuration part ZA11 and the wiring LG is coupled to the electrode configuration part ZA2.

Further, the same applies to the above-described second to twelfth embodiments and Modification Examples 1 to 3. For example, in the twelfth embodiment, the ink accommodating device 1N may have a configuration in which the electrode rod DN1 does not include the coupling part ZN1*t* and the wiring LK is coupled to the electrode configuration part ZN1, and the electrode rod DN2 does not have the coupling part ZN2*t* and the wiring LG is coupled to the electrode configuration part ZN2.

13.5. Modification Example 5

In the above-described first to twelfth embodiments and Modification Examples 1 to 4, although the serial type ink jet printer in which the housing case 921 equipped with the liquid discharging head HU[m] is reciprocated in the main scanning direction MH1 is exemplified, the present disclosure is not limited to such an embodiment. The ink jet printer may be a line-type liquid discharging apparatus including the liquid discharging head HU[m] capable of discharging the ink IK over the entire width of the medium PP.

13.6. Modification Example 6

The liquid discharging apparatus explained by exemplifying the ink jet printer in the above-described first to twelfth embodiments and Modification Examples 1 to 5 can be adopted in various apparatuses such as a facsimile machine and a copying machine in addition to an apparatus dedicated to printing. Moreover, the application of the liquid discharging apparatus of the present disclosure is not limited to printing. For example, the liquid discharging apparatus that discharges solution of a coloring material is utilized as a manufacturing apparatus that forms a color filter of a liquid crystal display apparatus. Further, the liquid discharging apparatus that discharges solution of a conductive material is utilized as a manufacturing apparatus that forms wiring and electrodes of a wiring substrate.

What is claimed is:

1. A liquid discharging apparatus comprising:
an accommodating container accommodating conductive liquid;
a first electrode accommodated in the accommodating container;
a second electrode accommodated in the accommodating container;
a detection portion that is electrically coupled to the first electrode and the second electrode and that detects a remaining amount of the liquid accommodated in the accommodating container in response to an electric signal from at least one of the first electrode and the second electrode; and
a liquid discharging head discharging the liquid that is supplied from the accommodating container, wherein
the first electrode includes
a first part where a distance between the first part and the second electrode is a first distance, and
a second part where a distance between the second part and the second electrode is a second distance that is longer than the first distance.

2. The liquid discharging apparatus according to claim 1, wherein
the first electrode is provided to extend in a first direction, and
the second electrode is provided to extend in a second direction intersecting the first direction.

3. The liquid discharging apparatus according to claim 1, wherein
the first part is provided to extend in a first direction, and
the first electrode includes, between the first part and the second part,
a first intersecting part extending in a first intersecting direction that intersects the first direction, and
a first coupling part coupling the first part and the first intersecting part.

4. The liquid discharging apparatus according to claim 3, wherein
the first electrode includes a second coupling part coupling the second part and the first intersecting part.

5. The liquid discharging apparatus according to claim 4, wherein
the first intersecting direction is a direction substantially orthogonal to the first direction.

6. The liquid discharging apparatus according to claim 5, wherein
the second part is provided to extend in the first direction.

7. The liquid discharging apparatus according to claim 1, wherein
a cross-sectional shape of the first electrode is a polygon.

8. The liquid discharging apparatus according to claim 1, wherein
the second electrode includes
a third part where a distance between the third part and the first electrode is a third distance, and
a fourth part where a distance between the fourth part and the first electrode is a fourth distance that is longer than the third distance.

9. The liquid discharging apparatus according to claim 8, wherein
the third part is provided to extend in a third direction, and
the second electrode includes, between the third part and the fourth part,
a second intersecting part extending in a second intersecting direction that intersects the third direction, and
a third coupling part coupling the third part and the second intersecting part.

10. The liquid discharging apparatus according to claim 9, wherein
the second electrode includes a fourth coupling part coupling the fourth part and the second intersecting part, and
the fourth part is provided to extend in the third direction.

11. The liquid discharging apparatus according to claim 8, wherein
a cross-sectional shape of the second electrode is a polygon.

12. A liquid accommodating device comprising:
an accommodating container accommodating conductive liquid;
a first electrode accommodated in the accommodating container;
a second electrode accommodated in the accommodating container; and
a detection portion that is electrically coupled to the first electrode and the second electrode and that detects a remaining amount of the liquid accommodated in the accommodating container in response to an electric signal from at least one of the first electrode and the second electrode, wherein
the first electrode includes
a first part where a distance between the first part and the second electrode is a first distance, and
a second part where a distance between the second part and the second electrode is a second distance that is longer than the first distance.

13. The liquid accommodating device according to claim 12, wherein
the first electrode is provided to extend in a first direction, and
the second electrode is provided to extend in a second direction intersecting the first direction.

14. The liquid accommodating device according to claim 12, wherein the first part is provided to extend in a first direction, and the first electrode includes, between the first part and the second part, a first intersecting part extending in a first intersecting direction that intersects the first direction, and a first coupling part coupling the first part and the first intersecting part.

15. The liquid accommodating device according to claim 14, wherein the first electrode includes a second coupling part coupling the second part and the first intersecting part.

16. The liquid accommodating device according to claim 15, wherein the first intersecting direction is a direction substantially orthogonal to the first direction.

17. The liquid accommodating device according to claim 16, wherein the second part is provided to extend in the first direction.

18. The liquid accommodating device according to claim 12, wherein a cross-sectional shape of the first electrode is a polygon.

19. The liquid accommodating device according to claim 12, wherein the second electrode includes a third part where a distance between the third part and the first electrode is a third distance, and a fourth part where a distance between the fourth part and the first electrode is a fourth distance that is longer than the third distance.

20. The liquid accommodating device according to claim 19, wherein the third part is provided to extend in a third direction, and the second electrode includes, between the third part and the fourth part, a second intersecting part extending in a second intersecting direction that intersects the third direction, and a third coupling part coupling the third part and the second intersecting part.

21. The liquid accommodating device according to claim 20, wherein the second electrode includes a fourth coupling part coupling the fourth part and the second intersecting part, and the fourth part is provided to extend in the third direction.

22. The liquid accommodating device according to claim 19, wherein a cross-sectional shape of the second electrode is a polygon.

* * * * *